United States Patent
Kondou et al.

(10) Patent No.: US 11,244,026 B2
(45) Date of Patent: Feb. 8, 2022

(54) OPTIMIZATION PROBLEM ARITHMETIC METHOD AND OPTIMIZATION PROBLEM ARITHMETIC DEVICE

(71) Applicant: FUJITSU LIMITED, Kawasaki (JP)

(72) Inventors: Hiroshi Kondou, Yokohama (JP); Hiroshi Yagi, Yokohama (JP); Noriyuki Itakura, Yokohama (JP); Noriaki Shimada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 221 days.

(21) Appl. No.: 16/569,643

(22) Filed: Sep. 12, 2019

(65) Prior Publication Data
US 2020/0089728 A1    Mar. 19, 2020

(30) Foreign Application Priority Data

Sep. 19, 2018    (JP) .............................. JP2018-175400

(51) Int. Cl.
*G06F 17/11*    (2006.01)

(52) U.S. Cl.
CPC .................. *G06F 17/11* (2013.01)

(58) Field of Classification Search
CPC .. G06N 5/003; G06N 10/00; G06F 17/11–13; G06F 7/544; G06F 9/50–5005; G06F 9/5027; G06F 9/5044–505; G06F 9/5061; G06F 9/5077; G06F 9/3897; G06F 9/5038
See application file for complete search history.

(56) References Cited

U.S. PATENT DOCUMENTS

| | | | | |
|---|---|---|---|---|
| 8,589,935 B2 * | 11/2013 | Prasanna | ............... | G06F 9/5072 718/104 |
| 2005/0050372 A1 * | 3/2005 | Hagiwara | ........... | G06F 9/30167 713/320 |
| 2009/0282411 A1 | 11/2009 | Carteri et al. | | |
| 2015/0278408 A1 * | 10/2015 | Yoshimura | .............. | G06F 30/20 703/2 |
| 2016/0063391 A1 * | 3/2016 | Hayashi | .................. | G06F 7/588 706/11 |

FOREIGN PATENT DOCUMENTS

WO    2017/037903 A1    3/2017

OTHER PUBLICATIONS

Fujitsu, Lab. "Fujitsu Technology to Solve Combinatorial Optimization Problems for Medium-Sized Drug Discovery." Fujitsu Technology to Solve Combinatorial Optimization Problems for Medium-Sized Drug Discovery—www.fujitsu.com/global/about/resources/news/press-releases/2018/0918-0 (Year: 2018).*
USOA—Non-Final Office Action of related U.S. Appl. No. 16/572,783 dated Jun. 21, 2021 [pending].

* cited by examiner

*Primary Examiner* — Matthew D Sandifer
*Assistant Examiner* — Huy Duong
(74) *Attorney, Agent, or Firm* — Fujitsu Patent Center

(57) ABSTRACT

A computer-implemented optimization problem arithmetic method includes, receiving a combinatorial optimization problem, selecting a first arithmetic circuit from among a plurality of arithmetic circuits based on a scale or a requested accuracy of the combinatorial optimization problem and a partition mode that defines logically divided states of each of the plurality of arithmetic circuits, and causing the first arithmetic circuit to execute an arithmetic operation of the combinatorial optimization problem.

13 Claims, 27 Drawing Sheets

FIG. 13

LFE0

| | | |
|---|---|---|
| $W_{0,4095}$ | $W_{0,4094}$ | 3d1 |
| $W_{0,4093}$ | $W_{0,4092}$ | |
| ... | ... | |
| $W_{0,3}$ | $W_{0,2}$ | |
| $W_{0,1}$ | $W_{0,0}$ | |

63    47    31    15

LFE1

| | | |
|---|---|---|
| $W_{1,4095}$ | $W_{1,4094}$ | 3d2 |
| $W_{1,4093}$ | $W_{1,4092}$ | |
| ... | ... | |
| $W_{1,3}$ | $W_{1,2}$ | |
| $W_{1,1}$ | $W_{1,0}$ | |

63    47    31    15

⋮

LFE4095

| | | |
|---|---|---|
| $W_{4095,4095}$ | $W_{4095,4094}$ | 3du |
| $W_{4095,4093}$ | $W_{4095,4092}$ | |
| ... | ... | |
| $W_{4095,3}$ | $W_{4095,2}$ | |
| $W_{4095,1}$ | $W_{4095,0}$ | |

63    47    31    15

SCALE: 4k BITS
ACCURACY: 32 BITS
LFE NUMBER: 4k

FIG. 14

LFE0

| $W_{0,8191}$ | $W_{0,8190}$ | $W_{0,8189}$ | $W_{0,8188}$ | ~4d1 |
|---|---|---|---|---|
| $W_{0,8187}$ | $W_{0,8186}$ | $W_{0,8185}$ | $W_{0,8184}$ | |
| ... | ... | ... | ... | |
| $W_{0,7}$ | $W_{0,6}$ | $W_{0,5}$ | $W_{0,4}$ | |
| $W_{0,3}$ | $W_{0,2}$ | $W_{0,1}$ | $W_{0,0}$ | |

63    47    31    15

LFE1

| $W_{1,8191}$ | $W_{1,8190}$ | $W_{1,8189}$ | $W_{1,8188}$ | ~4d2 |
|---|---|---|---|---|
| $W_{1,8187}$ | $W_{1,8186}$ | $W_{1,8185}$ | $W_{1,8184}$ | |
| ... | ... | ... | ... | |
| $W_{1,7}$ | $W_{1,6}$ | $W_{1,5}$ | $W_{1,4}$ | |
| $W_{1,3}$ | $W_{1,2}$ | $W_{1,1}$ | $W_{1,0}$ | |

63    47    31    15

⋮

LFE8191

| $W_{8191,8191}$ | $W_{8191,8190}$ | $W_{8191,8189}$ | $W_{8191,8188}$ | ~4dn |
|---|---|---|---|---|
| $W_{8191,8187}$ | $W_{8191,8186}$ | $W_{8191,8185}$ | $W_{8191,8184}$ | |
| ... | ... | ... | ... | |
| $W_{8191,7}$ | $W_{8191,6}$ | $W_{8191,5}$ | $W_{8191,4}$ | |
| $W_{8191,3}$ | $W_{8191,2}$ | $W_{8191,1}$ | $W_{8191,0}$ | |

63    47    31    15

SCALE: 8k BITS
ACCURACY: 16 BITS
LFE NUMBER: 8k

SCALE: 4k BITS
ACCURACY: 64 BITS
LFE NUMBER: 8k

FIG. 17

MODE SETTING TABLE ~1700

| UNIT ID | PARTITION MODE | PROBLEM SCALE | ACCURACY |
|---|---|---|---|
| 1 | FULL | 8K | 16bit |
| 2 | FULL | 4K | 64bit |
| 3-1 | 2P | 4K | 32bit |
| 3-2 | 2P | 4K | 32bit |
| 4-1 | 4P | 2K | 64bit |
| 4-2 | 4P | 2K | 64bit |
| 4-3 | 4P | 2K | 64bit |
| 4-4 | 4P | 2K | 64bit |
| 5-1 | 8P | 1K | 128bit |
| 5-2 | 8P | 1K | 128bit |
| 5-3 | 8P | 1K | 128bit |
| 5-4 | 8P | 1K | 128bit |
| 5-5 | 8P | 1K | 128bit |
| 5-6 | 8P | 1K | 128bit |
| 5-7 | 8P | 1K | 128bit |
| 5-8 | 8P | 1K | 128bit |

| | PROBLEM NUMBER | PROBLEM SCALE | ACCURACY | ARITHMETIC OPERABLE UNIT | ASSIGNED UNIT |
|---|---|---|---|---|---|
| 1900-1 | Q1 | 1K | 128bit | 5-1,5-2,5-3,5-4,5-5,5-6,5-7,5-8 | 5-1 |
| 1900-2 | Q2 | 4K | 32bit | 3-1,3-2 | 3-1 |
| 1900-3 | Q3 | 8K | 16bit | 1 | 1 |
| 1900-4 | Q4 | 4K | 64bit | 2 | 2 |
| 1900-5 | Q5 | 2K | 64bit | 4-1,4-2,4-3,4-4 | 4-1 |
| 1900-6 | Q6 | 1K | 128bit | 5-1,5-2,5-3,5-4,5-5,5-6,5-7,5-8 | 5-2 |
| 1900-7 | Q7 | 1K | 128bit | 5-1,5-2,5-3,5-4,5-5,5-6,5-7,5-8 | 5-3 |
| 1900-8 | Q8 | 4K | 32bit | 3-1,3-2 | 3-2 |

ASSIGNED UNIT TABLE ~1900

FIG. 20

| UNIT ID | PARTITION MODE | PROBLEM SCALE | ACCURACY |
|---|---|---|---|
| 1 | FULL | 8K | 64bit |
| 2-1 | 8P | 1K | 128bit |
| 2-2 | 8P | 1K | 128bit |
| 2-3 | 8P | 1K | 128bit |
| 2-4 | 8P | 1K | 128bit |
| 2-5 | 8P | 1K | 128bit |
| 2-6 | 8P | 1K | 128bit |
| 2-7 | 8P | 1K | 128bit |
| 2-8 | 8P | 1K | 128bit |

MODE SETTING TABLE ~2000

| PROBLEM NUMBER | PROBLEM SCALE | ACCURACY | ARITHMETIC OPERABLE UNIT | ASSIGNED UNIT |
|---|---|---|---|---|
| Q1' | 1K | 128bit | 2-1,2-2,2-3,2-4,2-5,2-6,2-7,2-8 | 2-1 |
| Q2' | 8K | 16bit | 1 | 1 |
| Q3' | 1K | 128bit | 2-1,2-2,2-3,2-4,2-5,2-6,2-7,2-8 | 2-2 |
| Q4' | 4K | 64bit | 1 | WAITING |
| Q5' | 1K | 128bit | 2-1,2-2,2-3,2-4,2-5,2-6,2-7,2-8 | 2-3 |

ASSIGNED UNIT TABLE ~2100

OPTIMIZATION PROBLEM ARITHMETIC METHOD AND OPTIMIZATION PROBLEM ARITHMETIC DEVICE

CROSS-REFERENCE TO RELATED APPLICATION

This application is based upon and claims the benefit of priority of the prior Japanese Patent Application No. 2018-175400, filed on Sep. 19, 2018, the entire contents of which are incorporated herein by reference.

FIELD

The embodiment relates to an optimization problem arithmetic technique.

BACKGROUND

As a method of solving a multivariate optimization problem which the Neumann-type computer is not good at, there is an optimization device (there is also a case of being referred to as Ising machine or Boltzmann machine) using an Ising-type energy function. The optimization device calculates the problem that is a calculation target by replacing the problem with an Ising model which is a model that represents the behavior of the spin of a magnetic body.

The optimization device is also capable of being modeled, for example, using a neural network. In this case, each of a plurality of bits (spin bits) that corresponds to a plurality of spins included in the Ising model functions as a neuron that outputs 0 or 1 in accordance with a weighting factor (also referred to as a coupling factor) indicating the magnitude of interaction between other bits and the own bits. The optimization device uses, for example, a probabilistic search method, such as simulated annealing, to find a combination of values of each bit from which the minimum value among values (referred to as energy) of energy function (also referred to as cost function or objective function) as described above, as a solution.

For example, there has been proposed a semiconductor system which searches for a ground state of the Ising model using a semiconductor chip on which a plurality of unit elements that correspond to spins are mounted. The proposed semiconductor system constructs a semiconductor system using a plurality of semiconductor chips on which a certain number of unit elements are mounted when realizing a semiconductor chip capable of responding to a large scale problem.

For example, the related art is disclosed in International Publication Pamphlet No. WO 2017/037903.

SUMMARY

According to an aspect of the embodiments, a computer-implemented optimization problem arithmetic method includes, receiving a combinatorial optimization problem, selecting a first arithmetic circuit from among a plurality of arithmetic circuits based on a scale or a requested accuracy of the combinatorial optimization problem and a partition mode that defines logically divided states of each of the plurality of arithmetic circuits, and causing the first arithmetic circuit to execute an arithmetic operation of the combinatorial optimization problem.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 is an explanatory diagram (part 3) illustrating a storage example of weighting factors;

FIG. 14 is an explanatory diagram (part 4) illustrating a storage example of weighting factors;

FIG. 17 is an explanatory diagram illustrating one example of stored contents of a mode setting table;

FIG. 19 is an explanatory diagram illustrating an example of stored contents of an assigned unit table;

FIG. 20 is an explanatory diagram illustrating an example of stored contents of a mode setting table;

FIG. 21 is an explanatory diagram illustrating one example of stored contents of an assigned unit table;

DESCRIPTION OF EMBODIMENTS

In the optimization device, the number of spin bits (corresponding to the scale of the problem) and the number of bits of weighting factor (corresponding to the accuracy of condition expression in the problem) may change depending on the problem to be solved. For example, in the problem of a certain field, there is a case where the relatively large number of spin bits are used and the relatively small number of bits of the weighting factors are used. Meanwhile, in the problem of other fields, although the number of spin bits may be relatively small, the number of bits of the weighting factors may be relatively large. However, it is inefficient to manufacture an optimization device having the number of spin bits and the number of bits of the weighting factors that are appropriate for each problem, individually for each problem.

The embodiment of an optimization problem arithmetic program, an optimization problem arithmetic method, and an optimization problem arithmetic device according to the embodiment will be described in detail below with reference to the drawings.

Figure 1:
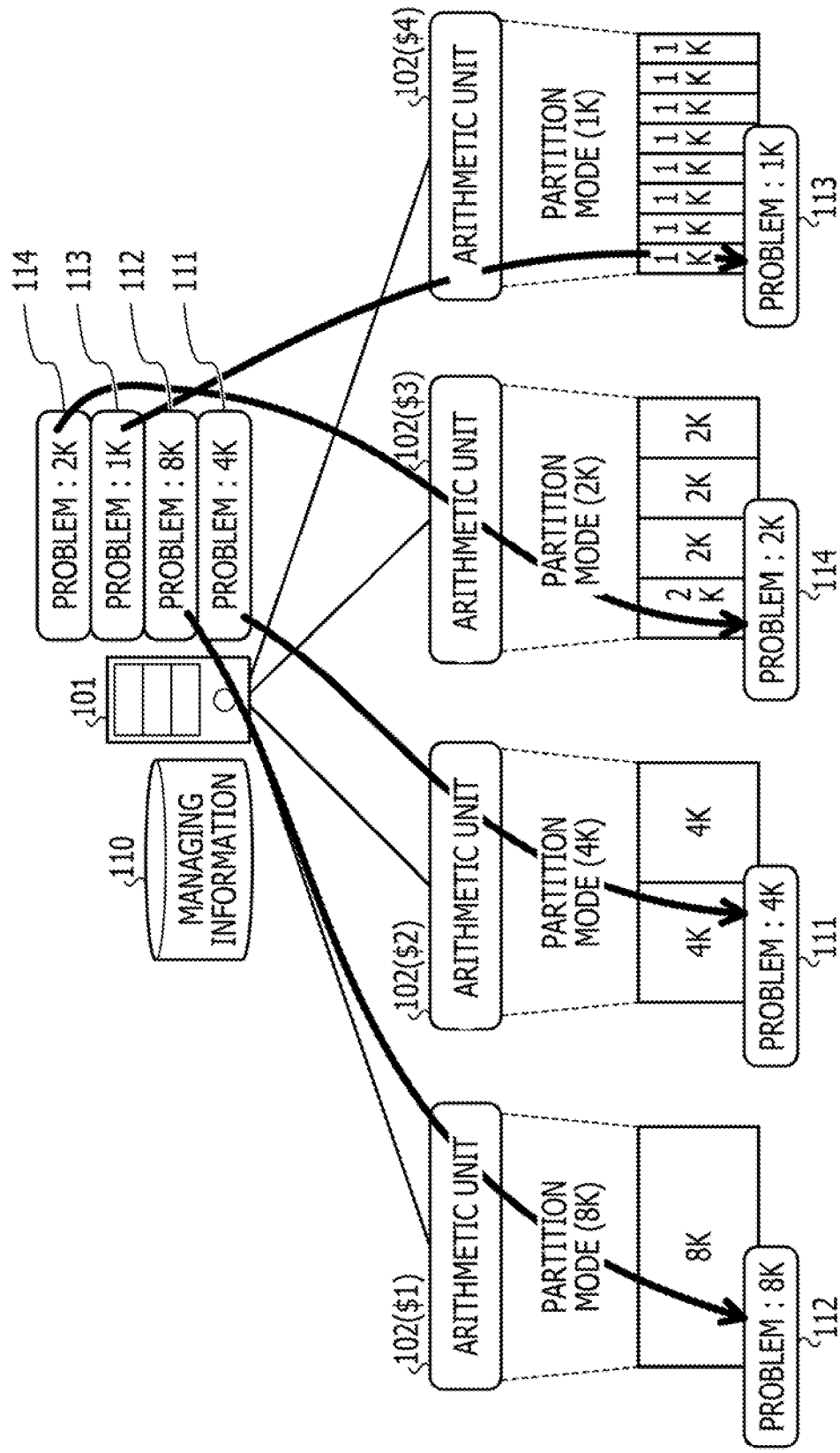
FIG. 1 is an explanatory diagram illustrating one Example of an optimization problem arithmetic method according to an embodiment.

FIG. 1 is an explanatory diagram illustrating one Example of the optimization problem arithmetic method according to the embodiment. In FIG. 1, an optimization problem arithmetic device 101 is a computer that performs an arithmetic operation of a combinatorial optimization problem by a plurality of arithmetic units 102. The arithmetic unit 102 is a device that solves the combinatorial optimization problem.

The arithmetic unit 102 is logically divisible into a plurality of partitions. To divide the arithmetic unit into partitions is to partition the range of hardware resources used in the arithmetic operation. The arithmetic unit 102 is capable of solving different problems independently in each partition.

For example, when dividing the arithmetic unit 102 into eight partitions, eight users are capable of solving different problems at the same time. The arithmetic unit 102 may be, for example, a separate device used in coupling with the optimization problem arithmetic device 101, or may be a device incorporated in the optimization problem arithmetic device 101.

The optimization problem arithmetic device 101 is capable of changing a partition mode that defines the logically divided state of the arithmetic unit 102 by setting to the arithmetic unit 102. Depending on how the arithmetic unit 102 is divided, the range of available hardware resources changes in the arithmetic operation, and the scale or accuracy of the combinatorial optimization problems solvable in each partition is determined.

In addition, how to divide each arithmetic unit 102, for example, which partition mode is set to each arithmetic unit 102, is settable in any manner.

Here, in an optimization device (Ising machine) for solving a combinatorial optimization problem, there is a case where it is required to solve problems related to different scale and requested accuracy. However, the optimization device in the related art is not configured to have only a single mode (the range of hardware resources used in the arithmetic operation is fixed), and to perform the optimum operation in accordance with the scale and the requested accuracy of the problem.

Therefore, in the optimization device of the related art, in a case where the scale or accuracy of the solvable problem is smaller than the maximum scale or accuracy of the problem solvable by hardware, the range searched by the hardware or memory size transferred by a direct memory access (DMA) method increases, and arithmetic operation time increases. For example, when the maximum scale of the problem solvable by hardware is "8192 bits (8 K)", in a case of solving the problem having the scale of "1024 bits (1 K)", the search range expands and unnecessary DMA transfer is performed, and thus, the arithmetic operation performance deteriorates.

Here, in the embodiment, an optimization problem arithmetic method for efficiently solving a combinatorial optimization problem by performing the arithmetic operation of the combinatorial optimization problem by the arithmetic unit 102 set to the partition mode that corresponds the scale or requested accuracy of the problem, among the plurality of arithmetic units 102 with different partition modes, will be described. Hereinafter, a processing example of the optimization problem arithmetic device 101 will be described.

(1) The optimization problem arithmetic device 101 accepts a combinatorial optimization problem. Here, the combinatorial optimization problem to be accepted is a problem that is a calculation target to be solved, for example, a problem designated by a user. In addition, an example of the combinatorial optimization problem will be described later with reference to FIG. 6.

(2) The optimization problem arithmetic device 101 determines the arithmetic unit 102 to which the combinatorial optimization problem is assigned, based on the scale or requested accuracy of the accepted combinatorial optimization problem and management information 110 of the plurality of arithmetic units 102.

Here, the scale of the combinatorial optimization problem is represented, for example, by the number of spin bits of the Ising model of the combinatorial optimization problem. The Ising model is a model that represents a behavior of the spin of a magnetic body. The arithmetic unit 102 calculates, for example, by replacing the problem that is the calculation target with the Ising model. In addition, the requested accuracy of the combinatorial optimization problem is represented by the number of bits of weighting factors indicating the magnitude of interaction between the bits.

The management information 110 is information on a partition mode that defines the logically divided state of each of the plurality of arithmetic units 102. The management information 110 includes, for example, the maximum scale or the maximum accuracy of problems solvable in each partition of the plurality of arithmetic units 102.

For example, with reference to the management information 110, the optimization problem arithmetic device 101 specifies the arithmetic unit 102 to which the partition mode capable of solving the problem having the scale equal to or larger than the scale of the combinatorial optimization problem is set. In addition, the optimization problem arithmetic device 101 may determine the arithmetic unit 102 having the smallest maximum scale of the solvable problem as the arithmetic unit 102 that assigns the combinatorial optimization problem, among the specified arithmetic units 102.

In addition, with reference to the management information 110, the optimization problem arithmetic device 101 may specify the arithmetic unit 102 to which the partition mode capable of solving the problem having the accuracy equal to or higher than the requested accuracy of the combinatorial optimization problem is set. In addition, the optimization problem arithmetic device 101 may determine the specified arithmetic unit 102 as the arithmetic unit 102 that assigns the combinatorial optimization problem.

In addition, the partition mode capable of solving the problem having equal to or higher than the requested accuracy of the combinatorial optimization problem is the partition mode in which the requested accuracy of the combinatorial optimization problem is within the range of the maximum accuracy of the solvable problem.

In addition, with reference to the management information 110, the optimization problem arithmetic device 101 is capable of specifying the problem having the scale equal to or larger than the scale of the combinatorial optimization problem, and may specify the arithmetic unit 102 to which the partition mode that is capable of solving the problem having the accuracy equal to or higher than the requested accuracy of the combinatorial optimization problem is set. In addition, the optimization problem arithmetic device 101 may determine the specified arithmetic unit 102 as the arithmetic unit 102 that assigns the combinatorial optimization problem.

In the example of FIG. 1, as the plurality of arithmetic units 102 coupled to the optimization problem arithmetic device 101, the arithmetic unit 102 ($1), the arithmetic unit 102 ($2), the arithmetic unit 102 ($3), and the arithmetic unit 102 ($4) are assumed. In addition, $1 to $4 are identifiers for identifying the arithmetic unit 102.

Here, in accordance with the scale of the combinatorial optimization problem (problems 111 to 114), a case where the arithmetic unit 102 to which the combinatorial optimization problem is assigned is determined will be described as an example.

The partition mode (8K) is set to the arithmetic unit 102 ($1). The partition mode (8K) is a partition mode which defines a state where the arithmetic unit 102 is logically made into one partition. The maximum scale of the solvable problem in the partition mode (8K) is "8192 bits (8 K)".

The partition mode (4K) is set to the arithmetic unit 102 ($2). The partition mode (4K) is a partition mode which defines a state where the arithmetic unit 102 is logically divided into two partitions. The maximum scale of the problem solvable in the partition mode (4K) is "4096 bits (4 K)".

The partition mode (2K) is set to the arithmetic unit 102 ($3). The partition mode (2K) is a partition mode which defines a state where the arithmetic unit 102 is logically divided into four partitions. The maximum scale of the problem solvable in the partition mode (2K) is "2048 bits (2 K)".

The partition mode (1K) is set to the arithmetic unit 102 ($4). The partition mode (1K) is a partition mode which defines a state where the arithmetic unit 102 is logically divided into eight partitions. The maximum scale of the problem solvable in the partition mode (1K) is "1024 bits (1 K)".

First, the problem 111 is a combinatorial optimization problem having the scale of "4096 bits (4 K)". In this case, with reference to the management information 110, the optimization problem arithmetic device 101 specifies the arithmetic units 102 ($1 and $2) to which the partition mode that is capable of solving the problem having the scale equal to or larger than the scale of the problem 111 is set. In addition, the optimization problem arithmetic device 101 may determine the arithmetic unit 102 ($2) having the smallest maximum scale of the solvable problem as the arithmetic unit 102 to which the problem 111 is assigned, among the specified arithmetic units 102 ($1 and $2).

Next, the problem 112 is a combinatorial optimization problem having the scale of "8192 bits (8 K)". In this case, with reference to the management information 110, the optimization problem arithmetic device 101 specifies the arithmetic unit 102 ($1) to which the partition mode that is capable of solving the problem having the scale equal to or larger than the scale of the problem 112 is set. In addition, the optimization problem arithmetic device 101 may determine the specified arithmetic unit 102 ($1) as the arithmetic unit 102 to which the problem 112 is assigned.

Next, the problem 113 is a combinatorial optimization problem having the scale of "1024 bits (1 K)". In this case, with reference to the management information 110, the optimization problem arithmetic device 101 specifies the arithmetic units 102 ($1, $2, $3, and $4) to which the partition mode that is capable of solving the problem having the scale equal to or larger than the scale of the problem 113 is set. In addition, the optimization problem arithmetic device 101 determines the arithmetic unit 102 ($4) having the smallest maximum scale of the solvable problem as the arithmetic unit 102 to which the problem 113 is assigned, among the specified arithmetic units 102 ($1, $2, $3, and $4).

Next, the problem 114 is a combinatorial optimization problem having the scale of "2048 bits (2 K)". In this case, with reference to the management information 110, the optimization problem arithmetic device 101 specifies the arithmetic units 102 ($1, $2, and $3) to which the partition mode that is capable of solving the problem having the scale equal to or larger than the scale of the problem 114 is set. In addition, the optimization problem arithmetic device 101 determines the arithmetic unit 102 ($3) having the smallest maximum scale of the solvable problem as the arithmetic unit 102 to which the problem 114 is assigned, among the specified arithmetic units 102 ($1, $2, and $3).

(3) Optimization problem arithmetic device 101 causes the determined arithmetic unit 102 to execute the arithmetic operation of the combinatorial optimization problem. For example, the optimization problem arithmetic device 101 executes the arithmetic operation of the combinatorial optimization problem by distributing the combinatorial optimization problem to the partition of the determined arithmetic unit 102.

In the example of FIG. 1, the optimization problem arithmetic device 101 causes the determined arithmetic unit 102 ($2) to execute the arithmetic operation of the problem 111. In addition, the optimization problem arithmetic device 101 causes the determined arithmetic unit 102 ($1) to execute the arithmetic operation of the problem 112. Further, the optimization problem arithmetic device 101 causes the determined arithmetic unit 102 ($4) to execute the arithmetic operation of the problem 113. In addition, the optimization problem arithmetic device 101 causes the determined arithmetic unit 102 ($3) to execute the arithmetic operation of the problem 114.

Therefore, according to the optimization problem arithmetic device 101, it is possible to perform the arithmetic operation of the combinatorial optimization problem by the arithmetic unit 102 set to the partition mode that corresponds the scale or requested accuracy of the problem, among the plurality of arithmetic units 102 with different partition modes. For example, in the optimization problem arithmetic device 101, it is possible to select the arithmetic unit 102 that corresponds to the scale or requested accuracy of the problem, after grasping the partition modes of each of the plurality of arithmetic units 102.

Accordingly, in accordance with the scale or requested accuracy of the problem, it is possible to appropriately select the range of hardware resources used in the arithmetic operation, and it is possible to enhance the arithmetic operation performance and to achieve high speed of the arithmetic processing.

In the example of FIG. 1, it is possible to perform the arithmetic operation with respect to each of the problems 111 to 114 by the arithmetic unit 102 to which the partition mode that corresponds to the scales of each of the problems 111 to 114 is set. Accordingly, in accordance with the scales of each of the problems 111 to 114, it is possible to solve each of the problems 111 to 114 in the partition mode of the smallest possible scale, and to enhance the arithmetic operation performance while suppressing unnecessary DMA transfer and the like.

Figure 2:
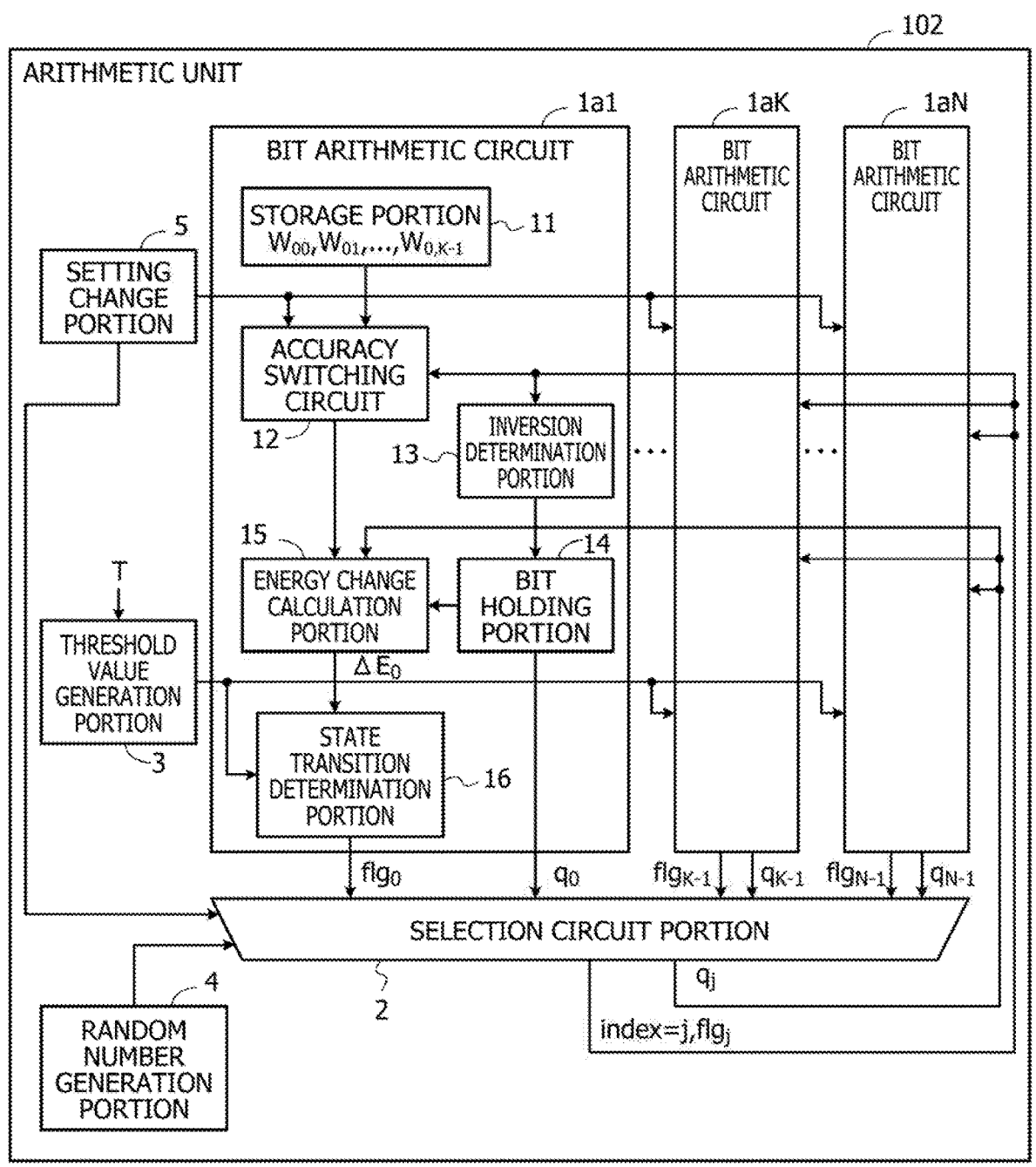
FIG. 2 is an explanatory diagram illustrating one Example of an arithmetic unit.

FIG. 2 is an explanatory diagram illustrating one Example of the arithmetic unit 102. In FIG. 2, the arithmetic unit 102 searches for values (ground state) of each bit when the energy function becomes the minimum value, among combinations (states) of respective values of the plurality of bits (spin bits) that correspond to a plurality of spins included in the Ising model obtained by converting the problem (combinatorial optimization problem) that is the calculation target.

The Ising-type energy function E(x) is defined by, for example, the following equation (1).

$$E(x) = -\sum_{<i,j>} W_{ij} x_i x_j - \sum_i b_i x_i \qquad (1)$$

The first term on the right side is the integration of the products of the values (0 or 1) of two bits and the coupling factors without leakage and duplication, for all the combinations of two bits selectable from all the bits included in the Ising model. The total number of bits included in the Ising model is assumed to be K (K is an integer of 2 or more). In addition, each of i and j is an integer of 0 or more and K−1 or less. $x_i$ is a variable (also referred to as a state variable) that represents a value of the i-th bit. $x_j$ is a variable that represents a value of the j-th bit. $W_{ij}$ is a weighting factor indicating the magnitude of interaction between the i-th and j-th bits. In addition, $W_{ii}$=0. Further, $W_{ij}$=$W_{ji}$ in many cases (for example, the coefficient matrix by the weighting factors is a symmetric matrix in many cases).

The second term on the right side is the sum of the products of respective bias coefficients of all the bits and the values of the bits. $b_i$ indicates the bias coefficient of the i-th bit.

In addition, when the value of the variable $x_i$ changes to 1-$x_i$, the increment of the variable $x_i$ is represented as $\Delta x_i$=(1−$x_i$)−$x_i$=1−2$x_i$. Therefore, an energy change $\Delta E_i$ associated with the spin inversion (value change) is represented by the following equation (2).

$$\Delta E_i = E(x)|_{x_i \to 1-x_i} - E(x) \qquad (2)$$
$$= -\Delta x_i \left( \sum_j W_{ij} x_j + b_i \right)$$
$$= -\Delta x_i h_i$$
$$= \begin{cases} -h_i & (\text{for } x_i = 0 \to 1) \\ +h_i & (\text{for } x_i = 1 \to 0) \end{cases}$$

$h_i$ is referred to as a local field, and is represented by the following equation (3).

$$h_i = \sum_j W_{ij} x_j + b_i \qquad (3)$$

The energy change $\Delta E_i$ is obtained by multiplying the local field $h_i$ by a reference numeral (+1 or −1) in accordance with $\Delta x_i$. A variation $\Delta h_i$ of the local field $h_i$ is represented by the following equation (4).

$$\Delta h_i = \begin{cases} +W_{ij} & (\text{for } x_j = 0 \to 1) \\ -W_{ij} & (\text{for } x_j = 1 \to 0) \end{cases} \qquad (4)$$

The process of updating the local field $h_i$ when a certain variable $x_j$ changes is performed in parallel.

The arithmetic unit 102 is, for example, a one-chip semiconductor integrated circuit, and is realized using a field programmable gate array (FPGA) or the like. The arithmetic unit 102 includes bit arithmetic circuits 1a1, ..., 1aK, ..., and 1aN (a plurality of bit arithmetic circuits), a selection circuit portion 2, a threshold value generation portion 3, a random number generation portion 4, and a setting change portion 5. Here, N is the total number of bit arithmetic circuits included in the arithmetic unit 102. N is an integer equal to or greater than K. Identification information (index=0, ..., K−1, ..., and N−1) is associated with each of the bit arithmetic circuits 1a1, ..., 1aK, ..., and 1aN.

The bit arithmetic circuits 1a1, ..., 1aK, ..., and 1aN are unit elements which provide one bit included in a bit string that represents the state of the Ising model. The bit string may be referred to as a spin bit string or a state vector. Each of the bit arithmetic circuits 1a1, ..., 1aK, ..., and 1aN stores the weighting factors between the own bit and other bits, determines inversion availability of the own bit that corresponds to the inversion of the other bits based on the weighting factor, and outputs a signal indicating inversion availability of the own bit to the selection circuit portion 2.

The selection circuit portion 2 selects a bit to be inverted (inverted bit) in the spin bit string. For example, the selection circuit portion 2 accepts the signal indicating inversion availability, which is output from each of the bit arithmetic circuits 1a1, ..., 1aK, ..., and 1aN used for searching for the ground state of the Ising model among the bit arithmetic circuits 1a1, ..., and 1aK. The selection circuit portion 2 preferentially selects one bit that corresponds to the bit arithmetic circuit that has output the signal indicating that the inversion is possible among the bit arithmetic circuits 1a1, ..., and 1aK, and considers the selected bit as the inverted bit. For example, the selection circuit portion 2 selects the inverted bit based on the random number bit output from the random number generation portion 4. The selection circuit portion 2 outputs a signal indicating the selected inverted bit to the bit arithmetic circuits 1a1, ..., and 1aK. The signal indicating the inverted bit includes a signal indicating identification information (index=j) of the inverted bit, a flag ($flg_j$=1) indicating inversion availability, and a current value $q_j$ (the value before the current inversion) of the inverted bit. However, there are also cases where none of the bits are inverted. In a case where none of the bits is inverted, the selection circuit portion 2 outputs $flg_j$=0.

The threshold value generation portion 3 generates a threshold value used when determining the inversion availability of the bit, for each of the bit arithmetic circuits $1a1, \ldots, 1aK, \ldots,$ and $1aN$. A signal indicating the threshold value is output to each of the bit arithmetic circuits $1a1, \ldots, 1aK, \ldots,$ and $1aN$. As will be described later, the threshold value generation portion 3 uses a parameter (temperature parameter) T indicating a temperature and a random number to generate a threshold value. The threshold value generation portion 3 has a random number generator that generates the random number. It is preferable that the threshold value generation portion 3 has the random number generators individually for each of the bit arithmetic circuits $1a1, \ldots, 1aK, \ldots,$ and $1aN$, and generates and supplies the threshold values individually. However, the threshold value generation portion 3 may share the random number generator with a predetermined number of bit arithmetic circuits.

The random number generation portion 4 generates a random number bit and outputs the generated random number bit to the selection circuit portion 2. The random number bit generated by the random number generation portion 4 is used for the selection of the inverted bit by the selection circuit portion 2.

The setting change portion 5 changes the first bit number (number of spin bits) of the bit string (spin bit string) that represents the state of the Ising model that is the calculation target among the bit arithmetic circuits $1a1, \ldots, 1aK, \ldots,$ and $1aN$. In addition, the setting change portion 5 changes the second bit number of the weighting factor for each of the bit arithmetic circuits of the first bit number.

Here, the first bit number (number of spin bits) corresponds to the scale of the problem (combinatorial optimization problem). The second bit number (the number of bits of the weighting factors) corresponds to the accuracy of the problem. The first bit number (number of spin bits) and the second bit number (the number of bits of the weighting factors) are set in advance, for example, in accordance with the partition mode. In addition, the optimization problem arithmetic device 101 may set any partition mode by controlling the setting of the setting change portion 5 for the first and second bit numbers.

Next, a circuit configuration of the bit arithmetic circuit will be described. The bit arithmetic circuit $1a1$ (index=0) will be mainly described, but other bit arithmetic circuits are also realized with the same circuit configuration (for example, with respect to an X-th (X is an integer of 1 or more and N or less) bit arithmetic circuit, index=X−1 may be satisfied).

The bit arithmetic circuit $1a1$ includes a storage portion 11, an accuracy switching circuit 12, an inversion determination portion 13, a bit holding portion 14, an energy change calculation portion 15, and a state transition determination portion 16.

The storage portion 11 is, for example, a register or a static random access memory (SRAM). The storage portion 11 stores the weighting factors between the own bit (here, a bit of index=0) and the other bits. Here, with respect to the number of spin bits (first bit number) K, the total number of weighting factors is $K^2$. In the storage portion 11, with respect to the bit of index=0, K weighting factors $W_{00}, W_{01}, \ldots,$ and $W_{0,K-1}$ are stored. Here, the weighting factor is represented by a second bit number L. Therefore, in the storage portion 11, K×L bits are required to store the weighting factor. In addition, the storage portion 11 may be provided outside the bit arithmetic circuit $1a1$ and inside the arithmetic unit 102 (the same is applied to the storage portions of the other bit arithmetic circuits).

The accuracy switching circuit 12 reads the weighting factor for the inverted bit from the own storage portion 11 (storage portion of the bit arithmetic circuit $1a1$) when any bit of the spin bit string is inverted, and outputs the read weighting factor to the energy change calculation portion 15. For example, the accuracy switching circuit 12 accepts the identification information of the inverted bit from the selection circuit portion 2, reads the weighting factor that corresponds to the set of the inverted bit from the storage portion 11 and the own bit, and outputs the weighting factor to the energy change calculation portion 15.

At this time, the accuracy switching circuit 12 reads the weighting factor represented by the second bit number set by the setting change portion 5. The accuracy switching circuit 12 changes the second bit number of the factor read from the storage portion 11 in accordance with the setting of the second bit number by the setting change portion 5.

For example, the accuracy switching circuit 12 has a selector that reads a bit string of a predetermined number of bits from the storage portion 11. In a case where the predetermined number of bits read by the selector is greater than the second bit number, the accuracy switching circuit 12 reads a unit bit string including the weighting factor that corresponds to the inverted bit by the selector, and extracts the weighting factor represented by the second bit number from the read unit bit string. Alternatively, in a case where the predetermined number of bits read by the selector is smaller than the second bit number, the accuracy switching circuit 12 combines the plurality of bit strings read by the selector to extract the weighting factor represented by the second bit number from the storage portion 11.

The inversion determination portion 13 accepts the signals indicating index=j and $flg_j$ output from the selection circuit portion 2 and determines whether the own bit is selected as the inverted bit based on the signals. In a case where the own bit is selected as the inverted bit (for example, index=j indicates the own bit and $flg_j$ indicates inversion availability), the inversion determination portion 13 inverts the bit stored in the bit holding portion 14. For example, in a case where the bit held by the bit holding portion 14 is 0, the bit is changed to 1. In addition, in a case where the bit held by the bit holding portion 14 is 1, the bit is changed to 0.

The bit holding portion 14 is a register that holds one bit. The bit holding portion 14 outputs the held bit to the energy change calculation portion 15 and the selection circuit portion 2.

The energy change calculation portion 15 calculates an energy change value $\Delta E_0$ of the Ising model using the weighting factor read from the storage portion 11 and outputs the calculated value to the state transition determination portion 16. For example, the energy change calculation portion 15 accepts the value of the inverted bit (the value before the current inversion) from the selection circuit portion 2, and $\Delta h_0$ is calculated by the above-described equation (4) in accordance with any inversion of the inverted bit from 1 to 0 or from 0 to 1. In addition, the energy change calculation portion 15 updates $h_0$ by adding $\Delta h_0$ to the previous $h_0$. The energy change calculation portion 15 has a register that holds $h_0$, and holds $h_0$ after the update by the register.

Furthermore, the energy change calculation portion 15 accepts the current own bit from the bit holding portion 14 and calculates the energy change value $\Delta E_0$ of the Ising model in a case where the own bit is inverted from 0 to 1 when the own bit is 0 and the own bit is inverted from 1 to 0 when the own bit is 1, by the above-described equation (2). The energy change calculation portion 15 outputs the calculated energy change value $\Delta E_0$ to the state transition determination portion 16.

The state transition determination portion 16 outputs a signal flg$_0$ indicating the inversion availability of the own bit to the selection circuit portion 2 in accordance with the calculation of the energy change by the energy change calculation portion 15. For example, the state transition determination portion 16 is a comparator that accepts the energy change value $\Delta E_0$ calculated by the energy change calculation portion 15, and determines the inversion availability of the own bit in accordance with the comparison with the threshold value generated by the threshold value generation portion 3. Here, the determination by the state transition determination portion 16 will be described.

In simulated annealing, when an allowable probability $p(\Delta E, T)$ of the state transition that causes a certain energy change $\Delta E$ is determined as in the following equation (5), it is known that the state reaches an optimal solution (ground state) at the limit of time (number of times of reiteration) of infinity.

$$p(\Delta E, T) = f\left(-\frac{\Delta E}{T}\right) \quad (5)$$

In the above-described equation (5), T is the above-described temperature parameter T. Here, as a function f, the following equation (6) (metropolis method) or the following equation (7) (Gibbs method) is used.

$$f_{metro}(x) = \min(1, e^x) \quad (6)$$

$$f_{Gibbs}(x) = \frac{1}{1 + e^{-x}} \quad (7)$$

The temperature parameter T is represented, for example, by the following equation (8). For example, the temperature parameter T is given by a function that decreases logarithmically with the number of times of reiteration t. For example, a constant c is determined in accordance with the problem.

$$T = \frac{T_0 \log(c)}{\log(t + c)} \quad (8)$$

Here, it is desirable that $T_0$ be an initial temperature value and be sufficiently high in accordance with the problem.

In a case of using the allowable probability $p(\Delta E, T)$ represented by the above-described equation (5), when a normal state is reached after sufficient reiteration of the state transition at a certain temperature, the state is generated according to the Boltzmann distribution. For example, the occupancy probability of each state follows the Boltzmann distribution for the thermal equilibrium state in thermodynamics. Accordingly, as the temperature gradually decreases such that a state according to the Boltzmann distribution at a certain temperature is generated, and then a state according to the Boltzmann distribution at a temperature lower than the temperature is generated, it is possible to follow the state according to the Boltzmann distribution at each temperature.

In addition, when the temperature is 0, the lowest energy state (ground state) is realized with high probability by the Boltzmann distribution at the temperature 0. Since the behavior is similar to a state change when annealing the material, the method is called simulated annealing. At this time, a case where the state transition in which energy increases probabilistically occurs corresponds to thermal excitation in physics.

For example, it is possible to realize a circuit that outputs a flag (flg=1) indicating that the state transition that causes the energy change $\Delta E$ with an allowance probability $p(\Delta E, T)$, by the comparator that outputs a value that corresponds to the comparison with the uniform random number u that takes $f(-\Delta E/T)$ and the value of interval [0, 1].

However, it is also possible to realize the same function even when the following modification is made. Even when the same monotonically increasing function acts on two numbers, the magnitude relationship does not change. Therefore, even when the same monotonically increasing function acts on two inputs of the comparator, the output of the comparator does not change. For example, it is possible to use $f^{-1}(u)$ in which $-\Delta E/T$ of $f^{-1}(-\Delta E/T)$ which is an inverse function $f^{-1}(-\Delta E/T)$ of $f(-\Delta E/T)$ as a monotonically increasing function that acts on $f(-\Delta E/T)$ and an $f(-\Delta E/T)$ as a monotonically increasing function that acts on a uniform random number u is u. In this case, a circuit having the same function as the above-described comparator may be a circuit that outputs 1 when $-\Delta E/T$ is greater than $f^{-1}(u)$. Furthermore, since the temperature parameter T is positive, the state transition determination portion 16 may be a circuit that outputs flg$_0$=1 when $-\Delta E$ is greater than $T \cdot f^{-1}(u)$ (or when $\Delta E$ is smaller than $-(T \cdot f^{-1}(u))$).

The threshold value generation portion 3 generates the uniform random number u, and outputs the value of $f^{-1}(u)$ using the conversion table for converting the value into the above-described value of $f^{-1}(u)$. In a case where the Metropolis method is applied, $f^{-1}(u)$ is given by the following equation (9). In addition, in a case where the Gibbs method is applied, $f^{-1}(u)$ is given by the following equation (10).

$$f_{metro}^{-1}(u) = \log(u) \quad (9)$$

$$f_{Gibbs}^{-1}(u) = \log\left(\frac{u}{1 - u}\right) \quad (10)$$

The conversion table is stored, for example, in a memory (not illustrated), such as a random access memory (RAM) or a flash memory coupled to the threshold value generation portion 3. The threshold value generation portion 3 outputs a product $(T \cdot f^{-1}(u))$ of the temperature parameter T and $f^{-1}(u)$ as a threshold value. Here, $T \cdot f^{-1}(u)$ corresponds to thermal excitation energy.

In addition, when flg$_j$ is input from the selection circuit portion 2 to the state transition determination portion 16 and the flg$_j$ indicates that the state transition is not permitted (for example, when no state transition occurs), the state transition determination portion 16 may perform comparison with the threshold value after adding the offset value to $-\Delta E_0$. Further, the state transition determination portion 16 may increase the offset value to be added in a case where the state transition continuously does not occur. Meanwhile, the state transition determination portion 16 sets the offset value to 0 when flg$_j$ indicates that the state transition is permitted (for example, when the state transition occurs). The addition of the offset value to $-\Delta E_0$ and the increase of the offset value make it easier to permit the state transition, and in a case where the current state is in the local solution, the escape from the local solution is promoted.

In this manner, in a case where the temperature parameter T is set to gradually decrease, for example, the value of the temperature parameter T is reduced by a predetermined number of times (or in a case where the temperature parameter T reaches the minimum value), the spin bit string is held by the bit arithmetic circuits $1a1, \ldots,$ and $1aK$. The arithmetic unit 102 outputs a spin bit string as a solution in a case where the value of the temperature parameter T is reduced by a predetermined number of times (or in a case where the temperature parameter T reaches the minimum value). The arithmetic unit 102 may include a control portion (not illustrated) that sets the weighting factor with respect to each of the storage portions of the temperature parameter T or the bit arithmetic circuits $1a1, \ldots,$ and $1aK$, and reads and outputs the spin bit string held by the bit arithmetic circuits $1a1, \ldots,$ and $1aK$.

In the arithmetic unit 102, the setting change portion 5 is capable of changing the number of spin bits (first bit number) of the Ising model and the number of bits of the weighting factors between the bits (second bit number). Here, the number of spin bits corresponds to the scale (the scale of the problem) of the circuit that realizes the Ising model. As the scale is larger, it is possible to apply the arithmetic unit 102 to a combinatorial optimization problem having a large number of combination candidates. In addition, the number of bits of the weighting factors corresponds to the accuracy (the accuracy of the condition expression in the problem) of the expression of the interrelationship between the bits. As the accuracy is higher, it is possible to set the condition for the energy change ΔE at the time of the spin inversion in detail. In one problem, there is a case where the number of spin bits is large and the number of bits that represents the weighting factors is small. Otherwise, in another problem, there is also a case where the number of spin bits is small and the number of bits that represents the weighting factors is large. Depending on the problem, it is inefficient to manufacture an optimization device appropriate for each problem individually.

Here, in the arithmetic unit 102, it is possible to set the number of spin bits that represents the state of the Ising model and the number of bits of the weighting factors by the setting change portion 5, and accordingly, it is possible to make the scale and accuracy variable. For example, it is possible to change the partition mode. As a result, in one arithmetic unit 102, it is possible to realize the scale and accuracy suitable for the problem.

For example, each of the bit arithmetic circuits $1a1, \ldots, 1aK, \ldots,$ and $1aN$ has the accuracy switching circuit, and by the accuracy switching circuit, the bit length of the weighting factor read from the own storage portion is switched in accordance with the setting of the setting change portion 5. In addition, the selection circuit portion 2 inputs a signal indicating an inverted bit into the number (corresponding to the number of spin bits set by the setting change portion 5, for example, K) of bit arithmetic circuits, and selects the inverted bit among the bits that correspond to the number (K) of bit arithmetic circuits. Accordingly, without individually manufacturing the optimization devices having the scale and accuracy that correspond to the problems, it is possible to realize the Ising model with the scale and accuracy that correspond to the problem by one arithmetic unit 102.

Here, as described above, the storage portion provided in each of the bit arithmetic circuits $1a1, \ldots,$ and $1aN$ is realized by a storage device having a relatively small capacity, such as an SRAM. Therefore, when the number of spin bits increases, it is also considered that the capacity of the storage portion is insufficient depending on the number of bits of the weighting factors. Meanwhile, according to the arithmetic unit 102, it is also possible to set the scale and accuracy so as to satisfy the capacity limitation of storage portion by the setting change portion 5. For example, it is considered that the setting change portion 5 is set to reduce the number of bits of the weighting factors as the number of spin bits increases. In addition, it is also considered that the setting change portion 5 is set to reduce the number of spin bits as the number of bits of the weighting factors increases.

Further, in the above-described example, K arithmetic circuits among the N bit arithmetic circuits are used for the Ising model. The arithmetic unit 102 may realize the same Ising model as the above-described Ising model by K bit arithmetic circuits among the remaining N−K bit arithmetic circuits in a case where N−K≥K, and may achieve high speed of calculation by increasing the degree of parallelism of the same problem process by both Ising models.

Furthermore, by using a part of the remaining N−K bit arithmetic circuits, the arithmetic unit 102 may realize other Ising models that correspond to other problems, and may perform the arithmetic operation of the other problems in parallel with the problem represented by the above-described Ising model.

Otherwise, the arithmetic unit 102 may not use the remaining N−K bit arithmetic circuits. In this case, the selection circuit portion 2 may forcibly set all the flags fig output by the remaining N−K bit arithmetic circuits to 0, and may select the bits that correspond to the remaining N−K bit arithmetic circuits as inversion candidates.

Next, a system configuration example of the information processing system 300 including the optimization problem arithmetic device 101 illustrated in FIG. 1 will be described.

Figure 3:
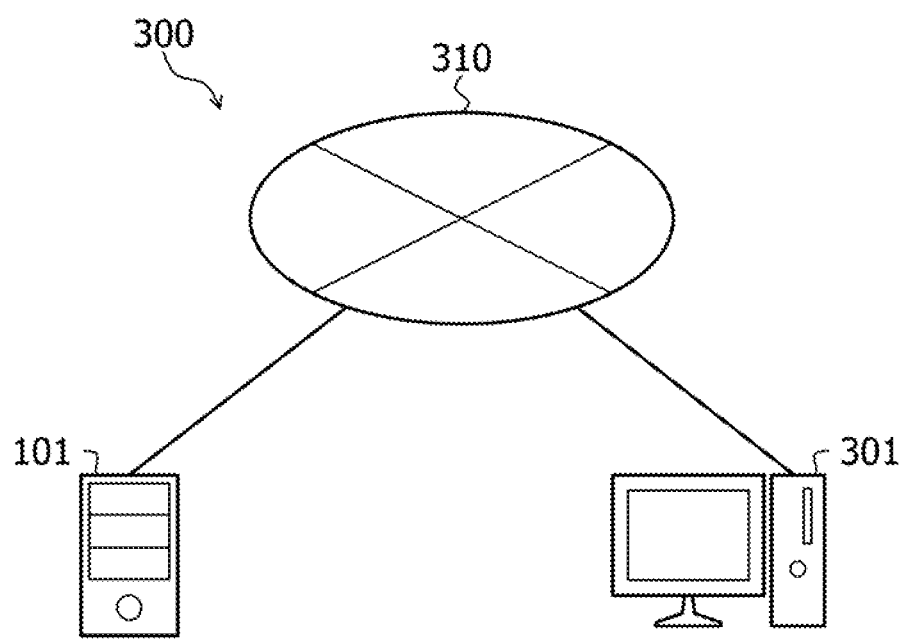
FIG. 3 is an explanatory diagram Illustrating a system configuration example of an information processing system.

FIG. 3 is an explanatory diagram illustrating the system configuration example of the information processing system 300. In FIG. 3, the information processing system 300 includes the optimization problem arithmetic device 101 and a client device 301. In the information processing system 300, the optimization problem arithmetic device 101 and the client device 301 are coupled to each other via a wired or wireless network 310. The network 310 is, for example, a local area network (LAN), a wide area network (WAN), the Internet, or the like.

The optimization problem arithmetic device 101 replaces the combinatorial optimization problem with an Ising model, and provides a function of solving the combinatorial optimization problem by searching for the ground state of the Ising model. The optimization problem arithmetic device 101 is, for example, a cloud computing server or an on-premises server.

In the following description, a case where the optimization problem arithmetic device 101 is applied to the cloud computing server will be described as an example unless otherwise specified.

The client device 301 is a client computer used by the user, and is used, for example, for an input of the problem to be solved by the user into the optimization problem arithmetic device 101. The client device 301 is, for example, a personal computer (PC), a tablet PC, or the like.

Figure 4:
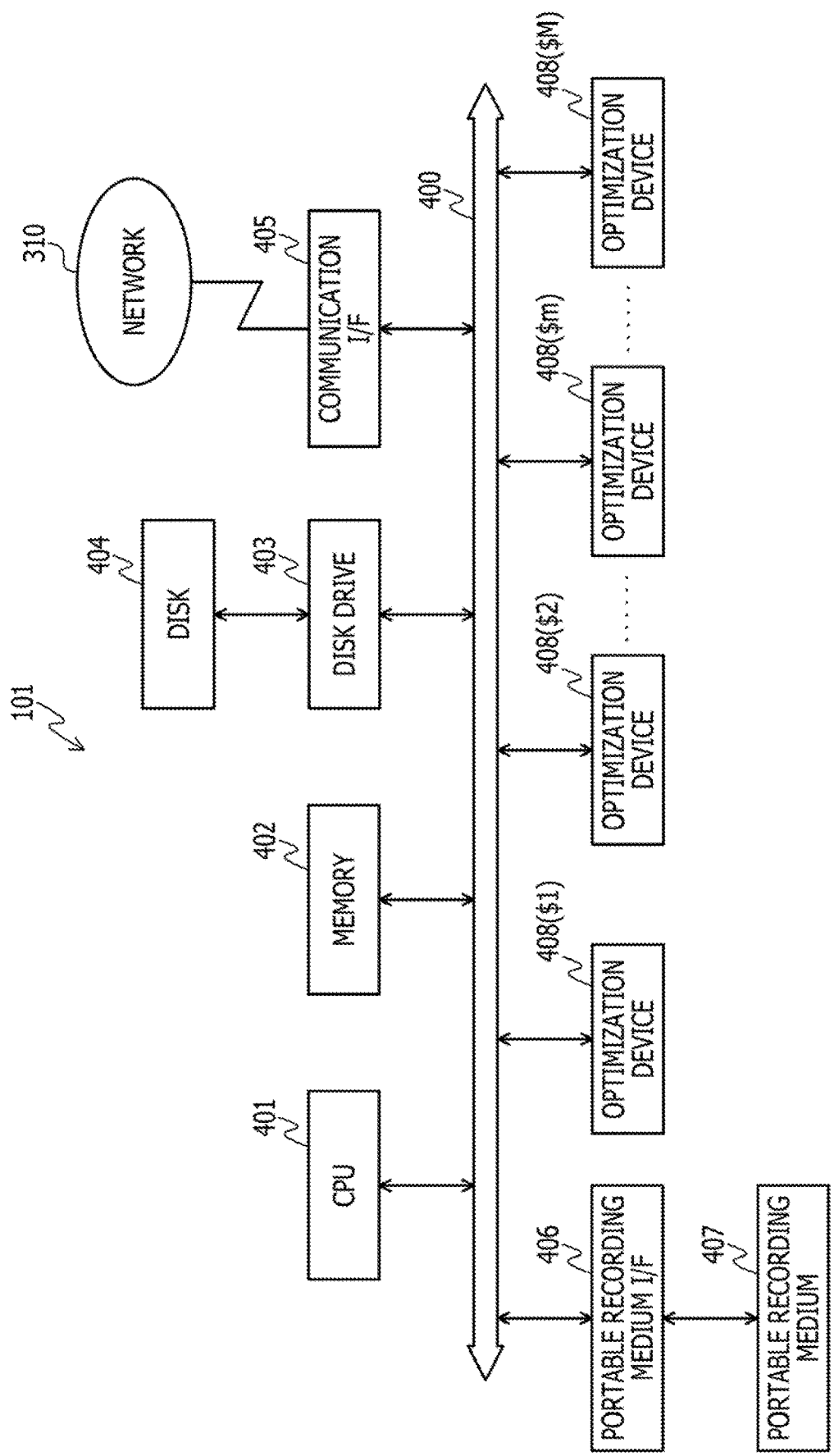
FIG. 4 is a block diagram Illustrating a hardware configuration example of an optimization problem arithmetic device.

FIG. 4 is a block diagram illustrating a hardware configuration example of the optimization problem arithmetic device 101. In FIG. 4, the optimization problem arithmetic device 101 includes a central processing unit (CPU) 401, a memory 402, a disc drive 403, a disc 404, a communication interface (I/F) 405, a portable recording medium I/F 406, a portable recording medium 407, and a plurality of optimization devices 408. In addition, each of the configuration portions is coupled to each other via a bus 400. The bus 400 is, for example, a peripheral component interconnect express (PCIe) bus.

Here, the CPU 401 is in charge of overall control of the optimization problem arithmetic device 101. The CPU 401 may have a plurality of cores. The memory 402 includes, for example, a read only memory (ROM), a RAM, and a flash ROM. For example, a flash ROM stores an operating system (OS) program, the ROM stores an application program, and the RAM is used as a work area of the CPU 401. The program stored in the memory 402 causes the CPU 401 to execute coded processing by being loaded into the CPU 401.

The disc drive 403 controls read and write of data from and to the disc 404 according to the control of the CPU 401. The disc 404 stores the data written under the control of the disc drive 403. Examples of the disc 404 include a magnetic disc and an optical disc.

The communication I/F 405 is coupled to the network 310 via a communication line, and is coupled to an external computer (for example, the client device 301 illustrated in FIG. 3) via the network 310. In addition, the communication I/F 405 functions as an interface between the network 310 and the inside of the device, and controls input and output of data from and to the external computer. As the communication I/F 405, for example, it is possible to adopt a modem, a LAN adapter, or the like.

The portable recording medium I/F 406 controls read and write of data from and to the portable recording medium 407 under the control of the CPU 401. The portable recording medium 407 stores the data written under the control of the portable recording medium I/F 406. Examples of the portable recording medium 407 include a compact disc (CD)-ROM, a digital versatile disk (DVD), a Universal Serial Bus (USB) memory, or the like.

The optimization device 408 searches for the ground state of the Ising model according to the control of the CPU 401. The optimization device 408 is an example of the arithmetic unit 102 illustrated in FIG. 1. $1 to $M are identifiers for identifying the optimization device 408 (M is a natural number of 2 or more). In the following description, there is a case where any one optimization device 408 among the optimization devices 408 ($1) to 408 ($M) may be denoted as "optimization device 408 ($j)" (j=1, 2, . . . , and M).

In addition, the optimization problem arithmetic device 101 may include, for example, a solid state drive (SSD), an input device, a display, and the like, in addition to the above-described configuration portions. Further, the optimization problem arithmetic device 101 may not include, for example, the disc drive 403, the disc 404, the portable recording medium I/F 406, and the portable recording medium 407 among the above-described configuration portions. In addition, the client device 301 illustrated in FIG. 3 includes, for example, a CPU, a memory, a communication I/F, an input device, a display, and the like.

Figure 5:
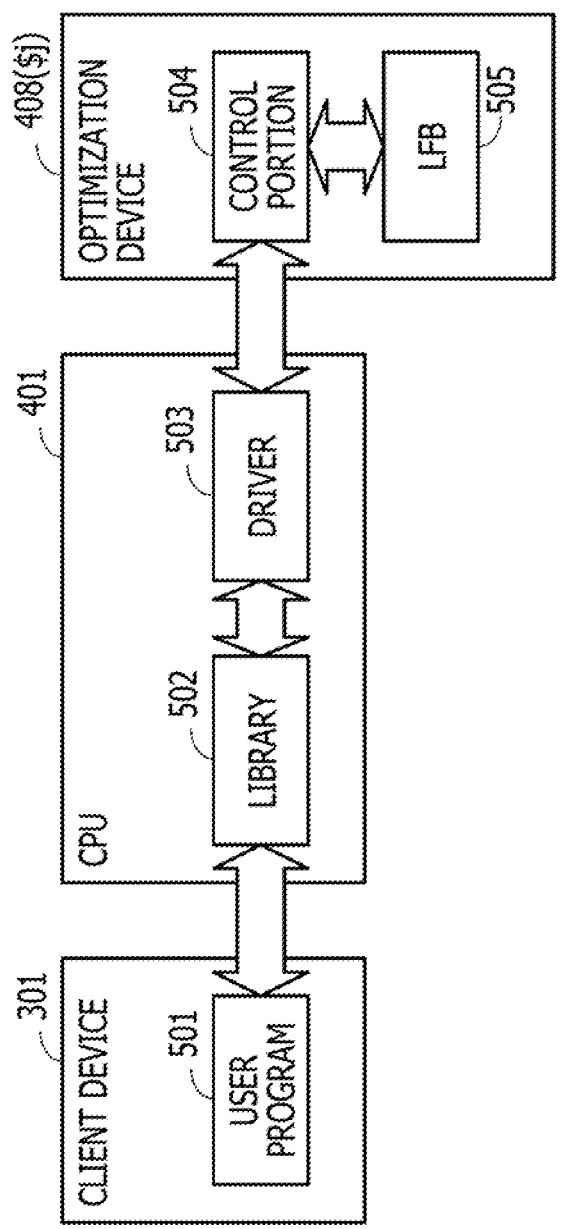
FIG. 5 is an explanatory diagram illustrating an example of a hardware relationship in the information processing system.

FIG. 5 is an explanatory diagram illustrating an example of a hardware relationship in the information processing system 300. In FIG. 5, the client device 301 executes a user program 501. The user program 501 inputs various pieces of data (for example, the contents of the problem to be solved and the operating conditions, such as the utilization schedule of the optimization device 408) into the optimization problem arithmetic device 101, displays the arithmetic operation result by the optimization device 408, and the like.

The CPU 401 is a processor (arithmetic operation portion) that executes a library 502 and a driver 503. The program of the library 502 and the program of the driver 503 are stored, for example, in the memory 402 (refer to FIG. 4).

The library 502 accepts various pieces of data input by the user program 501, and converts the problem to be solved by the user into the problem of searching for the lowest energy state of the Ising model. The library 502 provides the driver 503 with information (for example, the number of spin bits, the number of bits that represents the weighting factor, the value of the weighting factors, the initial value of the temperature parameter, and the like) on the problem after the conversion. In addition, the library 502 acquires the search result of the solution by the optimization device 408 ($j) from the driver 503, converts the search result into result information (for example, information of the result display screen) which is easy for the user to understand, and provides the user program 501 with the result information.

The driver 503 supplies the information provided from the library 502 to the optimization device 408 ($j). In addition, the driver 503 acquires the search result of the solution according to the Ising model from the optimization device 408 ($j), and provides the library 502 with the search result.

The optimization device 408 ($j) includes a control portion 504 and a local field block (LFB) 505 as hardware.

The control portion 504 includes a RAM that stores the operating condition of the LFB 505 accepted from the driver 503, and controls the arithmetic operation by the LFB 505 based on the operating condition. In addition, the control portion 504 also sets initial values in various registers included in the LFB 505, stores the weighting factors in the SRAM, and reads a spin bit string (search result) after completion of the arithmetic operation. The control portion 504 is realized by, for example, an FPGA.

The LFB 505 has a plurality of local field elements (LFE). The LFE is a unit element that corresponds to a spin bit. One LFE corresponds to one spin bit. As will be described below, the optimization device 408 ($j) has, for example, a plurality of LFBs.

Figure 6:
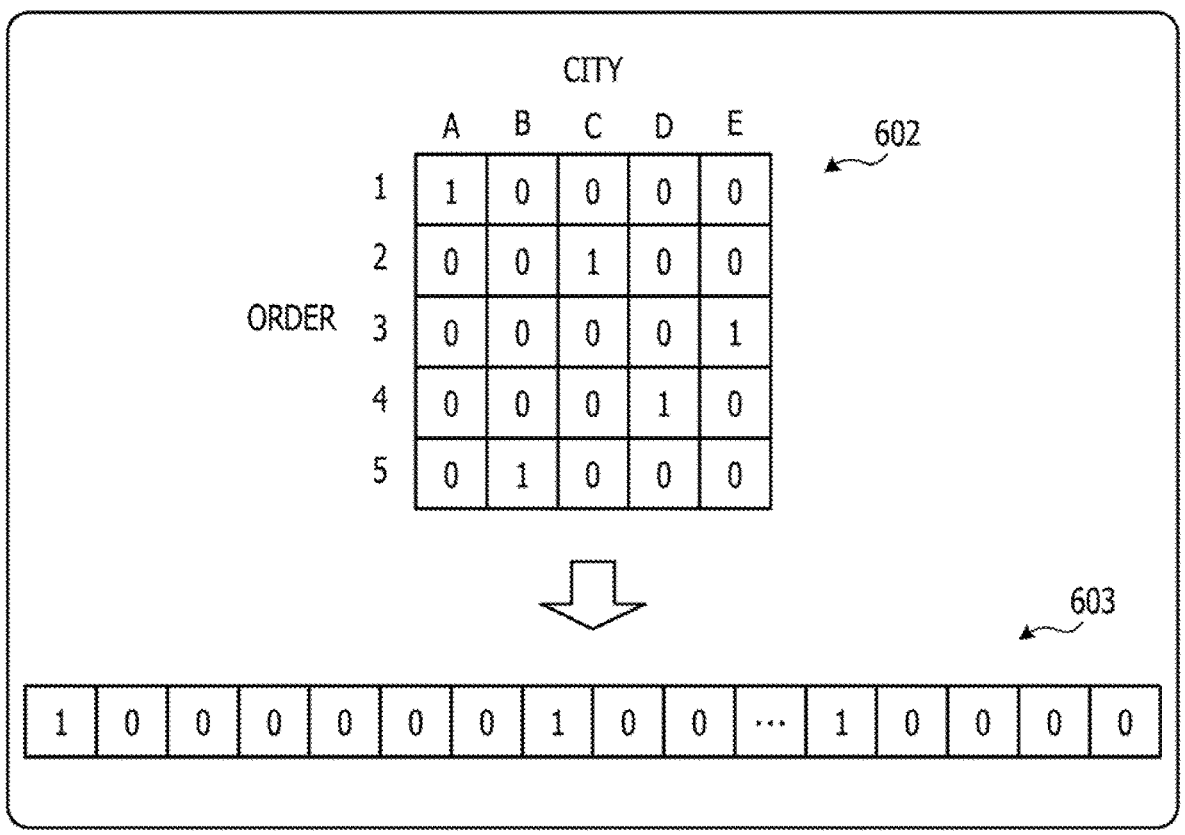
FIG. 6 is an explanatory diagram illustrating an example of a combinatorial optimization problem.

FIG. 6 is an explanatory diagram illustrating an example of the combinatorial optimization problem. As an example of the combinatorial optimization problem, a traveling salesman problem is considered. Here, it is assumed that a route is required to go around five cities, such as A city, B city, C city, D city, and E city, at the least cost (for example, distance or fare). A graph 601 illustrates one route with a city as a node and movement between the cities as an edge. The route is represented, for example, by a matrix 602 in which rows are associated with the traveling order and columns are associated with the cities. The matrix 602 illustrates the cities to travel for which the bit "1" is set, in ascending order of the rows.

Furthermore, the matrix 602 is convertible to binary values 603 that correspond to spin bit strings. In the example of the matrix 602, the binary value 603 is 5×5=25 bits. The number of bits of the binary value 603 (spin bit string) increases as the number of cities to travel increases. For example, as the scale of the combinatorial optimization problem increases, more spin bits are required, and the number of bits (scale) of the spin bit string increases.

Figure 7:
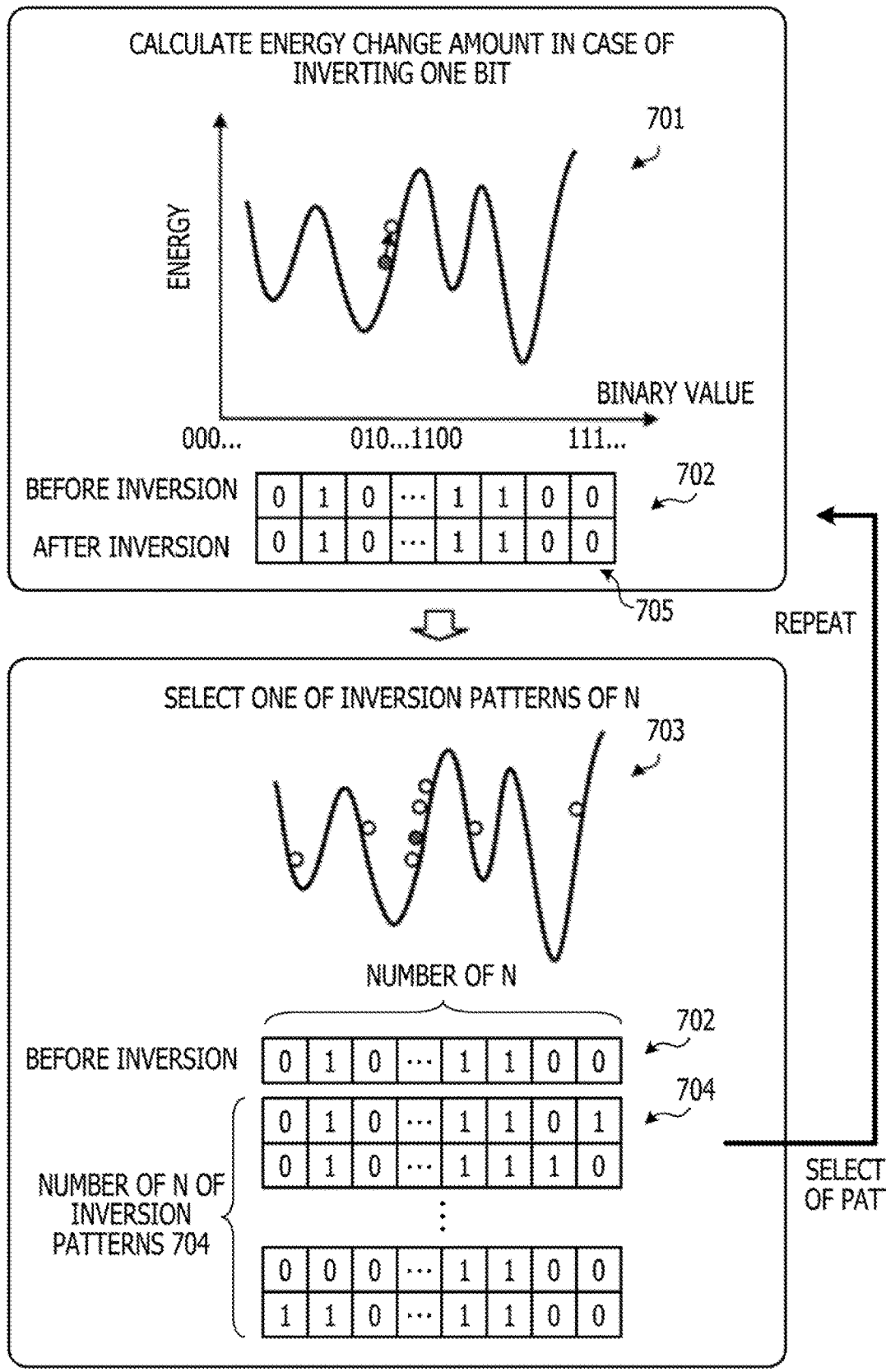
FIG. 7 is an explanatory diagram illustrating a search example of a binary value which is the minimum energy.

FIG. 7 is an explanatory diagram illustrating a search example of a binary value which is the minimum energy. In FIG. 7, first, the energy before inverting one bit of a binary value 702 (before the spin inversion) is taken as Emit.

The optimization device 408 calculates the energy change amount ΔE when inverting any one bit of the binary value 702. A graph 701 exemplifies an energy change with respect to 1-bit inversion that corresponds to the energy function while the horizontal shaft indicates a binary value and the vertical shaft indicates energy. The optimization device 408, for example, obtains ΔE by the above-described equation (2).

The optimization device 408 applies the above-described calculation to all the bits of the binary value 702 and calculates the energy change amount ΔE for each bit inversion. For example, when the number of bits of the binary value 702 is N, the number of inversion patterns 704 is N. The graph 701 exemplifies the state of energy change for each inversion pattern.

The optimization device 408 randomly selects one of the inversion patterns 704 that satisfies the inversion condition (the predetermined determination condition of the threshold value and ΔE) based on ΔE of each inversion pattern. The optimization device 408 adds or subtracts ΔE that corresponds to the selected inversion pattern to $E_{init}$ before the spin inversion to calculate an energy value E after the spin inversion. The optimization device 408 sets the obtained energy value E as $E_d$, and repeats the above-described procedure using the binary value 705 after the spin inversion.

Here, as described above, one element of W used in the above-described equations (2) and (3) is a weighting factor of spin inversion that indicates the magnitude of interaction between the bits. The number of bits that represents the weighting factor is referred to as accuracy. As the accuracy is higher, it is possible to set the condition for the energy change amount ΔE at the time of the spin inversion in detail. For example, the total size of W is "accuracy×the number of spin bits×the number of spin bits" for the entire combination of two bits included in the spin bit string. As an example, in a case where the number of spin bits is 8 K (=8192), the total size of W is "accuracy×8 K×8 K" bits.

Next, a circuit configuration example of the LFB 505 that performs the searching exemplified in FIG. 5 will be described. The optimization device 408 ($j$) has, for example, eight LFBs 505.

Figure 8:
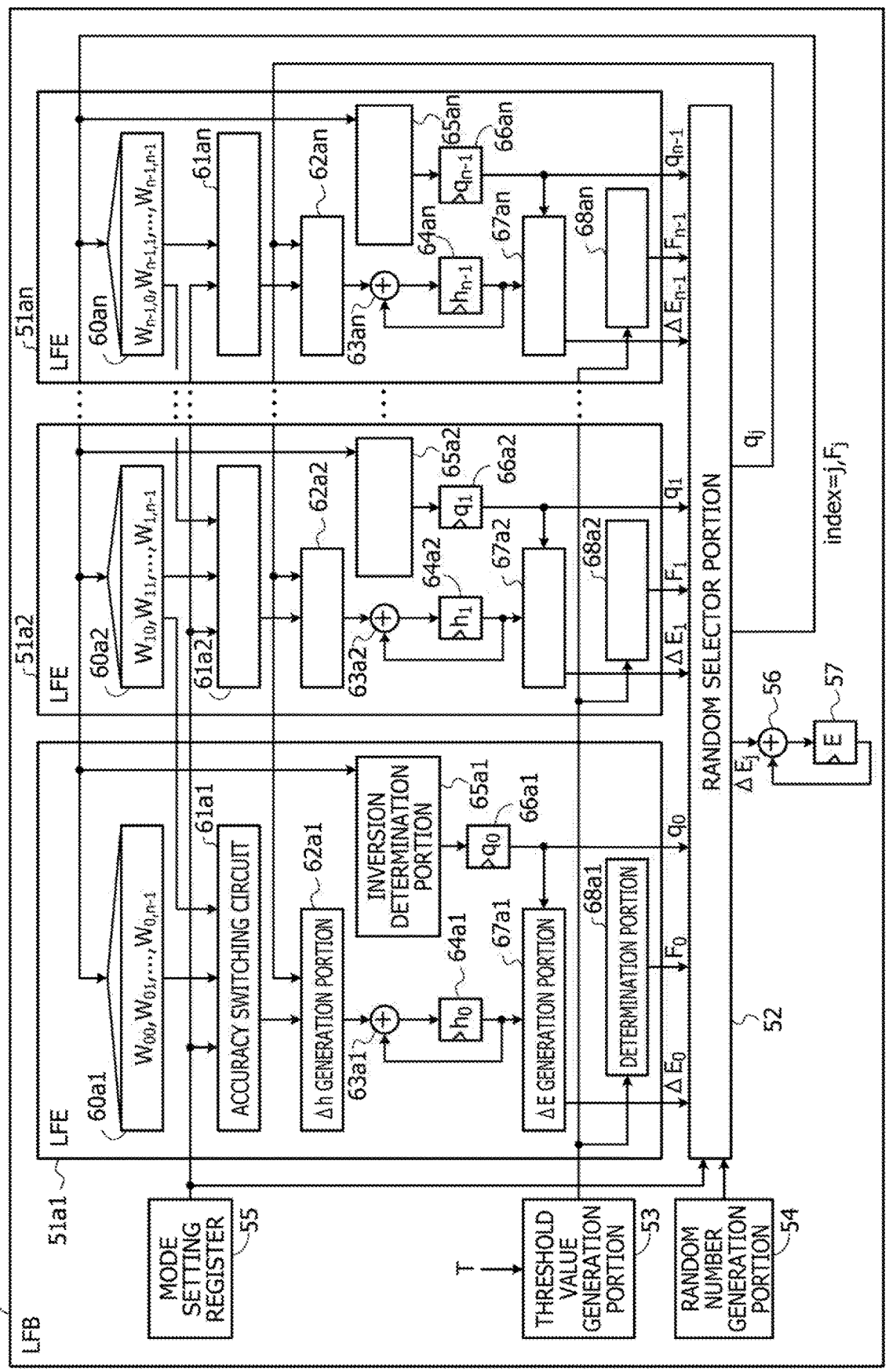
FIG. 8 is an explanatory diagram illustrating a circuit configuration example of an LFB.

FIG. 8 is an explanatory diagram illustrating a circuit configuration example of the LFB. In FIG. 8, the LFB 505 includes LFEs 51a1, 51a2, . . . , and 51an, a random selector portion 52, a threshold value generation portion 53, a random number generation portion 54, a mode setting register 55, an adder 56, and an E storage register 57.

Each of the LFEs 51a1, 51a2, . . . , and 51an is used as one bit of a spin bit. n is an integer of 2 or more and indicates the number of LFEs included in the LFB 505. Identification information (index) of the LFE is associated with each of the LFEs 51a1, 51a2, . . . , and 51an. For each of the LFEs 51a1, 51a2, . . . , and 51an, index=0, 1, . . . , and n−1. The LFEs 51a1, 51a2, . . . , and 51an are examples of the bit arithmetic circuits 1a1, . . . , and 1aN illustrated in FIG. 2.

A circuit configuration of the LFE 51a1 will be described below. The LFEs 51a2, . . . , and 51an are also realized by the same circuit configuration as the LFE 51a1. For the description of the circuit configuration of the LFEs 51a2, . . . , and 51an, the "a1" part at the end of the reference numerals of each element in the following description may be substituted and replaced with each of "a2", . . . , and "an" (for example, reference numeral "60a1" may be replaced with "60an"). In addition, for the subscripts of the respective values, such as h, q, ΔE, and W, may be substituted and replaced with subscripts that correspond to each of "a2", . . . , and "an".

The LFE 51a1 includes an SRAM 60a1, an accuracy switching circuit 61a1, a Δh generation portion 62a1, an adder 63a1, an h storage register 64a1, an inversion determination portion 65a1, a bit storage register 66a1, a ΔE generation portion 67a1, and a determination portion 68a1.

The SRAM 60a1 stores a weighting factor W. The SRAM 60a1 corresponds to the storage portion 11 illustrated in FIG. 2. In the SRAM 60a1, among the weighting factors W of all the spin bits, only the part used by the LFE 51a1 is stored. Therefore, assuming that the number of spin bits is K (K is an integer of 2 or more and n or less), the size of all the weighting factors stored in the SRAM 60a1 is "accuracy×K" bits. For example, FIG. 8 exemplifies a case where the number of spin bits K=n. In this case, the weighting factors $W_{00}$, $W_{01}$, . . . , and $W_{0,n-1}$ are stored in the SRAM 60a1.

The accuracy switching circuit 61a1 acquires an index which is identification information of an inverted bit and a flag F indicating that inversion is possible, from the random selector portion 52, and extracts a weighting factor that corresponds to the inverted bit from the SRAM 60a1. The accuracy switching circuit 61a1 outputs the extracted weighting factor to the Δh generation portion 62a1. For example, the accuracy switching circuit 61a1 may acquire the index and the flag F which are stored in the SRAM 60a1 by the random selector portion 52, from the SRAM 60a1. Otherwise, the accuracy switching circuit 61a1 may have a signal line that accepts the supply of the index and the flag F from the random selector portion 52 (not illustrated).

Here, the accuracy switching circuit 61a1 accepts the setting of the number of bits (accuracy) of the weighting factor set in the mode setting register 55, and switches the number of bits of the weighting factor read from the SRAM 60a1 in accordance with the setting.

For example, the accuracy switching circuit 61a1 has a selector that reads a bit string (unit bit string) of a predetermined number of unit bits from the SRAM 60a1. The accuracy switching circuit 61a1 reads the unit bit string of the number r of bits including the weighting factor that corresponds to the inverted bit by the selector. For example, in a case where the unit number of bits r read by the selector is greater than the number of bits z of the weighting factor, the accuracy switching circuit 61a1 reads the weighting factor by shifting the bit part indicating the weighting factor that corresponds to the inverted bit to a least significant bit (LSB) side for the read bit string, substitutes 0 to the other bit parts, and accordingly reads the weighting factor. Otherwise, a case where the unit number of bits r is smaller than the number of bits z set by the mode setting register 55, is also considered. In this case, the accuracy switching circuit 61a1 may extract the weighting factor with the set number of bits z by combining the plurality of unit bit strings read by the selector.

In addition, the accuracy switching circuit 61a1 is also coupled to the SRAM 60a2 included in the LFE 51a2. As will be described later, the accuracy switching circuit 61a1 is also capable of reading the weighting factor from the SRAM 60a2.

The Δh generation portion 62a1 accepts the current bit value (bit value before the current inversion) of the inverted bit from the random selector portion 52, and using the weighting factor acquired from the accuracy switching circuit 61a1, calculates the change amount $\Delta h_0$ of the local field $h_0$ by the above-described equation (4). The Δh generation portion 62a1 outputs $\Delta h_0$ to the adder 63a1.

The adder 63a1 adds $\Delta h_0$ to the local field $h_0$ stored in the h storage register 64a1, and outputs the result to the h storage register 64a1.

The h storage register 64a1 takes in the value (local field $h_0$) output from the adder 63a1 in synchronization with a clock signal (not illustrated). The h storage register 64a1 is, for example, a flip flop. In addition, the initial value of the local field $h_0$ stored in the h storage register 64a1 is the bias coefficient $b_0$. The initial value is set by the control portion 504.

The inversion determination portion 65a1 accepts the index=j of the inverted bit and the flag $F_j$ indicating inversion availability, from the random selector portion 52, and determines whether the own bit is selected as the inverted bit. In a case where the own bit is selected as the inverted bit, the inversion determination portion 65a1 inverts the spin bit stored in the bit storage register 66a1.

The bit storage register 66a1 holds the spin bits that correspond to the LFE 51a1. The bit storage register 66a1 is, for example, a flip flop. The spin bits stored in the bit storage register 66a1 are inverted by the inversion determination portion 65a1. The bit storage register 66a1 outputs the spin bits to the ΔE generation portion 67a1 and the random selector portion 52.

The ΔE generation portion 67a1 calculates the energy change amount $\Delta E_0$ of the Ising model that corresponds to the inversion of the own bit based on the local field $h_0$ of the h storage register 64a1 and the spin bits of the bit storage register 66a1, by the above-described equation (2). The ΔE generation portion 67a1 outputs the energy change amount $\Delta E_0$ to the determination portion 68a1 and the random selector portion 52.

The determination portion 68a1 compares the energy change amount $\Delta E_0$ output by the ΔE generation portion 67a1 with the threshold value generated by the threshold value generation portion 53 to output the flag $F_0$ indicating whether to permit the inversion of the own bit (indicating inversion availability of the own bit), to the random selector portion 52. For example, the determination portion 68a1 outputs $F_0=1$ (invertible) when $\Delta E_0$ is smaller than the threshold value $-(T \cdot f^{-1}(u))$, and $F_0=0$ (not invertible) is output when $\Delta E_0$ is equal to or greater than the threshold value $-(T \cdot f^{-1}(u))$. Here, $f^{-1}(u)$ is a function given by either of the above-described equations (9) and (10) in accordance with the application law. In addition, u is a uniform random number in the interval [0, 1].

The random selector portion 52 accepts an energy change amount, a flag indicating the inversion availability of the spin bit, and the spin bits, from each of the LFEs 51a1, 51a2, ..., and 51an, and selects an inverted bit among the invertible spin bits.

The random selector portion 52 supplies the current bit value (bit $q_j$) of the selected inverted bit to the Δh generation portions 62a1, 62a2, ..., and 62an included in the LFEs 51a1, 51a2, ..., and 51an. The random selector portion 52 is an example of the selection circuit portion 2 illustrated in FIG. 2.

The random selector portion 52 outputs the inverted bit index=j and the flag $F_j$ indicating the inversion availability, to the SRAMs 60a1, 60a2, ..., and 60an included in the LFEs 51a1, 51a2, ..., and 51an. In addition, the random selector portion 52 may output the inverted bit index=j and the flag $F_j$ indicating the inversion availability, to the accuracy switching circuits 61a1, 61a2, ..., and 61an included in the LFEs 51a1, 51a2, ..., and 51an.

Further, the random selector portion 52 supplies the inverted bit index=j and the flag $F_j$ indicating the inversion availability, to the inversion determination portions 65a1, 65a2, ..., and 65an included in the LFEs 51a1, 51a2, ..., and 51an. Furthermore, the random selector portion 52 supplies $\Delta E_j$ that corresponds to the selected inverted bit, to the adder 56.

Here, the random selector portion 52 accepts the setting of the number of spin bits (for example, the number of LFEs to be used) in a certain Ising model, from the mode setting register 55. For example, the random selector portion 52 searches for a solution using a number of LFEs that corresponds to the set number of spin bits in order from the smaller index. For example, in a case of using K LFEs among n LFEs, the random selector portion 52 selects an inverted bit from the spin bit string that corresponds to the LFE of the LFEs 51a1, ..., and LFE 51aK. At this time, it is considered that the random selector portion 52 forcibly sets, for example, the flag F output from each of the n–K LFEs 51a (K–1), ..., and 51an that are not used, to 0.

The threshold value generation portion 53 generates and supplies a threshold value used for comparison with the energy change amount ΔE with respect to the determination portions 68a1, 68a2, ..., and 68an included in the LFEs 51a1, 51a2, ..., and 51an. As described above, the threshold value generation portion 53 generates a threshold value using the temperature parameter T, the uniform random number u in the interval [0, 1], and $f^{-1}(u)$ indicated by the above-described equation (9) or the above-described equation (10). The threshold value generation portion 53 has, for example, a random number generator individually for each LFE, and generates a threshold value using the random number u for each LFE. However, some LFEs may share the random number generator. The control portion 504 controls the initial value of the temperature parameter T, the decrease cycle or decrease amount of the temperature parameter T in the simulated annealing, and the like.

The random number generation portion 54 generates a random number bit used for selecting an inverted bit in the random selector portion 52, and supplies the generated random number bit to the random selector portion 52.

The mode setting register 55 supplies a signal indicating the number of bits of the weighting factors (for example, the accuracy of the problem) to the accuracy switching circuits 61a1, 61a2, ..., and 61an included in the LFEs 51a1, 51a2, ..., and 51an. In addition, the mode setting register 55 supplies a signal indicating the number of spin bits (for example, the scale of the problem) to the random selector portion 52. The control portion 504 sets the number of spin bits or the number of bits of weighting factors for the mode setting register 55. The mode setting register 55 is an example of the setting change portion 5 illustrated in FIG. 2.

The adder 56 adds the energy change amount $\Delta E_j$ output by the random selector portion 52 to the energy value E stored in the E storage register 57, and outputs the energy value E to the E storage register 57.

The E storage register 57 takes in the energy value E output by the adder 56 in synchronization with a clock signal (not illustrated). The E storage register 57 is, for example, a flip flop. In addition, the initial value of the energy value E is calculated by the control portion 504 using the above-described equation (1), and is set to the E storage register 57.

For example, in a case where K LFEs are used to search for a solution, the control portion 504 obtains a spin bit string by reading each spin bit of the bit storage registers 66a1, ..., and 66aK.

Figure 9:
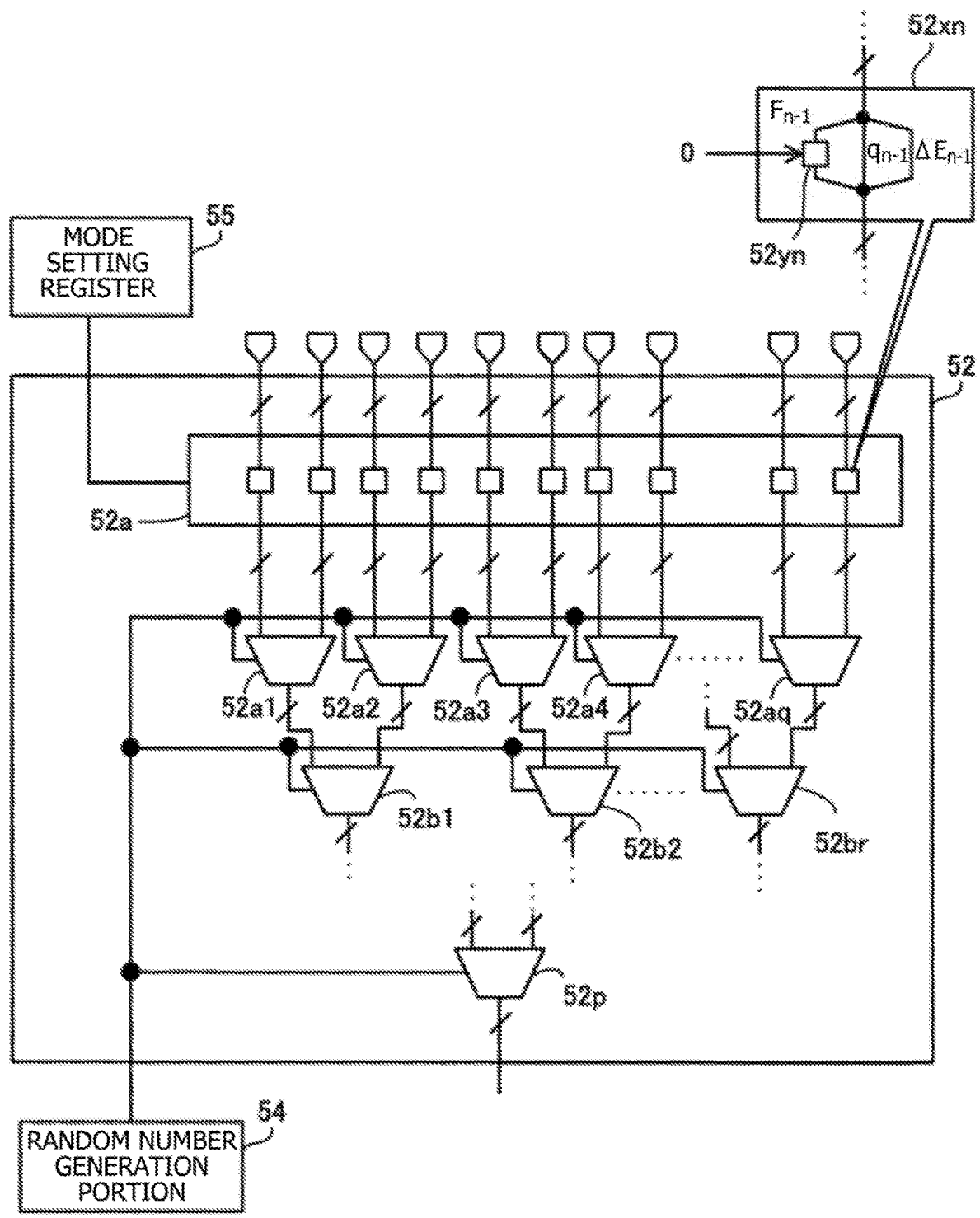
FIG. 9 is an explanatory diagram illustrating a circuit configuration example of a random selector portion.

FIG. 9 is an explanatory diagram illustrating a circuit configuration example of a random selector portion. In FIG. 9, the random selector portion 52 includes a flag control portion 52a and a plurality of selection circuits coupled in a tree shape across a plurality of stages.

The flag control portion 52a controls the value of the flag input into each of selection circuits 52a1, 52a2, 52a3, 52a4, ..., and 52aq in the first stage in accordance with the setting of the number of spin bits in the mode setting register 55. FIG. 9 exemplifies a partial circuit 52xn that controls the value of the flag for one input (corresponding to the output of the LFE 51an) of the selection circuit 52aq. A flag setting portion 52yn of the partial circuit 52xn is a switch that forcibly sets the flag Fn output from the LFE 51an that is not used, to 0.

Sets of variables $q_i$, $F_i$, and $\Delta E_i$ output from each of the LFEs 51a1, 51a2, . . . , and 51an are input into each of the selection circuits 52a1, 52a2, 52a3, 52a4, . . . , and 52aq in the first stage, two at a time. For example, a set of variables $q_0$, $F_0$, and $\Delta E_0$ output from the LFE 51a1, and a set of variables $q_1$, $F_1$, and $\Delta E_1$ output from the LFE 51a2, are input into the selection circuit 52a1. In addition, a set of variables $q_2$, $F_2$, and $\Delta E_2$ and a set of variables $q_3$, $F_3$, and $\Delta E_3$, are input into the selection circuit 52a2, and a set of variables $q_4$, $F_4$, and $\Delta E_4$ and a set of variables $q_5$, $F_5$, and $\Delta E_5$, are input into the selection circuit 52a3. Furthermore, a set of variables $q_6$, $F_6$, and $\Delta E_6$ and a set of variables $q_7$, $F_7$, and $\Delta E_7$, are input into the selection circuit 52a4, and a set of variables $q_{n-2}$, $F_{n-2}$, and $\Delta E_{n-2}$ and a set of variables $q_{n-1}$, $F_{n-1}$, and $\Delta E_{n-1}$, are input into the selection circuit 52aq.

In addition, each of the selection circuits 52a1, . . . , and 52aq selects two input sets of variables $q_i$, $F_i$, and $\Delta E_i$, and one set of variables $q_i$, $F_i$, and $\Delta E_i$ based on the 1-bit random number output from the random number generation portion 54. At this time, each of the selection circuits 52a1, . . . , and 52aq preferentially selects a certain set in which $F_i$ is 1, and selects one of the sets based on a 1-bit random number in a case where F in both sets are 1 (the same is applied to other selection circuits). Here, the random number generation portion 54 individually generates a 1-bit random number for each selection circuit, and supplies the 1-bit random number to each selection circuit. In addition, each of the selection circuits 52a1, . . . , and 52aq generates a 1-bit identification value indicating which set of variables $q_i$, $F_i$, and $\Delta E_i$ is selected, and outputs a signal (referred to as a state signal) including the selected set of variables $q_i$, $F_i$, and $\Delta E_i$ and the identification values. Further, the number of selection circuits 52a1 to 52aq in the first stage is ½, for example, n/2 of the number of LFEs 51a1, . . . , and 51an.

The state signals output by the selection circuits 52a1, . . . , and 52aq are input into each of selection circuits 52b1, 52b2, . . . and 52br in the second stage, two at a time. For example, the state signals output from the selection circuits 52a1 and 52a2 are input into the selection circuit 52b1, and the state signals output from the selection circuits 52a3 and 52a4 are input into the selection circuit 52b2.

In addition, each of the selection circuits 52b1, . . . , and 52br selects any one of the two state signals based on the two state signals and the 1-bit random number output by the random number generation portion 54. Further, each of the selection circuits 52b1, . . . , and 52br adds and updates one bit to indicate that any state signal is selected for the identification value included in the selected state signal, and outputs the selected state signal.

The same processing is also performed in the selection circuits in the third and subsequent stages, the bit width of the identification value increases one bit at a time in the selection circuits in each stage, and the state signal which is an output of the random selector portion 52 is output from a selection circuit 31p in the final stage. The identification value included in the state signal output from the random selector portion 52 is an index indicating an inverted bit represented by a binary number.

However, the random selector portion 52 may accept the index that corresponds to the LFE from each LFE together with the flag F, and may output the index that corresponds to the inverted bit by selecting the index with each selection circuit, similar to the variables $q_i$, $F_i$, and $\Delta E_i$. In this case, each LFE has a register for storing the index, and the index is output to the random selector portion 52 from the register.

In this manner, the random selector portion 52 forcibly sets the signal which is output by the LFEs 51a(K+1), . . . , and 51an other than the K (set number of spin bits) LFEs 51a1, . . . , and 51aK among the LFEs 51a1, . . . , and 51an, and indicates the inversion availability, to be non-invertible. The random selector portion 52 selects an inverted bit based on the signal which is output by the LFEs 51a1, . . . , and 51aK and indicates the inversion availability, and the signal which is set for the LFEs 51a(K+1), . . . , and 51an and indicates that inversion is not possible. The random selector portion 52 adds the signal indicating an inverted bit to the LFEs 51a1, . . . , and 51aK, and also outputs the signal to the LFEs 51a(K+1), . . . , and 51an.

In this manner, under the control of the flag control portion 52a, since the flag F of the LFE which is not used is forcibly set to 0, it is possible to exclude the bit that corresponds to the LFE which is not used for the spin bit string from the inversion candidates.

Next, a storage example of the weighting factors for each of the SRAMs 60a1, 60a2, . . . , and 60an of the LFEs 51a1, 51a2, . . . , and 51an will be described. First, a trade-off relationship between the scale for SRAM capacity and accuracy will be described.

Figure 10:
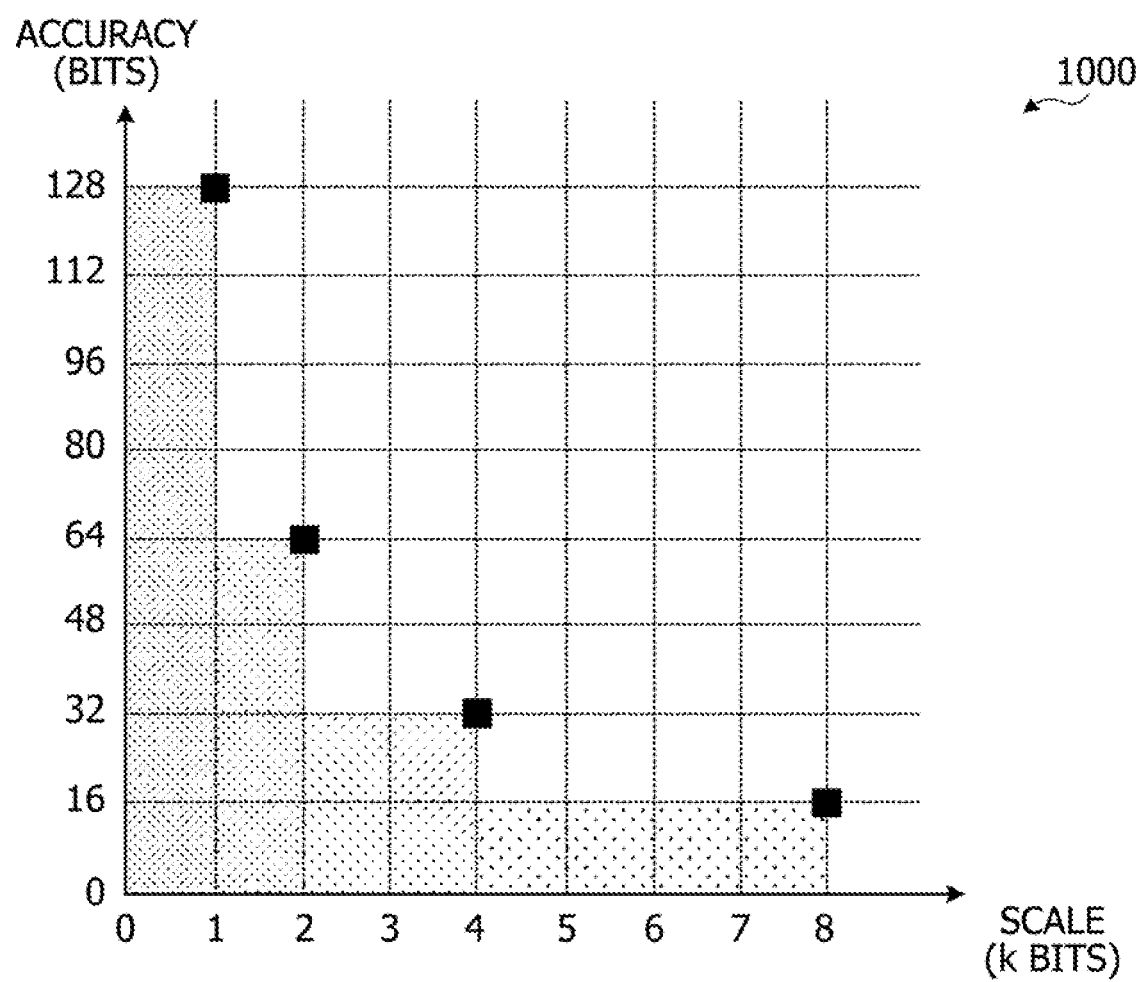
FIG. 10 is an explanatory diagram illustrating an example of a trade-off relationship between scale and accuracy.

FIG. 10 is an explanatory diagram illustrating an example of the trade-off relationship between the scale and accuracy. In FIG. 10, a graph 1000 illustrates the trade-off relationship between the scale and accuracy in a case where an upper limit of the capacity for storing the weighting factors is 128 Kbits (Kilobits) in the SRAM for each LFE. Here, it is assumed that 1 K=1024. The horizontal shaft of the graph 1000 is a scale (Kbits) and the vertical shaft is an accuracy (bits). In addition, as an example, it is assumed that n=8192.

In this case, the accuracy is 128 bits for a scale of 1 Kbit. In addition, the accuracy is 64 bits for a scale of 2 Kbits. Further, the accuracy is 32 bits for a scale of 4 Kbits. In addition, the accuracy is 16 bits for a scale of 8 Kbits.

Here, in the optimization device 408 ($j), for example, it is assumed that the following four modes are available. Each mode corresponds to a partition mode. A first mode is a mode with a scale of 1 Kbit and accuracy of 128 bits. A second mode is a mode with a scale of 2 Kbits and accuracy of 64 bits. A third mode is a mode with a scale of 4 Kbits and accuracy of 32 bits. A fourth mode is a mode with a scale of 8 Kbits and accuracy of 16 bits.

Next, a storage example of the weighting factors that correspond to each of the four types of modes will be described. The weighting factors are stored by the control portion 504 in each of the SRAMs 60a1, 60a2, . . . , and 60an. In addition, the number of unit bits read from the SRAMs 60a1, 60a2, . . . , and 60an by the selectors of each of the accuracy switching circuits 61a1, 61a2, . . . , and 61an is, for example, 128 bits.

Figure 11:
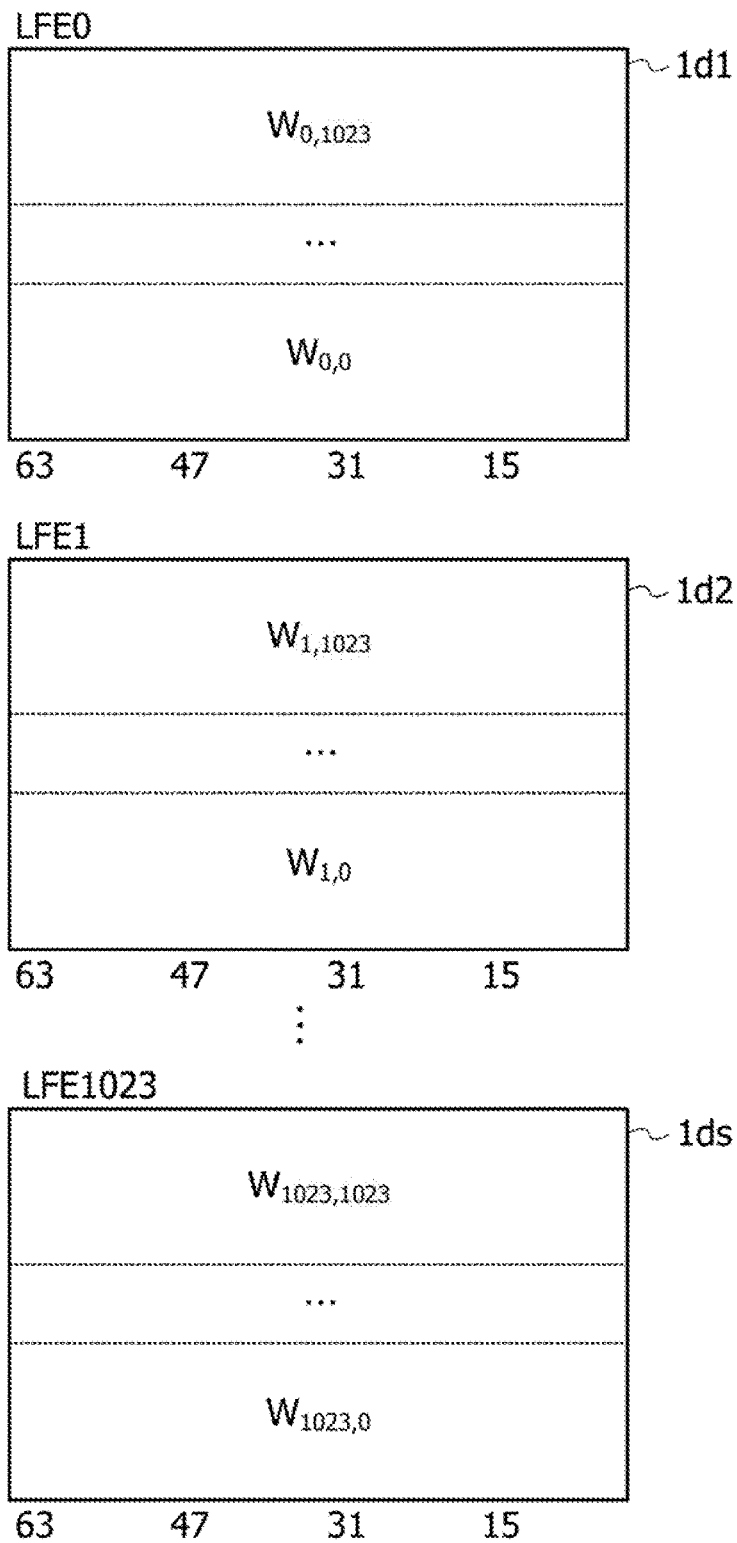
FIG. 11 is an explanatory diagram (part 1) illustrating a storage example of weighting factors.

FIG. 11 is an explanatory diagram (part 1) Illustrating a storage example of the weighting factors. In a case where the first mode (scale of 1 Kbit and accuracy of 128 bits) is used, the weighting factor W is represented by the following equation (11).

$$W = \begin{pmatrix} W_{0,0} & \cdots & W_{0,1023} \\ \vdots & \ddots & \vdots \\ W_{1023,0} & \cdots & W_{1023,1023} \end{pmatrix} \quad (11)$$

Data 1d1, 1d2, ..., and ids indicate a storage example of the weighting factors for the SRAMs 60a1, 60a2, ..., and 60as in a case of using the first mode (scale of 1 Kbit and accuracy of 128 bits). Here, s=1024. The data 1d1, 1d2, ..., and ids are stored in each of the SRAMs 60a1, 60a2, ..., and 60as. In this mode, 1 K (=1024) LFEs are used. In addition, in the drawing, there is a case where the LFEs 51a1, ..., and 51as are denoted as LFE 0, ..., and LFE 1023 using each identification number.

The data 1d1 indicates $W_{0,0}$ to $W_{0,1023}$ stored in the SRAM 60a1 of the LFE 51a1 (LFE 0). The data 1d2 indicates $W_{1,0}$ to $W_{1,1023}$ stored in the SRAM 60a2 of the LFE 51a2 (LFE 1). The data ids indicates $W_{1023,0}$ to $W_{1023,1023}$ stored in the SRAM 60as of the LFE 51as (LFE 1023). The number of bits of one weighting factor $W_{ij}$ is 128 bits.

Figure 12:
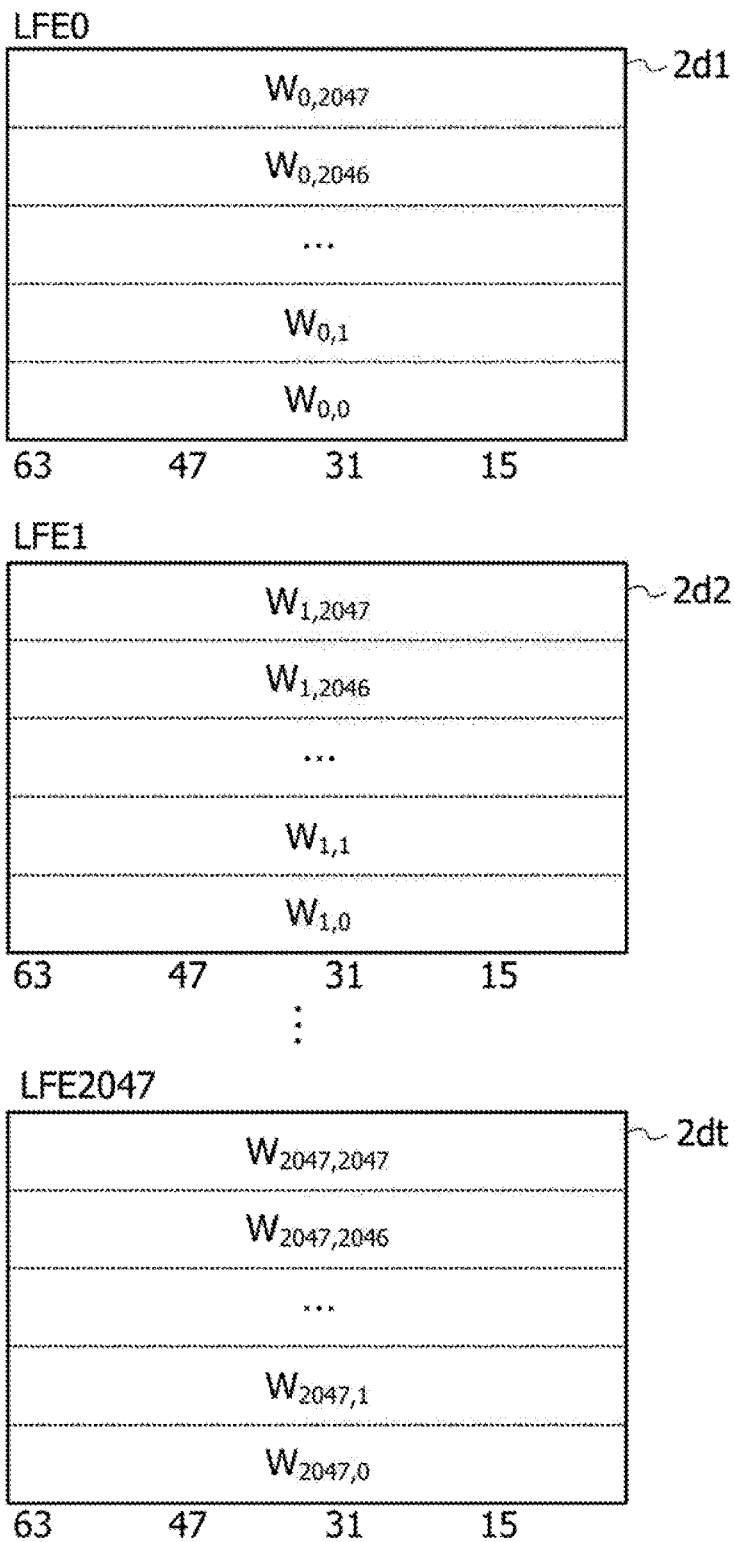
FIG. 12 is an explanatory diagram (part 2) illustrating a storage example of weighting factors.

FIG. 12 is an explanatory diagram (part 2) illustrating a storage example of the weighting factors. In a case where the second mode (scale of 2 Kbits and accuracy of 64 bits) is used, the weighting factor W is represented by the following equation (12).

$$W = \begin{pmatrix} W_{0,0} & \cdots & W_{0,2047} \\ \vdots & \ddots & \vdots \\ W_{2047,0} & \cdots & W_{2047,2047} \end{pmatrix} \quad (12)$$

The data 2d1, 2d2, ..., and 2dt indicate a storage example of the weighting factors for the SRAMs 60a1, 60a2, ..., and 60at in a case of using the second mode (scale of 2 Kbits and accuracy of 64 bits). Here, t=2048. The data 2d1, 2d2, ..., and 2dt are stored in each of the SRAMs 60a1, 60a2, ..., and 60at. In this mode, 2 K (=2048) LFEs are used.

The data 2d1 indicates $W_{0,0}$ to $W_{0,2047}$ stored in the SRAM 60a1 of the LFE 51a1 (LFE 0). The data 2d2 indicates $W_{1,0}$ to $W_{1,2047}$ stored in the SRAM 60a2 of the LFE 51a2 (LFE 1). The data 2dt indicates $W_{2047,0}$ to $W_{2047,2047}$ stored in the SRAM 60at of the LFE Slat (LFE 2047). The number of bits of one weighting factor $W_{ij}$ is 64 bits.

FIG. 13 is an explanatory diagram (part 3) illustrating a storage example of the weighting factors. In a case where the third mode (scale of 4 Kbits and accuracy of 32 bits) is used, the weighting factor W is represented by the following equation (13).

$$W = \begin{pmatrix} W_{0,0} & \cdots & W_{0,4095} \\ \vdots & \ddots & \vdots \\ W_{4095,0} & \cdots & W_{4095,4095} \end{pmatrix} \quad (13)$$

The data 3d1, 3d2, ..., and 3du indicate a storage example of the weighting factors for the SRAMs 60a1, 60a2, ..., and 60au in a case of using the third mode (scale of 4 Kbits and accuracy of 32 bits). Here, u=4096. The data 3d1, 3d2, ..., and 3du are stored in each of the SRAMs 60a1, 60a2, ..., and 60au. In this mode, 4 K (=4096) LFEs are used.

The data 3d1 indicates $W_{0,0}$ to $W_{0,4095}$ stored in the SRAM 60a1 of the LFE 51a1 (LFE 0). The data 3d2 indicates $W_{1,0}$ to $W_{1,4095}$ stored in the SRAM 60a2 of the LFE 51a2 (LFE 1). The data 3du indicates $W_{4095,0}$ to $W_{4095,4095}$ stored in the SRAM 60au of the LFE 51au (LFE 4095). The number of bits of one weighting factor $W_{ij}$ is 32 bits.

FIG. 14 is an explanatory diagram (part 4) illustrating a storage example of the weighting factors. In a case where the fourth mode (scale of 8 Kbits and accuracy of 16 bits) is used, the weighting factor W is represented by the following equation (14).

$$W = \begin{pmatrix} W_{0,0} & \cdots & W_{0,8191} \\ \vdots & \ddots & \vdots \\ W_{8191,0} & \cdots & W_{8191,8191} \end{pmatrix} \quad (14)$$

Data 4d1, 4d2, ..., and 4dn indicate a storage example of the weighting factors for the SRAMs 60a1, 60a2, ..., and 60an in a case of using the fourth mode (scale of 8 Kbits and accuracy of 16 bits). Here, n=8192. The data 4d1, 4d2, ..., and 4dn are respectively stored in each of the SRAMs 60a1, 60a2, ..., and 60an. In this mode, 8 K (=8192) LFEs are used.

The data 4d1 indicates $W_{0,0}$ to $W_{0,8191}$ stored in the SRAM 60a1 of the LFE 51a1 (LFE 0). The data 4d2 indicates $W_{1,0}$ to $W_{1,8191}$ stored in the SRAM 60a2 of the LFE 51a2 (LFE 1). The data 4dn indicates $W_{8191,0}$ to $W_{8191,8191}$ stored in the SRAM 60an of the LFE 51an (LFE 8191). The number of bits of one weighting factor $W_{ij}$ is 16 bits.

Next, the arithmetic processing procedure of the optimization device 408 ($j) will be described. In addition, the initial value and the operating condition that correspond to the problem are input into the optimization device 408 ($j). The initial values include, for example, the energy value E, the local field $h_i$, the spin bit $q_i$, the initial value of the temperature parameter T, and the weighting factor W. In addition, the operating conditions include the number of updates N1 of the state in one temperature parameter, the number of changes N2 in temperature parameters, a lowering range in temperature parameters, and the like. The control portion 504 sets the input initial value and the operating condition in the register and SRAM of each of the above-described LFEs.

Figure 15:
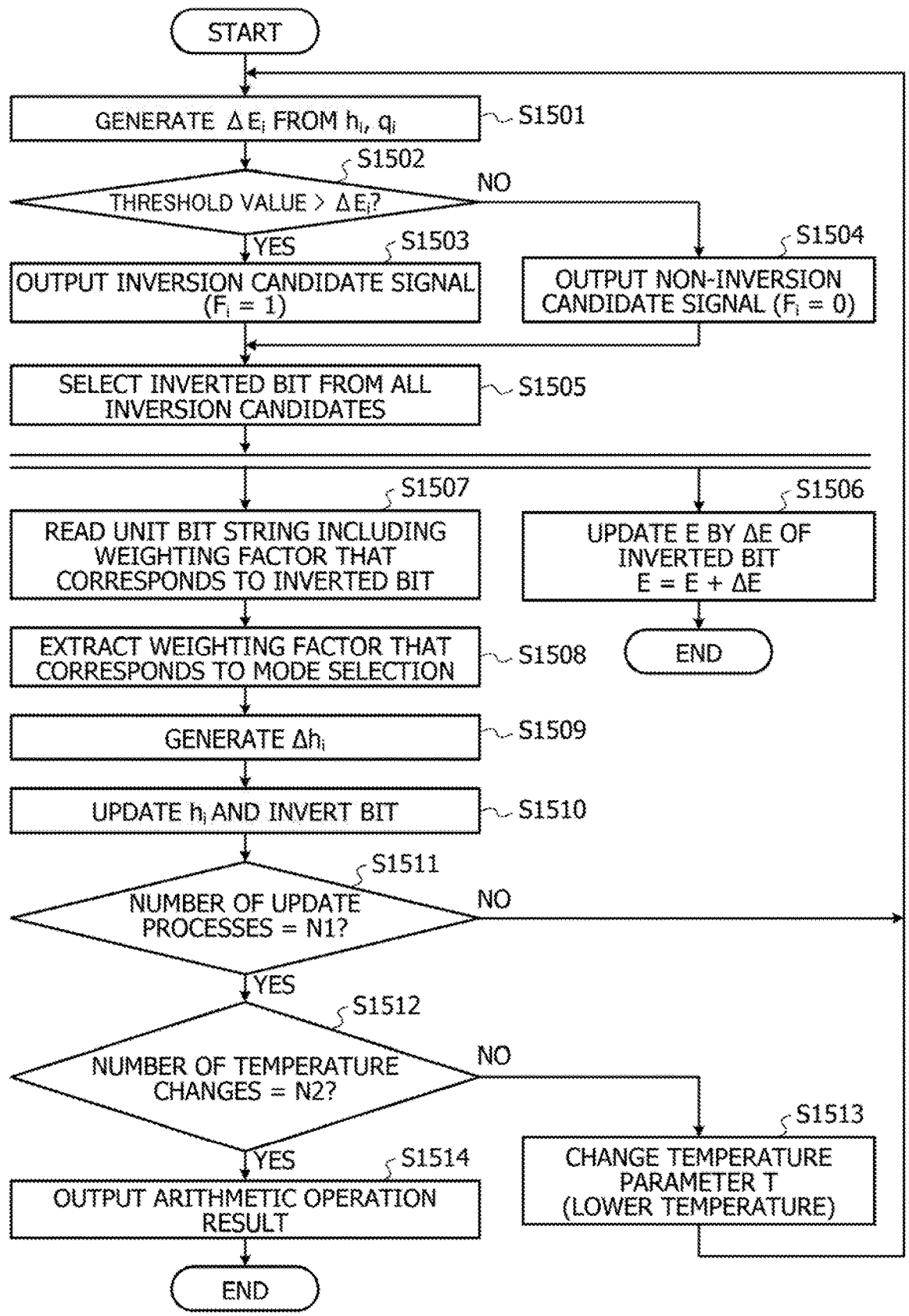
FIG. 15 is a flowchart illustrating an example of an arithmetic processing procedure of an optimization device ($j)

FIG. 15 is a flowchart illustrating an example of an arithmetic processing procedure of the optimization device 408 ($j). In the description of FIG. 15, the LFE that corresponds to Index=i is denoted as LFE 51ax (the first LFE is LFE 51a1 and the n-th LFE is 51an). For each part included in the LFE 51ax, for example, as in the SRAM 60ax, "x" is added to the end of the reference numeral. The arithmetic operations by each of the LFEs 51a1, ..., and 51an are executed in parallel.

In the flowchart of FIG. 15, a ΔE generation portion 67ax generates the energy change amount $\Delta E_i$ in a case of inverting the bit $q_i$ based on the local field $h_i$ stored in the h storage register 64ax and the bit $q_i$ stored in a bit storage register 66ax (step S1501). The above-described equation (2) is used to generate $\Delta E_i$.

A determination portion 68ax determines whether threshold value>$\Delta E_i$ is satisfied by comparing the energy change amount ΔE generated by the ΔE generation portion 67ax with the threshold value (=-(T·f$^{-1}$(u)) generated by the threshold value generation portion 53 (step S1502). Here, in a case where threshold value>$\Delta E_i$ is satisfied (step S1502: YES), the process proceeds to step S1503. In a case where threshold value≤$\Delta E_i$ is satisfied (step S1502: NO), the process proceeds to step S1504.

The determination portion 68ax outputs an inversion candidate signal ($F_i$=1) to the random selector portion 52 (step S1503). The process proceeds to step S1505.

The determination portion 68ax outputs a non-inversion candidate signal ($F_i=0$) to the random selector portion 52 (step S1504). The process proceeds to step S1505.

In step S1505, the random selector portion 52 selects one inverted bit from all the inversion candidates (bits that correspond to LFE where $F_i=1$) output from each of the LFEs 51a1, ..., and 51an. The random selector portion 52 outputs index=j, $F_j$, $q_j$ that corresponds to the selected inverted bit, to the LFEs 51a1, ..., and 51an. In addition, the random selector portion 52 outputs $\Delta E_j$ that corresponds to the selected inverted bit, to the adder 56. Then, the following steps S1506 (energy update process) and S1507 (state update process) are started in parallel.

The adder 56 updates the energy value E stored in the E storage register 57 by adding the energy change amount $\Delta E$ that corresponds to the inverted bit to the energy value E (step S1506). For example, $E=E+\Delta E$. In addition, the energy update process is ended.

An accuracy switching circuit 61ax acquires index=j that corresponds to the inverted bit and the flag $F_j$, and reads a unit bit string including a weighting factor that corresponds to the inverted bit from the SRAM 60ax (step S1507). The unit bit string is a unit of bit strings read by the selector of the accuracy switching circuit 61ax from the SRAM 60ax at one time. The number of bits of the unit bit string (the number of unit bits) is, in one example, 128 bits (may be another value). In this case, in step S1507, a unit bit string of 128 bits is read from the SRAM 60ax.

For example, in a case where 128/a (a=1, 2, 4, 8) bits are selected as the accuracy, the accuracy switching circuit 61ax counts and reads "Integer (j/a)"-th unit bit string from the unit bit string of the head (head is 0-th) of the SRAM 60ax. Here, Integer (j/a) is a function that extracts the integer part from the value of (i/a).

The accuracy switching circuit 61ax extracts the weighting factor (a weighting factor that corresponds to the inverted bit $q_j$) $W_{ij}$ of the number of bits that corresponds to the mode selection set by the mode setting register 55 from the unit bit string read in step S1507 (step S1508). For example, in a case of extracting the bit string of z bits from the unit bit string of 128 bits, the accuracy switching circuit 61ax shifts the bit range of z bits that correspond to the inverted bit to the LSB side as described above, sets other upper bits to be 0, and accordingly, extracts a weighting factor of z bits.

In addition, when the accuracy switching circuit 61ax divides the unit bit string read in step S1507 into partitions of a bit length that corresponds to accuracy from the head, the bit range is specified depending on to which partition from the head (0-th) the bit range that corresponds to the inverted bit corresponds.

According to the examples of FIGS. 12 to 14, in a case of the accuracy of 64 bits, the bit range is the zeroth partition when j is an even number, and is the first partition when j is an odd number. In addition, in a case of accuracy of 32 bits, the bit range is the zeroth partition when mod (j, 4)=0, is the first partition when mod (j, 4)=1, is the second partition when mod (j, 4)=2, and is the third partition when mod (j, 4)=3. Here, mod (u, v) is a function indicating the remainder when u is divided by v. Furthermore, in a case of the accuracy of 16 bits, similarly, the "mod (j, 8)"-th partition from the head of the read 128-bit unit bit string is the bit range that corresponds to the inverted bit. In addition, in a case of the accuracy of 128 bits, the accuracy switching circuit 61ax uses the 128-bit unit bit string read in step S1507 as a weighting factor that corresponds to the inverted bit as it is.

In the above-described example, with respect to the accuracy of 128/a (a=1, 2, 4, 8) bits, the "mod (j, a)"-th partition (the size of one partition is 128/a bits) from the head of the 128-bit unit bit string read in step S1507, is a bit range indicating a weighting factor that corresponds to an inverted bit.

A $\Delta h$ generation portion 62ax generates $\Delta h_i$ based on the inversion direction of the inverted bit and the weighting factor $W_{ij}$ extracted by the accuracy switching circuit 61ax (step S1509). The above-described equation (4) is used to generate $\Delta h_i$. In addition, the inversion direction of the inverted bit is determined by the inverted bit $q_j$ (a bit before the current inversion) output from the random selector portion 52.

In step S1510, an adder 63ax updates the local field $h_i$ stored in the h storage register 64ax by adding $\Delta h_i$ generated by the $\Delta h$ generation portion 62ax to the local field $h_i$ stored in the h storage register 64ax. Further, the inversion determination portion 65ax determines whether the own bit is selected as the inverted bit, based on index=j and the flag $F_j$ output from the random selector portion 52. The inversion determination portion 65ax inverts the spin bit stored in the bit storage register 66ax in a case where the own bit is selected as the inverted bit, and maintains the spin bit of the bit storage register 66ax in a case where the own bit is not selected as the inverted bit. Here, a case where the own bit is selected as the inverted bit is a case where index=j=i and $F_j=1$ for the signal output by the random selector portion 52.

The control portion 504 determines whether the number of update processes of each spin bit held in the LFEs 51a1, ..., and 51an reaches N1 (whether number of update processes=N1) (step S1511), in the current temperature parameter T. In a case where the number of update processes has reached N1 (step S1511: YES), the process proceeds to step S1512. In a case where the number of update processes has not reached N1 (step S1511: NO), the control portion 504 adds 1 to the number of update processes and advances the process to step S1501.

The control portion 504 determines whether the number of changes of the temperature parameter T has reached N2 (whether number of temperature changes=N2) (step S1512). In a case where the number of temperature changes has reached N2 (step S1512: YES), the process proceeds to step S1514. In a case where the number of temperature changes has not reached N2 (step S1512: NO), the control portion 504 adds 1 to the number of temperature changes and advances the process to step S1513.

The control portion 504 changes the temperature parameter T (step S1513). For example, the control portion 504 reduces (corresponds to lowering the temperature) the value of the temperature parameter T by the lowering range that corresponds to the operating condition. The process proceeds to step S1501.

The control portion 504 reads the spin bit stored in the bit storage register 66ax and outputs the read spin bit as an arithmetic operation result (step S1514). For example, the control portion 504 reads the spin bits stored in each of the bit storage registers 66a1, ..., and 66aK that correspond to the number of spin bits K set by the mode setting register 55, and outputs the stored spin bits to the CPU 401. For example, the control portion 504 supplies the read spin bit string to the CPU 401. In addition, the arithmetic processing is ended.

In addition, in step S1505, the random selector portion 52 forcibly sets the value of F output by the LFE which is not used to be 0 in accordance with the setting of the mode setting register 55, and accordingly, it is possible to exclude the LFE which is not used from the candidates of the bit inversion.

According to the optimization device 408 ($j), it is possible to set the number of spin bits and the number of bits of the weighting factors which represent a state of the Ising model by the mode setting register 55, and it is realize any partition mode in the one-chip optimization device 408 ($j).

For example, the accuracy switching circuit 61*ax* switches the bit length of the weighting factor read from the SRAM 60*ax* in accordance with the setting of the mode setting register 55. By using the accuracy switching circuit 61*ax*, as illustrated in step S1508, it is possible to realize various accuracies without changing the number of unit bits read by the selector of the accuracy switching circuit 61*ax* from the SRAM 60*ax*. For example, it is possible to make accuracy variable without changing the signal lines for reading the unit bit number from the SRAM 60*ax* by the selector of the accuracy switching circuit 61*ax*.

In addition, the random selector portion 52 inputs a signal indicating an inverted bit into the number (for example, K) of LFEs that correspond to the number of spin bits set by the mode setting register 55, and selects the inverted bit among the bits that correspond to the number (K) of LFEs. The random selector portion 52 also inputs a signal indicating an inverted bit into n–K LFEs that are not used, but by forcibly setting the flag F output from the n–K LFEs to be 0 (non-invertible), excludes the LFEs which are not used from the selection candidates of inverted bits.

Accordingly, without individually manufacturing the optimization devices having the scale and accuracy that correspond to the problems, by preparing the plurality of optimization devices 408 having different partition modes, it is possible to realize the Ising model with the scale and accuracy that correspond to the problem.

Next, another example of mode setting will be described. For example, the optimization device 408 ($j) stores the weighting factors in the SRAMs 60*a*1, . . . , and 60*an* as follows to add the stored weighting factors to the above-described four types of modes and be capable of providing a fifth mode with scale of 4 Kbits and accuracy of 64 bits.

Figure 16:
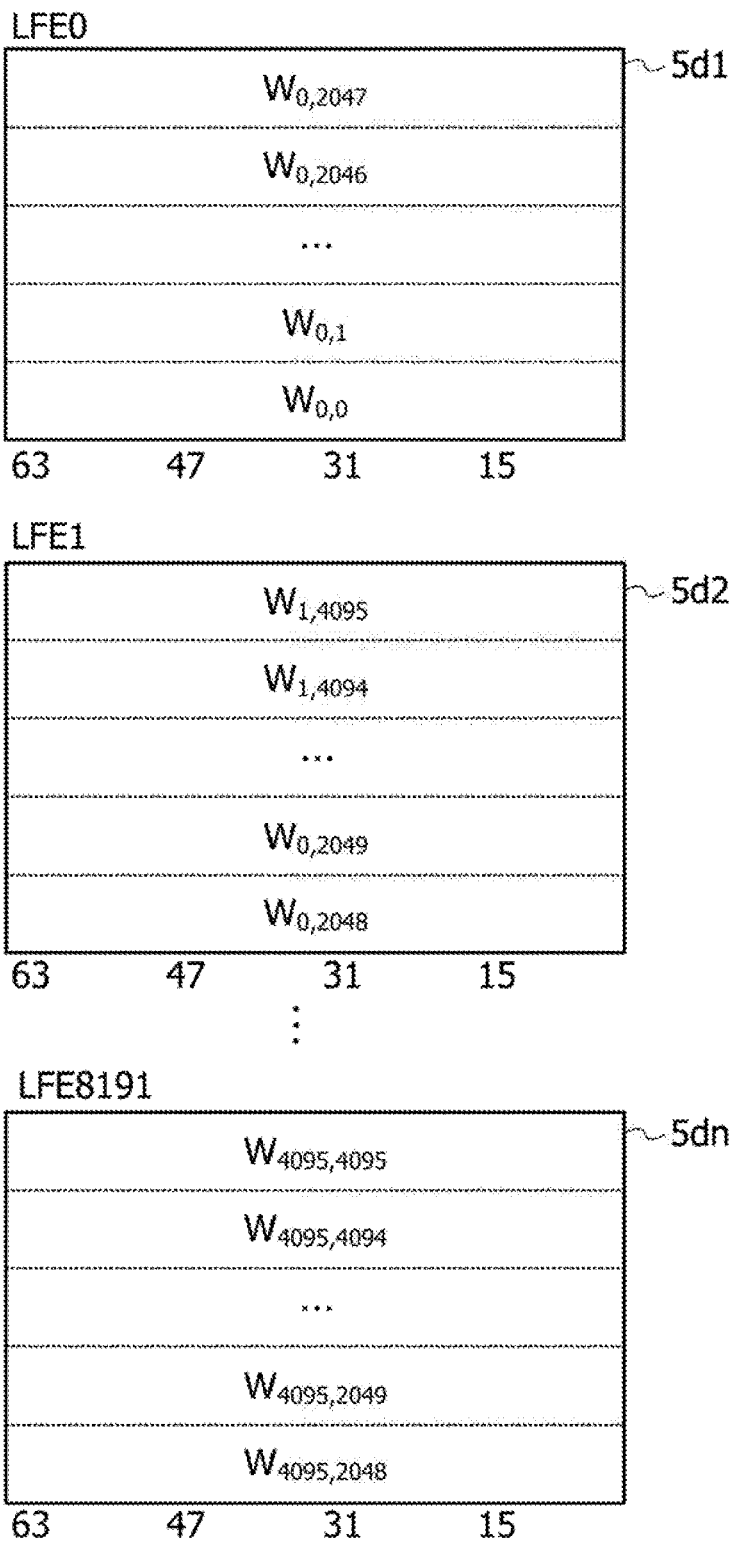
FIG. 16 is an explanatory diagram (part 5) illustrating a storage example of weighting factors.

FIG. 16 is an explanatory diagram (part 5) illustrating a storage example of the weighting factors. Data 5*d*1, 5*d*2, . . . , and 5*dn* indicate a storage example of the weighting factors for the SRAMs 60*a*1, 60*a*2, . . . , and 60*an* in a case of using the fifth mode (scale of 4 Kbits and accuracy of 64 bits). Here, n=8192. The data 5*d*1, 5*d*2, . . . , and 5*dn* are respectively stored in the SRAMs 60*a*1, 60*a*2, . . . , and 60*an*. In this mode, 4 K (=4096) LFEs are used as a spin bit string, and further, 4 K (=4096) LFEs are used only for an application of storing the weighting factors.

The data 5*d*1 indicates $W_{0,0}$ to $W_{0,247}$ stored in the SRAM 60*a*1 of the LFE 51*a*1 (LFE 0). The data 5*d*2 indicates $W_{0,2048}$ to $W_{0,4095}$ stored in the SRAM 60*a*2 of the LFE 51*a*2 (LFE 1). The data 5*dn* indicates $W_{4095,2048}$ to $W_{4095,4095}$ stored in the SRAM 60*an* of the LFE 51*an* (LFE 8191). The number of bits of one weighting factor $W_{ij}$ is 64 bits.

Here, as described above, the accuracy switching circuit 61*a*1 of the LFE 51*a*1 is also capable of acquiring the weighting factor from the SRAM 60*a*2 of the LFE 51*a*2. For example, the accuracy switching circuit 61*a*1 is capable of adopting, for example, a method of stopping the functions of the LFE 51*a*2 other than the SRAM 60*a*2 and lending the capacity of the SRAM 60*a*2 to the LFE 51*a*1 by using the read path from the SRAM 60*a*2 of the adjacent LFE 51*a*2.

For example, the SRAM of the even-numbered LFE is usable rather than the even-numbered (first from the head) LFE (or it is also possible to say the SRAM of the even-numbered LFE rather than the odd-numbered LFE in a case where the head is the zeroth).

In this manner, in the accuracy switching circuits 61*a*1, . . . , and 61*an*, in accordance with the change in the number of bits of the weighting factors, some of the weighting factors related to the own bit and other bits are read from the SRAM of other LFEs which is not used as a spin bit. In this case, for example, the random selector portion 52 forcibly sets the flag F output from the other LFEs which are not used as the spin bit to be 0 (non-invertible), the bit that corresponds to the other LFEs may be excluded from the inverted bit selection candidates.

Accordingly, it is possible to realize the fifth mode with scale of 4 Kbits and accuracy of 64 bits. Similarly, by reducing the scale, it is also possible to realize much higher accuracy. In this manner, the optimization device 408 ($j) is capable of changing more flexibly the scale and accuracy, in accordance with the problem.

Next, the stored contents of the mode setting table 1700 included in the optimization problem arithmetic device 101 will be described. The mode setting table 1700 is stored, for example, in the storage device, such as the memory 402 or the disc 404 illustrated in FIG. 4.

FIG. 17 is an explanatory diagram illustrating an example of the stored contents of the mode setting table 1700. In FIG. 17, the mode setting table 1700 has a unit ID, a partition mode, and a problem scale and accuracy, and stores mode setting information 1700-1 to 1700-16 as records by setting information in each of the fields.

Here, the unit ID is an identifier that identifies a unit that solves the combinatorial optimization problem. The unit corresponds to, for example, a partition in the optimization device 408 ($j). Partitions in the optimization device 408 ($j) are realized, for example, by one or more LFBs 505.

For example, the unit 1 corresponds to a partition in the optimization device 408 ($1). A unit 2 corresponds to a partition in the optimization device 408 ($2). Units 3-1 and 3-2 correspond to two partitions in the optimization device 408 ($3). Units 4-1 to 4-4 correspond to four partitions in the optimization device 408 ($4). Units 5-1 to 5-8 correspond to eight partitions in the optimization device 408 ($5).

A partition mode indicates a mode name of the partition mode. A partition mode "8P" is a mode in which the optimization device 408 ($j) is logically divided into eight partitions. Each partition in the partition mode "8P" is realized by, for example, one LFB 505. The partition mode "8P" corresponds to the above-described first mode.

A partition mode "4P" is a mode in which the optimization device 408 ($j) is logically divided into four partitions. Each partition in the partition mode "4P" is realized by, for example, two LFBs 505. The partition mode "4P" corresponds to the above-described second mode.

A partition mode "2P" is a mode in which the optimization device 408 ($j) is logically divided into two partitions. Each partition in the partition mode "2P" is realized by, for example, four LFBs 505. The partition mode "2P" corresponds to the above-described third mode.

A partition mode "FULL" is a mode in which the optimization device 408 ($j) is used as one partition without being divided. The partition in the partition mode "FULL" is realized by, for example, eight LFBs 505. However, there are two types of partition mode "FULL" that correspond to the combination of scale and accuracy. The partition mode "FULL (scale: 8 K, accuracy: 16 bits)" corresponds to the above-described fourth mode. In addition, the partition mode "FULL (scale: 4 K, accuracy: 64 bits)" corresponds to the above-described fifth mode.

The problem scale indicates the maximum scale of a solvable problem (combinatorial optimization problem) in the partition mode (unit: bit). The accuracy indicates the maximum accuracy of a solvable problem (combinatorial optimization problem) in each of the partition modes.

For example, according to the mode setting information 1700-1, it is possible to specify that the partition mode of the optimization device 408 ($1) is the partition mode "FULL". In addition, it is possible to specify the problem scale "8K" and accuracy "16 bits" of the unit 1 that corresponds to the partition in the optimization device 408 ($1).

Further, although not Illustrated, each mode setting information in the mode setting table 1700 includes, for example, information (for example, an identification number of the LFB) for specifying a hardware resource that corresponds to each unit (partition). The mode setting table 1700 corresponds to, for example, the management information 110 illustrated in FIG. 1.

Figure 18:
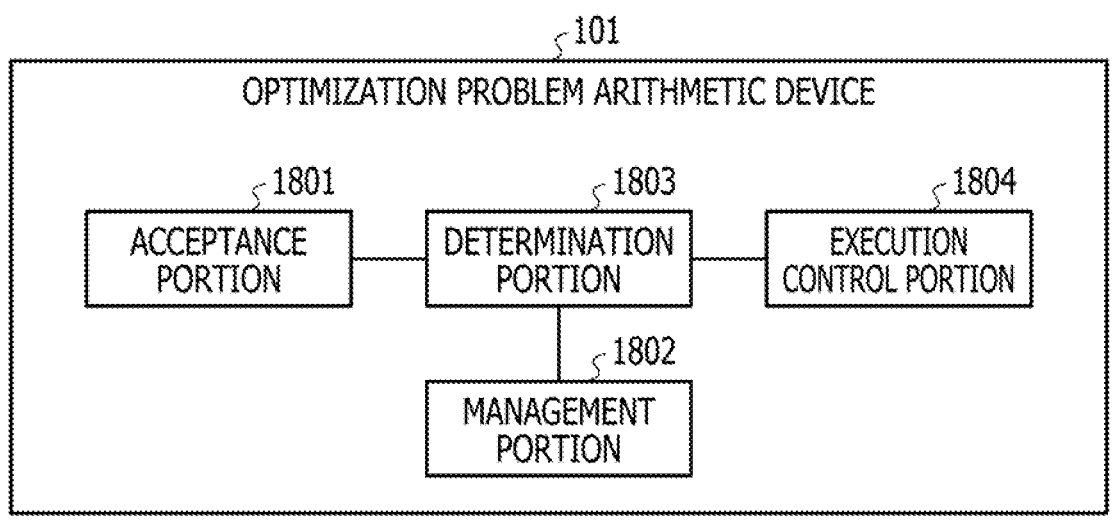
FIG. 18 is a block diagram illustrating a functional configuration example of the optimization problem arithmetic device.

FIG. 18 is a block diagram illustrating a functional configuration example of the optimization problem arithmetic device 101. In FIG. 18, the optimization problem arithmetic device 101 includes an acceptance portion 1801, a management portion 1802, a determination portion 1803, and an execution control portion 1804. For example, the acceptance portion 1801 to the execution control portion 1804 cause the CPU 401 to execute a program stored in a storage device, such as the memory 402, the disc 404, or the portable recording medium 407 illustrated in FIG. 4, and accordingly, the function is realized by the communication I/F 405. The processing result of each functional portion is stored, for example, in a storage device, such as the memory 402 or the disc 404.

The acceptance portion 1801 accepts the combinatorial optimization problem. Here, the combinatorial optimization problem to be accepted is a problem that is calculation target to be solved. For example, the acceptance portion 1801 accepts the combinatorial optimization problem by accepting an input of information on the combinatorial optimization problem from the client device 301 illustrated in FIG. 3. The information on the combinatorial optimization problem includes, for example, an initial value or an operating condition that corresponds to the problem.

The management portion 1802 holds information on the partition mode that defines the logically divided state of each of the plurality of optimization devices 408. Here, the plurality of optimization devices 408 are the optimization devices 408 included in the optimization problem arithmetic device 101, for example, the optimization devices 408 ($1) to 408 ($M) illustrated in FIG. 4.

For example, the management portion 1802 holds information including the partition mode set in each of the optimization devices 408 ($j) or the maximum scale and the maximum accuracy of solvable problems in the partition mode. When describing in more detail, for example, the management portion 1802 holds the mode setting table 1700 illustrated in FIG. 17.

The determination portion 1803 determines the optimization device 408 to which the combinatorial optimization problem is assigned, based on the scale or requested accuracy of the accepted combinatorial optimization problem and Information held by the management portion 1802. For example, first, the determination portion 1803 acquires the scale and the requested accuracy of the accepted combinatorial optimization problem. When describing in more detail, for example, the determination portion 1803 acquires the number of spin bits (scale) and the number of bits (requested accuracy) that represents the weighting factors of the problem after conversion by which the accepted combinatorial optimization problem is converted, from the library 502 (refer to FIG. 5).

Next, with reference to the mode setting table 1700, the determination portion 1803 specifies an arithmetic operable unit in accordance with the scale or requested accuracy of the acquired combinatorial optimization problem. Here, the arithmetic operable unit is a unit which is a candidate for performing the arithmetic operation of the combinatorial optimization problem. In addition, the determination portion 1803 determines the optimization device 408 ($j) including any one of the specified arithmetic operable units as the optimization device 408 to which the combinatorial optimization problem is assigned.

At this time, the determination portion 1803 may determine a unit in the optimization device 408 ($j) as an assigned unit of the combinatorial optimization problem. For example, the determination portion 1803 not only determines the optimization device 408 ($j) but also determines the units within the optimization device 408 ($j), as an assigned unit of the combinatorial optimization problem. However, to which unit in the optimization device 408 ($j) the combinatorial optimization problem is assigned may be determined by the control portion 504 (FIG. 5) of the optimization device 408 ($j).

When describing in more detail, for example, with reference to the mode setting table 1700, the determination portion 1803 specifies a unit that corresponds to the partition mode that is capable of solving the problem having the scale equal to or larger than the scale of the combinatorial optimization problem as the arithmetic operable unit. In addition, the optimization problem arithmetic device 101 may preferentially determine a unit from the units having the smallest maximum scale of the solvable problem as a unit to which the combinatorial optimization problem is assigned, among the specified arithmetic operable units.

In addition, with reference to the mode setting table 1700, the determination portion 1803 may specify a unit that corresponds to the partition mode that is capable of solving the problem having the accuracy equal to or higher than the requested accuracy of the combinatorial optimization problem. In addition, the determination portion 1803 may determine the specified unit as a unit to which the combinatorial optimization problem is assigned.

In addition, with reference to the mode setting table 1700, the determination portion 1803 may specify the unit that corresponds to the partition mode that is capable of solving the problem having the scale equal to or larger than the scale of the combinatorial optimization problem, and solving the problem having the accuracy equal to or higher than the requested accuracy of the combinatorial optimization problem, as the arithmetic operable unit. In addition, the optimization problem arithmetic device 101 may preferentially determine a unit from the units having the smallest maximum scale of the solvable problem as a unit to which the combinatorial optimization problem is assigned, among the specified arithmetic operable units.

In addition, the mode setting information in the mode setting table 1700 may be generated, for example, in the optimization problem arithmetic device 101. For example, the determination portion 1803 acquires the maximum scale (number of spin bits) and the maximum accuracy (number of bits of weighting factor) of the problem solvable in the partition modes of each of the optimization devices 408 ($j)

from the library 502. In addition, the determination portion 1803 may generate the mode setting information of each of the optimization devices 408 ($j) based on the acquired result.

The library 502 is capable of acquiring the information on the partition mode set to the optimization device 408 ($j) by calling a previously prepared function. For example, the library 502 is capable of acquiring the maximum scale of the problem solvable in the partition mode of the optimization device 408 ($j) by calling a getMaxNumBit( ) function. In addition, the library 502 is capable of acquiring the maximum accuracy of the problem solvable in the partition mode of the optimization device 408 ($j) by calling a getWeightRange( ) function.

Further, the management portion 1802 may hold information on the execution status of each of the plurality of optimization devices 408. For example, the management portion 1802 may hold the information on the problem during the execution in each of the optimization devices 408 ($j) or on a processing standby queue (queue) that corresponds to each of the optimization devices 408 ($j).

In addition, the determination portion 1803 may determine the optimization device 408 to which the combinatorial optimization problem is assigned, further based on the information on the execution status of each of the plurality of optimization devices 408 held by the management portion 1802. For example, the determination portion 1803 may determine the optimization device 408 ($j) including an empty unit that does not execute the problem as the optimization device 408 to which the combinatorial optimization problem is assigned, among the specified arithmetic operable units.

In addition, in a case where there is no empty unit in the specified arithmetic operable unit, the determination portion 1803 may determine the optimization device 408 of which the number of problems that remain in a state of processing standby queue is the minimum, among the optimization devices 408 ($j) including the arithmetic operable unit, as the optimization device 408 to which the combinatorial optimization problem is assigned.

In addition, a determination example of the assigned unit of the combinatorial optimization problem will be described later with reference to FIGS. 19 to 21.

The execution control portion 1804 causes the determined optimization device 408 to execute the arithmetic operation of the combinatorial optimization problem. For example, the execution control portion 1804 designates the unit and causes the control portion 504 of the optimization device 408 ($j) including the unit determined as the assigned unit of the combinatorial optimization problem, to execute the arithmetic operation of the combinatorial optimization problem.

When describing in more detail, for example, the execution control portion 1804 inputs an initial value and an operating condition that correspond to the problem into the optimization device 408 ($j). The initial values include, for example, the energy value E, the local field $h_i$, the spin bit qi, the initial value of the temperature parameter T, and the weighting factor W. In addition, the operating conditions include the number of updates N1 of the state in one temperature parameter, the number of changes N2 in temperature parameters, a lowering range in temperature parameters, and the like.

In the optimization device 408 ($j), the control portion 504 sets the input initial value and the operating condition in the register and SRAM of each of the LFEs. In addition, in a case where there is an LFE that is not used, the control portion 504 sets, for example, all of the SRAMs of the LFEs to be 0 as W.

The execution control portion 1804 inputs an arithmetic operation start flag (for example, arithmetic operation start flag=1) to the optimization device 408($j). The control portion 504 accepts the input of the operation start flag, and starts the arithmetic operation by the unit (LFB 505) designated by the execution control portion 1804. The designation of a unit is performed, for example, by inputting information (such as, an identification number of an LFB) that specifies a partition that corresponds to the unit.

In addition, the determination portion 1803 may determine whether to use the division solution method. Here, the division solution method is a method of dividing a problem using a division solver or the like to solve the problem as a problem having a small scale. Any existing technique may be used as the division solution method.

For example, the determination portion 1803 may determine whether the scale of the combinatorial optimization problem is larger than the maximum scale of problems solvable by the plurality of optimization devices 408. Here, in a case where the scale of the combinatorial optimization problem is larger than the maximum scale of the solvable problem, the determination portion 1803 determines to use the division solution method. Meanwhile, in a case where the scale of the combinatorial optimization problem is equal to or smaller than the maximum scale of the solvable problem, the determination portion 1803 determines not to use the division solution method.

For example, in a case where the scale of the combinatorial optimization problem is larger than the maximum scale of the problems solvable by the plurality of optimization devices 408, the combinatorial optimization problem is not solvable in this state. Here, the optimization problem arithmetic device 101 may divide and solve the combinatorial optimization problem using the division solution method.

The determination portion 1803 divides the combinatorial optimization problem in a case where it is determined to use the division solution method. In addition, based on the scale or requested accuracy of the divided problem after the division and the information on the partition mode that defines the logically divided state of each of the plurality of optimization devices 408, the determination portion 1803 determines the optimization device 408 to which the problem after the division is assigned.

In this case, the execution control portion 1804 causes the determined optimization device 408 to execute the arithmetic operation of the problem after the division. The solution of the combinatorial optimization problem is an integrated solution of the problem after the division. Accordingly, even in a case where the scale of the combinatorial optimization problem is larger than the maximum scale of the problems solvable by the plurality of optimization devices 408, it is possible to solve the combinatorial optimization problem.

In addition, the determination portion 1803 may determine whether to use scaling. Here, scaling means adjusting and solving coefficients within the range of the maximum accuracy that is capable of solving the problem. For example, the determination portion 1803 may determine whether the requested accuracy of the combinatorial optimization problem is within the range of the maximum accuracy of the problem solvable by the plurality of optimization devices 408.

Here, in a case where the requested accuracy of the combinatorial optimization problem is out of the range of the maximum accuracy of the solvable problem, the determination portion 1803 determines to use the scaling. Meanwhile, in a case where the requested accuracy of the combinatorial optimization problem is within the range of the maximum accuracy of the solvable problem, the determination portion 1803 determines not to use the scaling.

For example, in a case where the requested accuracy of the combinatorial optimization problem is out of the range of the maximum accuracy of the problems solvable by the plurality of optimization devices 408, it is not possible to solve the combinatorial optimization problem in this state. Here, the optimization problem arithmetic device 101 may adjust and solve the coefficients of the combinatorial optimization problem using the scaling.

For example, after the execution control portion 1804 solves the problem to which the scaling (N times) is performed within the range of the maximum accuracy of the problem solvable by the optimization device 408 (unit) determined as an assigned unit of the combinatorial optimization problem, the energy recalculated (1/N times) to match the original problem may be returned.

For example, in a case of the partition mode "FULL (scale: 8 K, accuracy: 16 bits)", since the maximum accuracy is "16 bits", when "3276700" is designated to the coefficient of the quadratic term of the problem, it is not possible to solve the problem in this state. In this case, after the execution control portion 1804 scales down to 1/100, for example, and solves the coefficient of the quadratic term as a problem of 32767, the energy recalculated (100 times) to match the original problem is returned.

Accordingly, even when the requested accuracy of the combinatorial optimization problem is out of the range of the maximum accuracy of the problem solvable by the optimization device 408, it is possible to solve the combinatorial optimization problem.

Next, a determination example of the assigned unit of the combinatorial optimization problem will be described. First, a case where the optimization problem arithmetic device 101 is applied to a cloud server and a unit in all partition modes is prepared will be described. Here, the assigned unit table 1900 used by the optimization problem arithmetic device 101 (cloud) will be described. The assigned unit table 1900 is stored, for example, in a storage device, such as the memory 402 or the disc 404.

FIG. 19 is an explanatory diagram illustrating an example of the stored contents of the assigned unit table 1900. In FIG. 19, the assigned unit table 1900 has fields of a problem number, a problem scale, accuracy, an arithmetic operable unit, and an assigned unit, and stores the assigned unit information (for example, assigned unit information 1900-1 to 1900-8) as a record by setting the information to each field.

Here, the problem number is an identifier that identifies a problem (combinatorial optimization problem) that is the calculation target. The problem scale indicates the scale of the problem. The accuracy indicates the requested accuracy of the problem. The arithmetic operable unit is a unit which is a candidate for performing the arithmetic operation of the problem. The assigned unit indicates a unit to which the problem is assigned.

Hereinafter, a determination example of the assigned units of each of problems Q1 to Q8 will be described by taking a case where the problems Q1 to Q8 are sequentially accepted as an example.

First, in a case where the acceptance portion 1801 accepts the problem Q1, the determination portion 1803 acquires the scale and the requested accuracy of the problem Q1. Here, the scale of the problem Q1 is "1 K", and the requested accuracy of the problem Q1 is "128 bits". Next, with reference to the mode setting table 1700, the determination portion 1803 specifies an arithmetic operable unit of the problem Q1.

For example, among the units that are capable of solving the problem having the scale equal to or larger than scale "1 K" of the problem Q1, the determination portion 1803 is capable of specifying the unit having the smallest maximum scale of the solvable problem, as the arithmetic operable unit. In the example of FIG. 17, units 5-1, 5-2, 5-3, 5-4, 5-5, 5-6, 5-7, and 5-8 are specified.

Next, the determination portion 1803 excludes a unit of which the requested accuracy "128 bits" of the problem Q1 is out of the range of the maximum accuracy of the solvable problem, from the specified arithmetic operable units. In the example of FIG. 17, none of the units 5-1, 5-2, 5-3, 5-4, 5-5, 5-6, 5-7, and 5-8 is excluded.

In addition, the determination portion 1803 determines an empty unit among the arithmetic operable units as a unit to which the problem Q1 is assigned. In addition, in a case where there are a plurality of empty units, the determination portion 1803 may determine, for example, the unit having the smallest branch number of the unit ID. Here, the arithmetic operable unit 5-1 is determined as the unit to which the problem Q1 is assigned. As a result, the assigned unit information 1900-1 is stored in the assigned unit table 1900.

Next, in a case where the acceptance portion 1801 accepts the problem Q2, the determination portion 1803 acquires the scale and the requested accuracy of the problem Q2. Here, the scale of the problem Q2 is "4 K", and the requested accuracy of the problem Q2 is "32 bits". Next, with reference to the mode setting table 1700, the determination portion 1803 specifies an arithmetic operable unit of the problem Q2.

For example, among the units that are capable of solving the problem having the scale equal to or larger than scale "4 K" of the problem Q2, the determination portion 1803 specifies the unit having the smallest maximum scale of the solvable problem, as the arithmetic operable unit. In the example of FIG. 17, units 2, 3-1, and 3-2 are specified.

Next, the determination portion 1803 excludes a unit of which the requested accuracy "32 bits" of the problem Q2 is out of the range of the maximum accuracy of the solvable problem, from the specified arithmetic operable units. In the example of FIG. 17, none of the units 2, 3-1, and 3-2 is excluded. However, for the unit 2, it is possible to solve the problem having accuracy higher than the requested accuracy "32 bits" of the problem Q2. Therefore, the determination portion 1803 excludes the unit 2 from the arithmetic operable units on the assumption that the problem having accuracy higher than 32 bits is input. For example, the arithmetic operable units are the units 3-1 and 3-2.

In addition, the determination portion 1803 determines an empty unit among the arithmetic operable units as a unit to which the problem Q2 is assigned. Here, the arithmetic operable unit 3-1 is determined as the unit to which the problem Q2 is assigned. As a result, the assigned unit information 1900-2 is stored in the assigned unit table 1900.

Next, in a case where the acceptance portion 1801 accepts the problem Q3, the determination portion 1803 acquires the scale and the requested accuracy of the problem Q3. Here, the scale of the problem Q3 is "8 K", and the requested accuracy of the problem Q3 is "16 bits". Next, with reference to the mode setting table 1700, the determination portion 1803 specifies an arithmetic operable unit of the problem Q3.

For example, among the units that are capable of solving the problem having the scale equal to or larger than scale "8 K" of the problem Q3, the determination portion 1803 specifies the unit having the smallest maximum scale of the solvable problem, as the arithmetic operable unit. In the example of FIG. 17, the unit 1 is specified.

Next, the determination portion 1803 excludes a unit of which the requested accuracy "16 bits" of the problem Q3 is out of the range of the maximum accuracy of the solvable problem, from the specified arithmetic operable units. In the example of FIG. 17, the unit 1 is not excluded because the requested accuracy "16 bits" of the problem Q3 is within the range of the maximum accuracy of the problem solvable by the unit 1.

In addition, the determination portion 1803 determines an empty unit of the arithmetic operable units as a unit to which the problem Q3 is assigned. Here, the arithmetic operable unit 1 is determined as the unit to which the problem Q3 is assigned. As a result, the assigned unit information 1900-3 is stored in the assigned unit table 1900.

Next, in a case where the acceptance portion 1801 accepts the problem Q4, the determination portion 1803 acquires the scale and the requested accuracy of the problem Q4. Here, the scale of the problem Q4 is "4 K", and the requested accuracy of the problem Q4 is "64 bits". Next, with reference to the mode setting table 1700, the determination portion 1803 specifies an arithmetic operable unit of the problem Q4.

For example, among the units that are capable of solving the problem having the scale equal to or larger than scale "4 K" of the problem Q4, the determination portion 1803 specifies the unit having the smallest maximum scale of the solvable problem, as the arithmetic operable unit. In the example of FIG. 17, units 2, 3-1, and 3-2 are specified.

Next, the determination portion 1803 excludes a unit of which the requested accuracy "64 bits" of the problem Q4 is out of the range of the maximum accuracy of the solvable problem, from the specified arithmetic operable units. In the example of FIG. 17, the requested accuracy "64 bits" of the problem Q4 is out of the range of the maximum accuracy of the problem solvable by the units 3-1 and 3-2. Therefore, the units 3-1 and 3-2 are excluded from the arithmetic operable units. For example, the arithmetic operable unit is the unit 2.

In addition, the determination portion 1803 determines an empty unit among the arithmetic operable units as a unit to which the problem Q4 is assigned. Here, the arithmetic operable unit 2 is determined as the unit to which the problem Q4 is assigned. As a result, the assigned unit information 1900-4 is stored in the assigned unit table 1900.

Next, in a case where the acceptance portion 1801 accepts the problem Q5, the determination portion 1803 acquires the scale and the requested accuracy of the problem Q5. Here, the scale of the problem Q5 is "2 K", and the requested accuracy of the problem Q5 is "64 bits". Next, with reference to the mode setting table 1700, the determination portion 1803 specifies an arithmetic operable unit of the problem Q5.

For example, among the units that are capable of solving the problem having the scale equal to or larger than scale "2 K" of the problem Q5, the determination portion 1803 specifies the unit having the smallest maximum scale of the solvable problem, as the arithmetic operable unit. In the example of FIG. 17, units 4-1, 4-2, 4-3, and 4-4 are specified.

Next, the determination portion 1803 excludes a unit of which the requested accuracy "64 bits" of the problem Q5 is out of the range of the maximum accuracy of the solvable problem, from the specified arithmetic operable units. In the example of FIG. 17, none of the units 4-1, 4-2, 4-3, and 4-4 is excluded.

In addition, the determination portion 1803 determines an empty unit among the arithmetic operable units as a unit to which the problem Q5 is assigned. Here, the arithmetic operable unit 4-1 is determined as the unit to which the problem Q5 is assigned. As a result, the assigned unit information 1900-5 is stored in the assigned unit table 1900.

Next, in a case where the acceptance portion 1801 accepts the problem Q6, the determination portion 1803 acquires the scale and the requested accuracy of the problem Q6. Here, the scale of the problem Q6 is "1 K", and the requested accuracy of the problem Q6 is "128 bits". Next, with reference to the mode setting table 1700, the determination portion 1803 specifies an arithmetic operable unit of the problem Q6.

For example, among the units that are capable of solving the problem having the scale equal to or larger than scale "1 K" of the problem Q6, the determination portion 1803 specifies the unit having the smallest maximum scale of the solvable problem, as the arithmetic operable unit. In the example of FIG. 17, units 5-1, 5-2, 5-3, 5-4, 5-5, 5-6, 5-7, and 5-8 are specified.

Next, the determination portion 1803 excludes a unit of which the requested accuracy "128 bits" of the problem Q6 is out of the range of the maximum accuracy of the solvable problem, from the specified arithmetic operable units. In the example of FIG. 17, none of the units 5-1, 5-2, 5-3, 5-4, 5-5, 5-6, 5-7, and 5-8 is excluded.

In addition, the determination portion 1803 determines an empty unit of the arithmetic operable units as a unit to which the problem Q6 is assigned. Here, the unit 5-1 is the assigned unit of the problem Q1 (assigned unit information 1900-1). Therefore, the arithmetic operable unit 5-2 is determined as the unit to which the problem Q6 is assigned. As a result, the assigned unit information 1900-6 is stored in the assigned unit table 1900.

Next, in a case where the acceptance portion 1801 accepts the problem Q7, the determination portion 1803 acquires the scale and the requested accuracy of the problem Q7. Here, the scale of the problem Q7 is "1 K", and the requested accuracy of the problem Q7 is "128 bits". Next, with reference to the mode setting table 1700, the determination portion 1803 specifies an arithmetic operable unit of the problem Q7.

For example, among the units that are capable of solving the problem having the scale equal to or larger than scale "1 K" of the problem Q7, the determination portion 1803 specifies the unit having the smallest maximum scale of the solvable problem, as the arithmetic operable unit. In the example of FIG. 17, units 5-1, 5-2, 5-3, 5-4, 5-5, 5-6, 5-7, and 5-8 are specified.

Next, the determination portion 1803 excludes a unit of which the requested accuracy "128 bits" of the problem Q7 is out of the range of the maximum accuracy of the solvable problem, from the specified arithmetic operable units. In the example of FIG. 17, none of the units 5-1, 5-2, 5-3, 5-4, 5-5, 5-6, 5-7, and 5-8 is excluded.

In addition, the determination portion 1803 determines an empty unit among the arithmetic operable units as a unit to which the problem Q7 is assigned. Here, the units 5-1 and 5-2 are the assigned units of the problems Q1 and Q6 (assigned unit information 1900-1 and 1900-6). Therefore, the arithmetic operable unit 5-3 is determined as the unit to which the problem Q7 is assigned. As a result, the assigned unit information 1900-7 is stored in the assigned unit table 1900.

Next, in a case where the acceptance portion 1801 accepts the problem Q8, the determination portion 1803 acquires the scale and the requested accuracy of the problem Q8. Here, the scale of the problem Q8 is "4 K", and the requested accuracy of the problem Q8 is "32 bits". Next, with reference to the mode setting table 1700, the determination portion 1803 specifies an arithmetic operable unit of the problem Q8.

For example, among the units that are capable of solving the problem having the scale equal to or larger than scale "4 K" of the problem Q8, the determination portion 1803 specifies the unit having the smallest maximum scale of the solvable problem, as the arithmetic operable unit. In the example of FIG. 17, units 2, 3-1, and 3-2 are specified.

Next, the determination portion 1803 excludes a unit of which the requested accuracy "32 bits" of the problem Q8 is out of the range of the maximum accuracy of the solvable problem, from the specified arithmetic operable units. In the example of FIG. 17, none of the units 2, 3-1, and 3-2 is excluded. However, for the unit 2, it is possible to solve the problem having accuracy higher than the requested accuracy "32 bit" of the problem Q8. Therefore, the unit 2 is excluded from the arithmetic operable units. For example, the arithmetic operable units are the units 3-1 and 3-2.

In addition, the determination portion 1803 determines an empty unit among the arithmetic operable units as a unit to which the problem Q8 is assigned. Here, the unit 3-1 is the assigned unit of the problem Q2 (assigned unit information 1900-2). Therefore, the arithmetic operable unit 3-2 is determined as the unit to which the problem Q8 is assigned. As a result, the assigned unit information 1900-8 is stored in the assigned unit table 1900.

In addition, with reference to the assigned unit table 1900, for example, the execution control portion 1804 is capable of specifying a unit to which each of the problems Q1 to Q8 determined by the determination portion 1803 is assigned. Further, when the arithmetic operation of each problem is completed, the assigned unit information in the assigned unit table 1900 that corresponds to each problem is deleted.

Next, a case where the optimization problem arithmetic device 101 is applied to an on-premises server and only a unit in some partition modes is prepared will be described. First, the stored contents of the mode setting table 2000 included in the optimization problem arithmetic device 101 (on-premises) will be described.

FIG. 20 is an explanatory diagram illustrating an example of the stored contents of the mode setting table 2000. In FIG. 20, the mode setting table 2000 has fields of a unit ID, a partition mode, and a problem scale and accuracy, and stores mode setting information 2000-1 to 2000-9 as records by setting information in each of the fields.

The stored contents of the mode setting table 2000 are different from those of the mode setting table 1700 illustrated in FIG. 17 because the units prepared in advance are different.

Next, the assigned unit table 2100 used by the optimization problem arithmetic device 101 (on-premises) will be described.

FIG. 21 is an explanatory diagram illustrating an example of the stored contents of the assigned unit table 2100. In FIG. 21, the assigned unit table 2100 has fields of a problem number, a problem scale, accuracy, an arithmetic operable unit, and a assigned unit, and stores the assigned unit information (for example, assigned unit information 2100-1 to 2100-5) by setting the information to each field as a record.

Hereinafter, a determination example of assigned units of each of problems Q1' to Q5' will be described by taking a case where the problems Q1' to Q5' are sequentially accepted as an example.

First, in a case where the acceptance portion 1801 accepts the problem Q1', the determination portion 1803 acquires the scale and the requested accuracy of the problem Q1'. Here, the scale of the problem Q1' is "1 K", and the requested accuracy of the problem Q1' is "128 bits". Next, with reference to the mode setting table 2000 illustrated in FIG. 20, the determination portion 1803 specifies an arithmetic operable unit of the problem Q1'.

For example, among the units that are capable of solving the problem having the scale equal to or larger than scale "1 K" of the problem Q1', the determination portion 1803 specifies the unit having the smallest maximum scale of the solvable problem, as the arithmetic operable unit. In the example of FIG. 20, units 2-1, 2-2, 2-3, 2-4, 2-5, 2-6, 2-7, and 2-8 are specified.

Next, the determination portion 1803 excludes a unit of which the requested accuracy "128 bits" of the problem Q1' is out of the range of the maximum accuracy of the solvable problem, from the specified arithmetic operable units. In the example of FIG. 20, none of the units 2-1, 2-2, 2-3, 2-4, 2-5, 2-6, 2-7, and 2-8 is excluded.

In addition, the determination portion 1803 determines an empty unit among the arithmetic operable units as a unit to which the problem Q1' is assigned. Here, the arithmetic operable unit 2-1 is determined as the unit to which the problem Q1' is assigned. As a result, the assigned unit information 2100-1 is stored in the assigned unit table 2100.

Next, in a case where the acceptance portion 1801 accepts the problem Q2', the determination portion 1803 acquires the scale and the requested accuracy of the problem Q2'. Here, the scale of the problem Q2' is "8 K", and the requested accuracy of the problem Q2' is "16 bits". Next, with reference to the mode setting table 2000, the determination portion 1803 specifies an arithmetic operable unit of the problem Q2'.

For example, among the units that are capable of solving the problem having the scale equal to or larger than scale "8 K" of the problem Q2', the determination portion 1803 specifies the unit having the smallest maximum scale of the solvable problem, as the arithmetic operable unit. In the example of FIG. 20, the unit 1 is specified.

Next, the determination portion 1803 excludes a unit of which the requested accuracy "16 bits" of the problem Q2' is out of the range of the maximum accuracy of the solvable problem, from the specified arithmetic operable units. In the example of FIG. 20, the unit 1 is not excluded because the requested accuracy "16 bits" of the problem Q2' is within the range of the maximum accuracy of the problem solvable by the unit 1.

In addition, the determination portion 1803 determines an empty unit among the arithmetic operable units as a unit to which the problem Q2' is assigned. Here, the arithmetic operable unit 1 is determined as the unit to which the problem Q2' is assigned. As a result, the assigned unit information 2100-2 is stored in the assigned unit table 2100.

Next, in a case where the acceptance portion 1801 accepts the problem Q3', the determination portion 1803 acquires the scale and the requested accuracy of the problem Q3'. Here, the scale of the problem Q3' is "1 K", and the requested accuracy of the problem Q3' is "128 bits". Next, with reference to the mode setting table 2000, the determination portion 1803 specifies an arithmetic operable unit of the problem Q3'.

For example, among the units that are capable of solving the problem having the scale equal to or larger than scale "1 K" of the problem Q3', the determination portion 1803 specifies the unit having the smallest maximum scale of the solvable problem, as the arithmetic operable unit. In the example of FIG. 20, units 2-1, 2-2, 2-3, 2-4, 2-5, 2-6, 2-7, and 2-8 are specified.

Next, the determination portion 1803 excludes a unit of which the requested accuracy "128 bits" of the problem Q3' is out of the range of the maximum accuracy of the solvable problem, from the specified arithmetic operable units. In the example of FIG. 20, none of the units 2-1, 2-2, 2-3, 2-4, 2-5, 2-6, 2-7, and 2-8 is excluded.

In addition, the determination portion 1803 determines an empty unit among the arithmetic operable units as a unit to which the problem Q3' is assigned. Here, the unit 2-1 is the assigned unit of the problem Q1' (assigned unit information 2100-1). Therefore, the arithmetic operable unit 2-2 is determined as the unit to which the problem Q3' is assigned. As a result, the assigned unit information 2100-3 is stored in the assigned unit table 2100.

Next, in a case where the acceptance portion 1801 accepts the problem Q4', the determination portion 1803 acquires the scale and the requested accuracy of the problem Q4'. Here, the scale of the problem Q4' is "4 K", and the requested accuracy of the problem Q4' is "64 bits". Next, with reference to the mode setting table 2000, the determination portion 1803 specifies an arithmetic operable unit of the problem Q4'.

For example, among the units that are capable of solving the problem having the scale equal to or larger than scale "4 K" of the problem Q4', the determination portion 1803 specifies the unit having the smallest maximum scale of the solvable problem, as the arithmetic operable unit. In the example of FIG. 20, the unit 1 is specified.

Next, the determination portion 1803 excludes a unit of which the requested accuracy "64 bits" of the problem Q4' is out of the range of the maximum accuracy of the solvable problem, from the specified arithmetic operable units. In the example of FIG. 20, the unit 1 is not excluded because the requested accuracy "64 bits" of the problem Q4' is within the range of the maximum accuracy of the problem solvable by the unit 1.

In addition, the determination portion 1803 determines an empty unit of the arithmetic operable units as a unit to which the problem Q4' is assigned. Here, the unit 1 is the assigned unit of the problem Q2' (assigned unit information 2100-2). In addition, there is no arithmetic operable unit other than the unit 1.

In this case, the determination portion 1803 waits for the unit 1 to finish the arithmetic operation of the problem Q2'. For example, the determination portion 1803 inputs the problem Q4' in a queue that corresponds to the unit 1 (optimization device 408 ($1)). As a result, the assigned unit information 2100-4 is stored in the assigned unit table 2100. In the assigned unit information 2100-4, the assigned unit is "waiting".

Next, in a case where the acceptance portion 1801 accepts the problem Q5', the determination portion 1803 acquires the scale and the requested accuracy of the problem Q5'. Here, the scale of the problem Q5' is "1 K", and the requested accuracy of the problem Q5' is "128 bits". Next, with reference to the mode setting table 2000, the determination portion 1803 specifies an arithmetic operable unit of the problem Q5'.

For example, among the units that are capable of solving the problem having the scale equal to or larger than scale "1 K" of the problem Q5', the determination portion 1803 specifies the unit having the smallest maximum scale of the solvable problem, as the arithmetic operable unit. In the example of FIG. 20, units 2-1, 2-2, 2-3, 2-4, 2-5, 2-6, 2-7, and 2-8 are specified.

Next, the determination portion 1803 excludes a unit of which the requested accuracy "128 bits" of the problem Q5' is out of the range of the maximum accuracy of the solvable problem, from the specified arithmetic operable units. In the example of FIG. 20, none of the units 2-1, 2-2, 2-3, 2-4, 2-5, 2-6, 2-7, and 2-8 is excluded.

In addition, the determination portion 1803 determines an empty unit among the arithmetic operable units as a unit to which the problem Q5' is assigned. Here, the units 2-1 and 2-2 are the assigned units of the problems Q1' and Q3' (assigned unit information 2100-1 and 2100-3). Therefore, the arithmetic operable unit 2-3 is determined as the unit to which the problem Q5' is assigned. As a result, the assigned unit information 2100-5 is stored in the assigned unit table 2100.

In addition, when the arithmetic operation of the problem Q2' in the unit 1 is completed, the assigned unit information 2100-2 is deleted from the assigned unit table 2100, and the unit 1 is determined as the unit to which the problem Q4' is assigned. As a result, the unit ID "1" is set as the assigned unit of the assigned unit information 2100-4.

Next, the optimization problem arithmetic processing procedure of the optimization problem arithmetic device 101 will be described. The optimization problem arithmetic processing of the optimization problem arithmetic device 101 is executed, for example, in parallel for each combinational optimization problem.

Figure 22A:
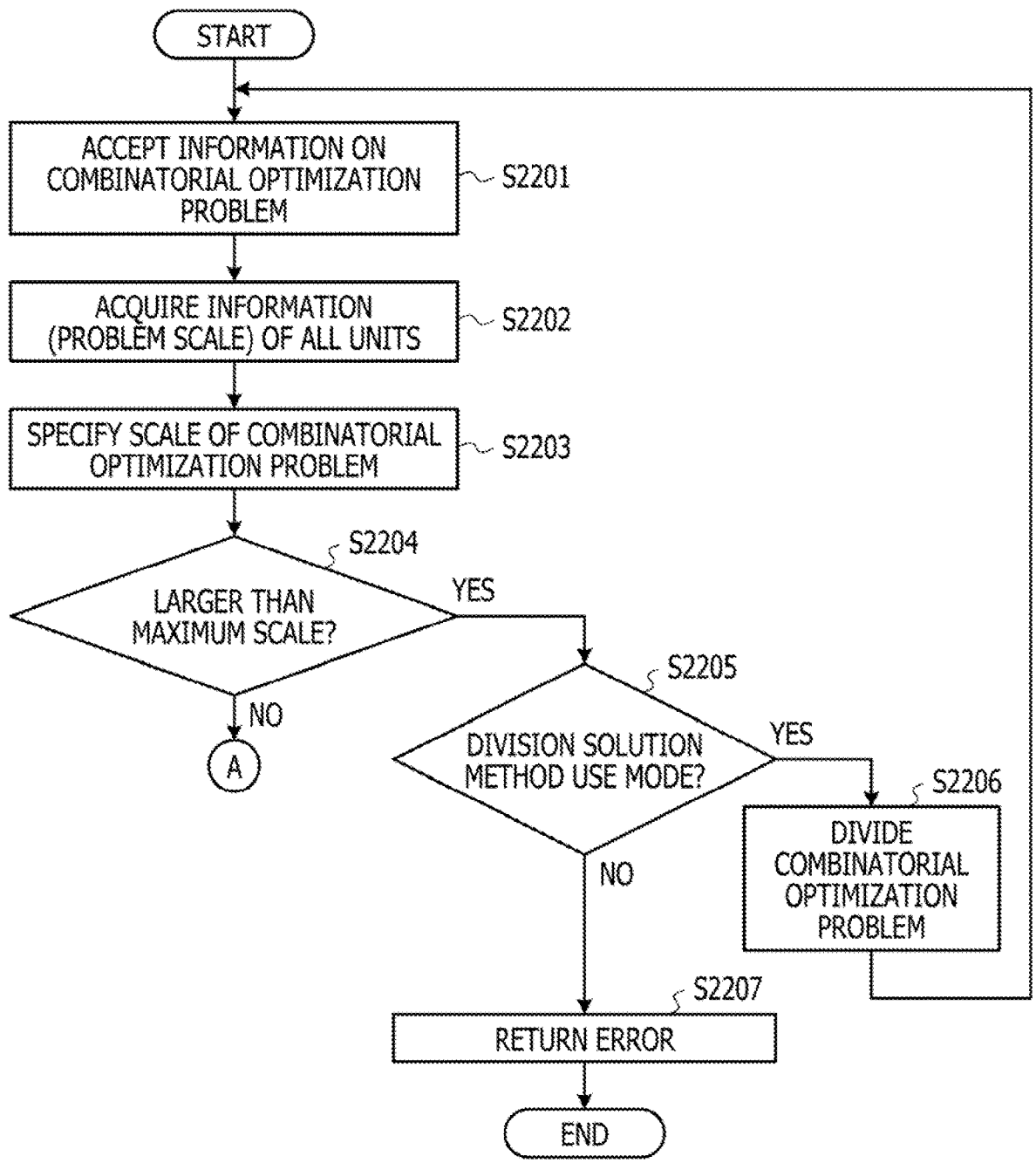
FIGS. 22A and 22B are a flowchart (part 1) illustrating an example of an optimization problem arithmetic processing procedure of the optimization problem arithmetic device.
Figure 22B:
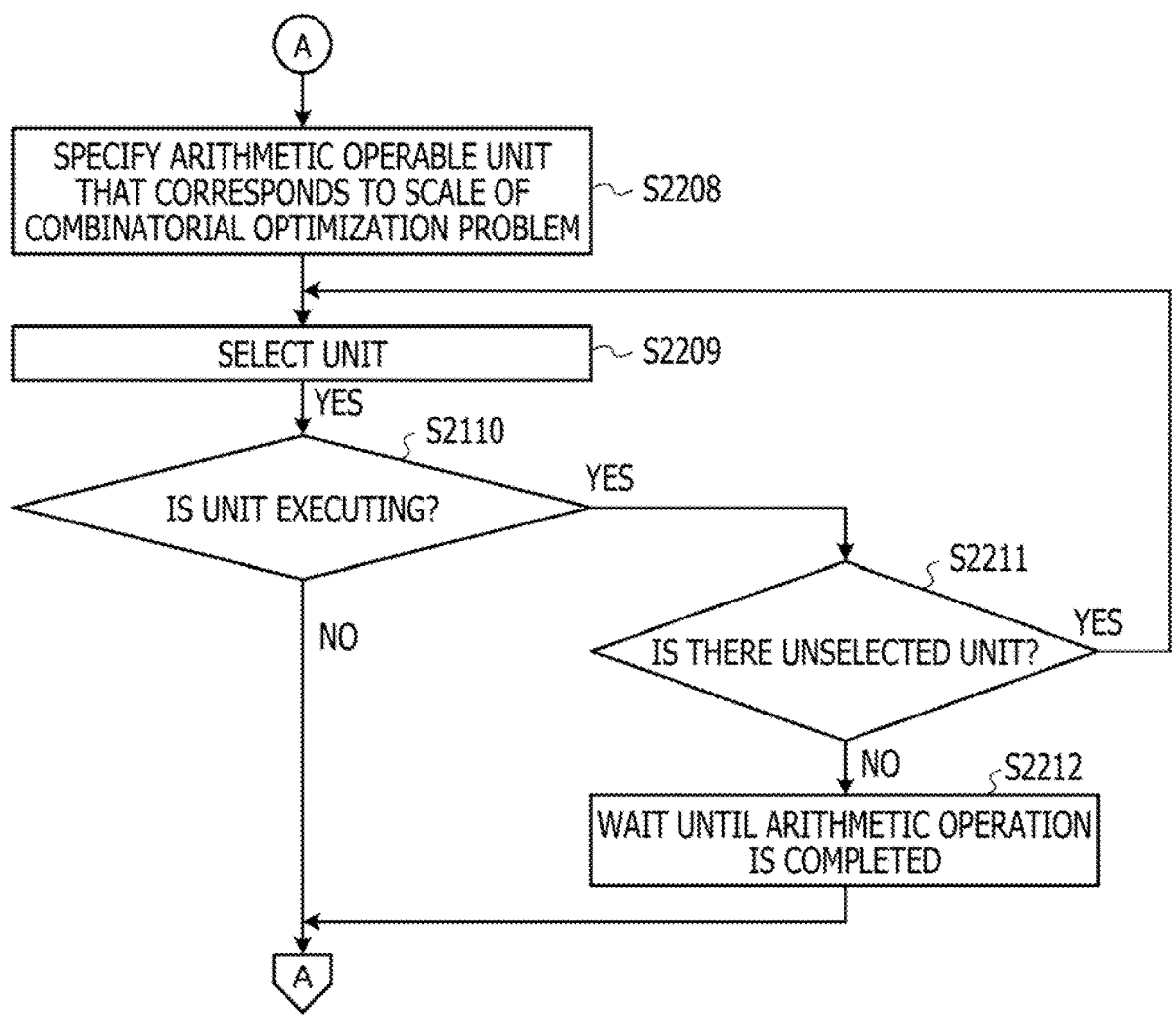
Figure 23:
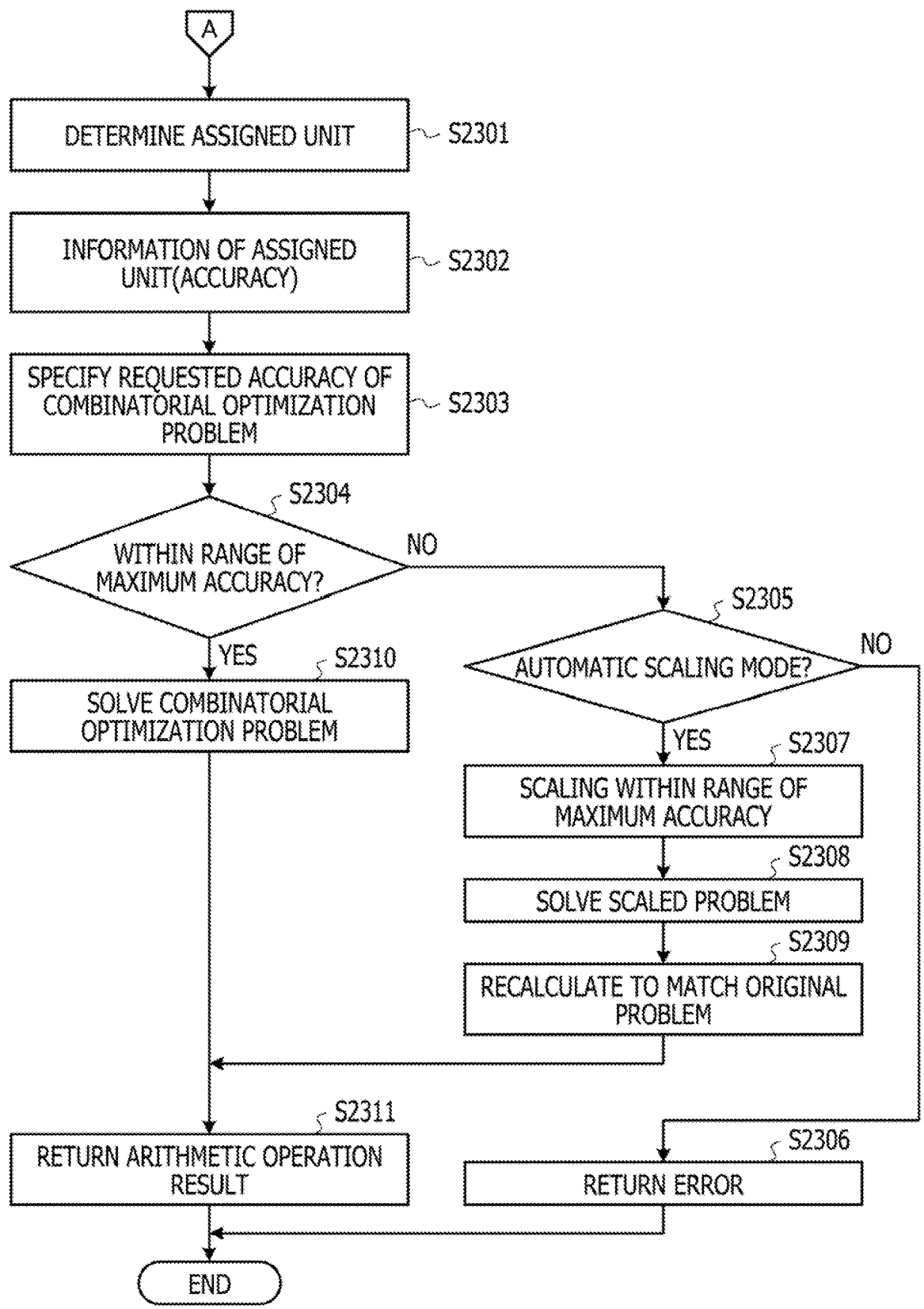
FIG. 23 is a flowchart (part 2) illustrating an example of an optimization problem arithmetic processing procedure of the optimization problem arithmetic device.

FIGS. 22A, 22B and 23 are flowcharts illustrating an example of the optimization problem arithmetic processing procedure of the optimization problem arithmetic device 101. In the flowchart of FIGS. 22A and 22B, first, the optimization problem arithmetic device 101 accepts information on a combinatorial optimization problem that is the calculation target (step S2201).

Next, with reference to the mode setting table 1700, the optimization problem arithmetic device 101 acquires information (problem scale) of all units (step S2202). The unit information (problem scale) is information indicating the maximum scale (number of spin bits) of the solvable problem by the unit. Next, the optimization problem arithmetic device 101 specifies the scale of the accepted combinatorial optimization problem (step S2203).

In addition, the optimization problem arithmetic device 101 determines whether the scale of the specified combinatorial optimization problem is larger than the maximum scale among the problem scales of all units, based on the acquired Information (problem scale) of all units. (step S2204). Here, in a case where the scale of the combinatorial optimization problem is larger than the maximum scale (step S2204: YES), the optimization problem arithmetic device 101 determines whether a division solution method use mode is set (step S2205).

In addition, the division solution method use mode is a mode in which a problem is divided and solved by the division solution method. It is possible to set the division solution method use mode in any manner in advance.

Here, in a case where the division solution method use mode is set (step S2205: YES), the optimization problem arithmetic device 101 divides the accepted combinatorial optimization problem using a division solver or the like (step S2206), and returns to step S2201. As a result, in step S2201, the problem after the division is accepted as a combinatorial optimization problem that is the calculation target.

Meanwhile, in a case where the division solution method use mode is not set (step S2205: NO), the optimization problem arithmetic device 101 returns an error to the user (step S2207), and ends the series of processes according to the flowchart.

In addition, in step S2204, in a case where the scale of the combinatorial optimization problem is not larger than the maximum scale (step S2204: NO), with reference to the mode setting table 1700, the optimization problem arithmetic device 101 specifies the arithmetic operable unit that corresponds to the scale of the combinatorial optimization problem (step S2208). For example, among the units that are capable of solving the problem having the scale equal to or larger than scale of the combinatorial optimization problem, the optimization problem arithmetic device 101 specifies the unit having the smallest maximum scale of the solvable problem, as the arithmetic operable unit.

Next, the optimization problem arithmetic device 101 selects an unselected unit which has not been selected among the specified arithmetic operable units (step S2209). In addition, with reference to the mode setting table 1700, the optimization problem arithmetic device 101 determines whether the selected unit is executing the arithmetic operation (step S2210).

Here, in a case where the selected unit is not executing the arithmetic operation (step S2210: NO), the optimization problem arithmetic device 101 proceeds to step S2301 illustrated in FIG. 23.

Meanwhile, in a case where the selected unit is executing the arithmetic operation (step S2210: YES), the optimization problem arithmetic device 101 determines whether there is an unselected unit among the specified arithmetic operable units (step S2211). Here, in a case where there is an unselected unit (step S2211: YES), the optimization problem arithmetic device 101 returns to step S2209.

Meanwhile, in a case where there is no unselected unit (step S2211: NO), the optimization problem arithmetic device 101 waits until the arithmetic operation of the selected unit is completed (step S2212), and proceeds to step S2301 illustrated in FIG. 23.

In the flowchart of FIG. 23, first, the optimization problem arithmetic device 101 determines the selected unit as the unit to which the combinatorial optimization problem is assigned (step S2301). In addition, with reference to the mode setting table 1700, the optimization problem arithmetic device 101 acquires information (accuracy) of the determined assigned unit (step S2302). The unit Information (accuracy) is information Indicating the maximum accuracy (number of bits of weighting factors) of the problem solvable by the unit.

Next, the optimization problem arithmetic device 101 specifies the requested accuracy of the accepted combinatorial optimization problem (step S2303). In addition, the optimization problem arithmetic device 101 determines whether the requested accuracy of the specified combinatorial optimization problem is within the range of the maximum accuracy of the assigned unit, based on the acquired information (accuracy) of the unit. (step S2304).

Here, in a case where the requested accuracy of the combinatorial optimization problem is out of the range of the maximum scale (step S2304: NO), the optimization problem arithmetic device 101 determines whether an automatic scaling mode is set (step S2305). In addition, the automatic scaling mode is a mode that solves a problem by scaling within the range of the maximum accuracy. It is possible to set the automatic scaling mode in any manner in advance.

Here, in a case where the automatic scaling mode is not set (step S2305: NO), the optimization problem arithmetic device 101 returns an error to the user (step S2306), and ends the series of processes according to the flowchart.

Meanwhile, in a case where the automatic scaling mode is set (step S2305: YES), the optimization problem arithmetic device 101 scales (N times) the combinatorial optimization problem within the range of the maximum accuracy of the assigned unit (step S2307).

Next, the optimization problem arithmetic device 101 solves the problem scaled by the assigned unit (step S2308). In addition, the optimization problem arithmetic device 101 recalculates (1/N times) the energy to match the original problem (step S2309), and proceeds to step S2311.

Further, in step S2304, in a case where the requested accuracy of the combinatorial optimization problem is within the range of the maximum accuracy (step S2304: YES), the optimization problem arithmetic device 101 solves the combinatorial optimization problem with the assigned unit (step S2310).

In addition, the optimization problem arithmetic device 101 returns the arithmetic operation result of the combinatorial optimization problem to the user (step S2311), and ends the series of processes according to the flowchart. Accordingly, it is possible to perform the arithmetic operation using appropriate hardware resources that correspond to the scale of the combinatorial optimization problem, and to efficiently solve the combinatorial optimization problem.

Next, a more specific device configuration example of the optimization device 408 will be described. The optimization device 408 ($j$) described below is different from the optimization device 408 ($j$) described with reference to FIGS. 5 to 16 in some parts of the circuit configuration.

Figure 24:
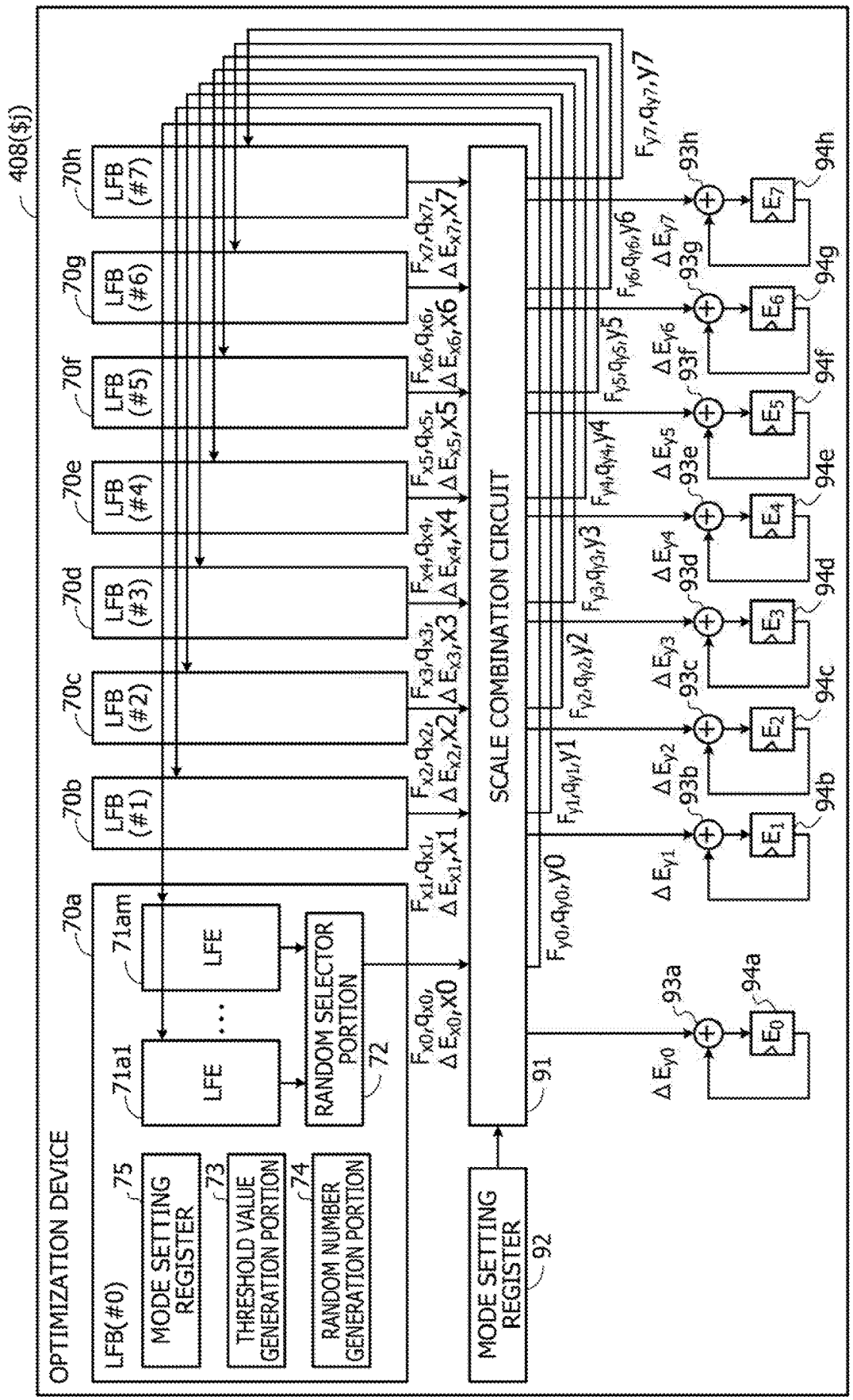
FIG. 24 is an explanatory diagram illustrating a device configuration example of the optimization device ($j)

FIG. 24 is an explanatory diagram illustrating the device configuration example of the optimization device 408 ($j$). The optimization device 408 ($j$) has a plurality of LFBs. The optimization device 408 ($j$) includes the control portion 504 that controls the plurality of LFBs (not illustrated).

Here, as an example, the number of LFEs that belong to one LFB is m (m is an integer of 2 or more), and the optimization device 408 ($j$) is a device including LFBs 70a, 70b, 70c, 70d, 70e, 70f, 70g, and 70h. In this case, the optimization device 408 ($j$) has a total of 8m LFEs, and is capable of realizing the maximum scale of 8m bits. In the optimization device 408 ($j$), for example, a partition is realized by one or more LFBs among the LFBs 70a, 70b, 70c, 70d, 70e, 70f, 70g, and 70h. However, the number of LFBs provided in the optimization device 408 ($j$) is not limited to eight, and may be another number.

The plurality of LFEs included in the LFBs 70a, . . . , and 70h are examples of the bit arithmetic circuits 1a1, . . . , and 1aN Illustrated in FIG. 2. It is possible to say that each of the LFBs 70a, . . . , and 70h is one group of LFEs including a predetermined number (m) of LFEs as elements. In addition, identification numbers #0 to #7 are assigned to each of the LFBs 70a, . . . , and 70h.

The optimization device 408 ($j$) further includes a scale combination circuit 91, a mode setting register 92, adders 93a, 93b, 93c, 93d, 93e, 93f, 93g, and 93h, and E storage registers 94a, 94b, 94c, 94d, 94e, 94f, 94g, and 94h.

Here, the LFB 70a includes LFEs 71a1, ..., and 71am, a random selector portion 72, a threshold value generation portion 73, a random number generation portion 74, and a mode setting register 75. Since the LFEs 71a1, ..., and LFE 71am, the random selector portion 72, the threshold value generation portion 73, the random number generation portion 74, and the mode setting register 75 correspond to the hardware with the same name described in FIG. 8, and the description thereof will be omitted. However, the random selector portion 72 outputs a set of state signals (flag $F_{x0}$, spin bit $q_{x0}$, and energy change amount $\Delta E_{x0}$) for the selected inverted bit, to the scale combination circuit 91. Further, the random selector portion 72 may not have (but may have) the flag control portion 52a. For example, in the random selector portion 72, state signals from each LFE are input into each selection circuit in the first stage of the random selector portion 72 without passing through the flag control portion 52a, two at a time. In addition, the LFBs 70b, ..., and 70h also have the same circuit configuration as the LFB 70a.

The scale combination circuit 91 accepts the state signals from each of the LFBs 70a, ..., and 70h, and selects an inverted bit based on the state signals. The scale combination circuit 91 supplies the signals related to the inverted bit to each LFE of the LFBs 70a, ..., and 70h.

For example, the scale combination circuit 91 outputs a flag $F_{y0}$, a bit $q_{y0}$, and index=y0 indicating the inverted bit, to the LFEs 71a1 to 71am of the LFB 70a1. Here, in the following drawings, the notation, such as "index=x0" output by the random selector portion 72 and the scale combination circuit 91 may be abbreviated as "x0". The scale combination circuit 91 outputs the energy change amount $\Delta E_{y0}$ to the adder 93a.

In addition, the scale combination circuit 91 supplies a flag $F_{y1}$, a bit $q_{y1}$, and index=y1 indicating the inverted bit, to each LFE of the LFB 70b. The energy change amount $\Delta E_{y1}$ is output to the adder 93b.

The scale combination circuit 91 outputs a flag $F_{y2}$, a bit $q_{y2}$, and index=y2 indicating the inverted bit, to each LFE of the LFB 70c. The scale combination circuit 91 outputs the energy change amount $\Delta E_{y2}$ to the adder 93c.

The scale combination circuit 91 outputs a flag $F_{y3}$, a bit $q_{y3}$, and index=y3 indicating the inverted bit, to each LFE of the LFB 70d. The scale combination circuit 91 outputs the energy change amount $\Delta E_{y3}$ to the adder 93d.

The scale combination circuit 91 outputs a flag $F_{y4}$, a bit $q_{y4}$, and index=y4 indicating the inverted bit, to each LFE of the LFB 70e. The scale combination circuit 91 outputs the energy change amount $\Delta E_{y4}$ to the adder 93e.

The scale combination circuit 91 outputs a flag $F_{y5}$, a bit $q_{y5}$, and index=y5 indicating the inverted bit, to each LFE of the LFB 70f. The scale combination circuit 91 outputs the energy change amount $\Delta E_{y5}$ to the adder 93f.

The scale combination circuit 91 outputs a flag $F_{y6}$, a bit $q_{y6}$, and index=y6 indicating the inverted bit, to each LFE of the LFB 70g. The scale combination circuit 91 outputs the energy change amount $\Delta E_{y6}$ to the adder 93g.

The scale combination circuit 91 outputs a flag $F_{y7}$, a bit $q_{y7}$, and index=y7 indicating the inverted bit, to each LFE of the LFB 70h. The scale combination circuit 91 outputs the energy change amount $\Delta E_{y7}$ to the adder 93h.

The random selector portion (including the random selector portion 72) and the scale combination circuit 91 included in each of the LFBs 70a, ..., and 70h are examples of the selection circuit portion 2 illustrated in FIG. 2.

The mode setting register 92 sets an operation mode (partition mode) for the scale combination circuit 91. For example, the mode setting register 92 sets the operation mode (partition mode) for the scale combination circuit 91 in accordance with the scale (the number of spin bits) and the accuracy (the number of bits of the weighting factors) input from the execution control portion 1804 of the optimization problem arithmetic device 101. The mode setting register 92 sets the same operation mode as the operation mode set in the LFEs 71a1, ..., and 71am and the random selector portion 72 by the mode setting register 75, for the scale combination circuit 91. The details of mode setting by the mode setting registers 75 and 92 will be described later. The mode setting register (including the mode setting register 75) and the mode setting register 92 which are included in each of the LFBs 70a, ..., and 70h, are examples of the setting change portion 5 illustrated in FIG. 2.

The adder 93a updates the energy value $E_0$ by adding $\Delta E_{y0}$ to the energy value $E_0$ stored in the E storage register 94a. The E storage register 94a takes in, for example, the energy value $E_0$ calculated by the adder 93a in synchronization with a clock signal (not illustrated) (the same is also applied to other E storage registers).

The adder 93b updates the energy value Et by adding $\Delta E_{y1}$ to the energy value $E_1$ stored in the E storage register 94b. The E storage register 94b takes in the energy value $E_1$ calculated by the adder 93b.

The adder 93c updates the energy value $E_2$ by adding $\Delta E_{y2}$ to the energy value $E_2$ stored in the E storage register 94c. The E storage register 94c takes in the energy value $E_2$ calculated by the adder 93c.

The adder 93d updates the energy value $E_3$ by adding $\Delta E_{y3}$ to the energy value $E_3$ stored in the E storage register 94d. The E storage register 94d takes in the energy value $E_3$ calculated by the adder 93d.

The adder 93e updates the energy value $E_4$ by adding $\Delta E_{y4}$ to the energy value $E_4$ stored in the E storage register 94e. The E storage register 94e takes in the energy value $E_4$ calculated by the adder 93e.

The adder 93f updates the energy value $E_5$ by adding $\Delta E_{y5}$ to the energy value $E_5$ stored in the E storage register 94f. The E storage register 94f takes in the energy value $E_5$ calculated by the adder 93f.

The adder 93g updates the energy value $E_6$ by adding $\Delta E_{y6}$ to the energy value $E_6$ stored in the E storage register 94g. The E storage register 94g takes in the energy value $E_6$ calculated by the adder 93g.

The adder 93h updates the energy value $E_7$ by adding $\Delta E_{y7}$ to the energy value $E_7$ stored in the E storage register 94h. The E storage register 94h takes in the energy value $E_7$ calculated by the adder 93h.

Each of the E storage registers 94a, ..., and 94h is, for example, a flip flop.

Next, a circuit configuration example of the LFB 70a will be described. The LFBs 70b, ..., and 70h also have the same circuit configuration as the LFB 70a.

Figure 25:
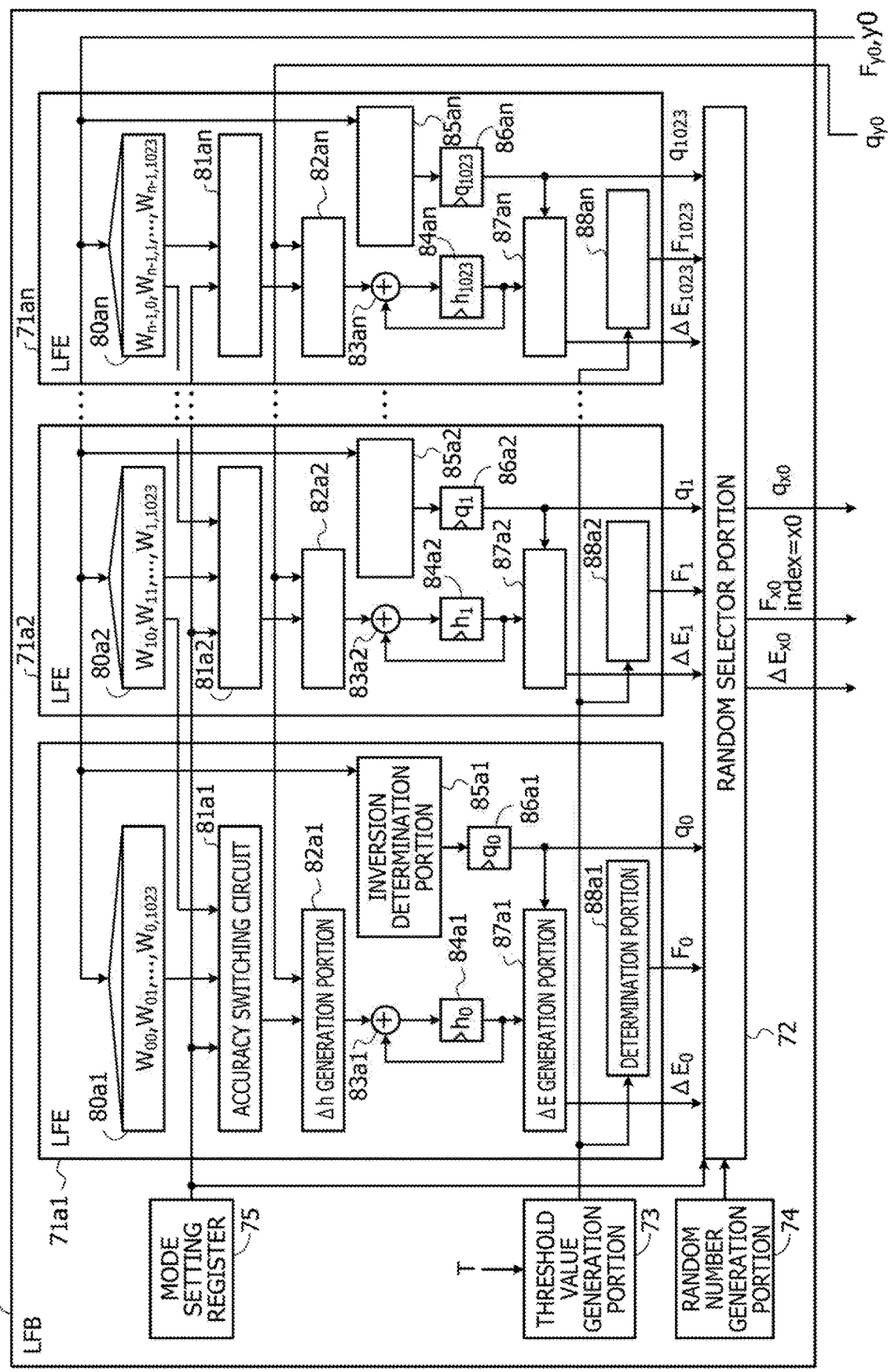
FIG. 25 is an explanatory diagram illustrating a circuit configuration example of the LFB.

FIG. 25 is an explanatory diagram illustrating a circuit configuration example of the LFB. Each of the LFEs 711a, 71a2, ..., and 71am is used as one bit of a spin bit. m is an integer of 2 or more and indicates the number of LFEs included in the LFB 50. In the example of FIG. 25, as an example, m=1024. However, m may be another value.

Identification Information (index) is associated with each of the LFEs 71a1, 71a2, ..., and 71am. For each of the LFEs 71a1, 71a2, ..., and 71am, index=0, 1, ..., and 1023.

A circuit configuration of the LFE 71a1 will be described below. The LFEs 71a2, ..., and 71am are also realized by the same circuit configuration as the LFE 71a1. For the description of the circuit configuration of the LFEs 71a2, . . . , and 71am, the "a1" part at the end of the reference numerals of each element in the following description may be substituted and replaced with each of "a2", . . . , and "am" (for example, reference numeral "80a1" may be replaced with "80am").

The LFE 71a1 includes an SRAM 80a1, an accuracy switching circuit 81a1, a Δh generation portion 82a1, an adder 83a1, an h storage register 84a1, an inversion determination portion 85a1, a bit storage register 86a1, a ΔE generation portion 87a1, and a determination portion 88a1.

Here, each of the SRAM 80a1, the accuracy switching circuit 81a1, the Δh generation portion 82a1, the adder 83a1, the h storage register 84a1, the inversion determination portion 85a1, the bit storage register 86a1, the ΔE generation portion 87a1, and the determination portion 88a1, has a function similar to that of the hardware with the same name described in FIG. 8. However, the index=y0 output from the scale combination circuit 91 and the flag $F_{y0}$ indicating the inversion availability are supplied to the SRAM 80a1 (or the accuracy switching circuit 81a1) and the inversion determination portion 85a1. Further, the inverted bit $q_{y0}$ output from the scale combination circuit 91 is supplied to the Δh generating portion 82a1.

The mode setting register 75 sets the number of bits of the weighting factors (accuracy) for the accuracy switching circuits 81a1, 81a2, . . . , and 81am. The mode setting register 75 does not have a signal line for performing the setting with respect to the random selector portion 72 (however, the signal line may be provided). Here, as an example, it is possible to use the five types of modes described above.

The first mode is a mode with scale of 1 Kbit and accuracy 128 bits, and corresponds to the partition mode "8P (eight divisions)". The mode with scale of 1 Kbit and accuracy of 128 bits uses one LFB. It is possible to realize each partition of the mode by only one of the LFBs 70a, . . . , and 70h.

The second mode is a mode with scale of 2 Kbits and accuracy 64 bits, and corresponds to the partition mode "4P (four divisions)". The mode with scale of 2 Kbits and accuracy of 64 bits uses two LFBs. For example, it is possible to realize each partition of the mode by any one of the combination of LFBs 70a and 70b, the combination of LFBs 70c and 70d, the combination of LFBs 70e and 70f, and the combination of LFBs 70g an 70h.

The third mode is a mode with scale of 4 Kbits and accuracy 32 bits, and corresponds to the partition mode "2P (two divisions)". The mode with a scale of 4 Kbits and accuracy of 32 bits uses four LFBs. For example, it is possible to realize each partition of the mode by any one of the combination of LFBs 70a, 70b, 70c, and 70d, and the combination of LFBs 70e, 70f, 70g, and 70h.

The fourth mode is a mode with scale of 8 Kbits and accuracy 16 bits, and corresponds to the partition mode "FULL (scale: 8 K, accuracy: 16 bits)". The mode with scale of 8 Kbits and accuracy of 16 bits uses eight LFBs. It is possible to realize the partitions of the mode by using the LFBs 70a, . . . , and 70h.

The fifth mode is a mode with scale of 4 Kbits and accuracy 64 bits, and corresponds to the partition mode "FULL (scale: 4 K, accuracy: 64 bits)". The mode with scale of 4 Kbits and accuracy of 64 bits uses eight LFBs. It is possible to realize the partitions of the mode by using the LFBs 70a, . . . , and 70h. However, as described in FIG. 16, the number of LFEs used in one LFB is half the number of LFEs provided in one LFB.

In addition, the optimization device 40S ($j) combines the mode with scale of 1 Kbit and accuracy of 128 bits, the mode with scale of 2 Kbits and accuracy of 64 bits, and the mode with scale of 4 Kbits and accuracy of 32 bits, and is capable of executing the arithmetic operation with respect to the same problem and other problems in parallel.

Therefore, the scale combination circuit 91 selects the number of LFBs to be combined in order to include the number of LFEs that corresponds to the number of spin bits in accordance with the setting of the number of spin bits by the mode setting register 92 for the plurality of LFBs (combinations of LFBs). The scale combination circuit 91 has, for example, the following circuit configuration.

Figure 26:
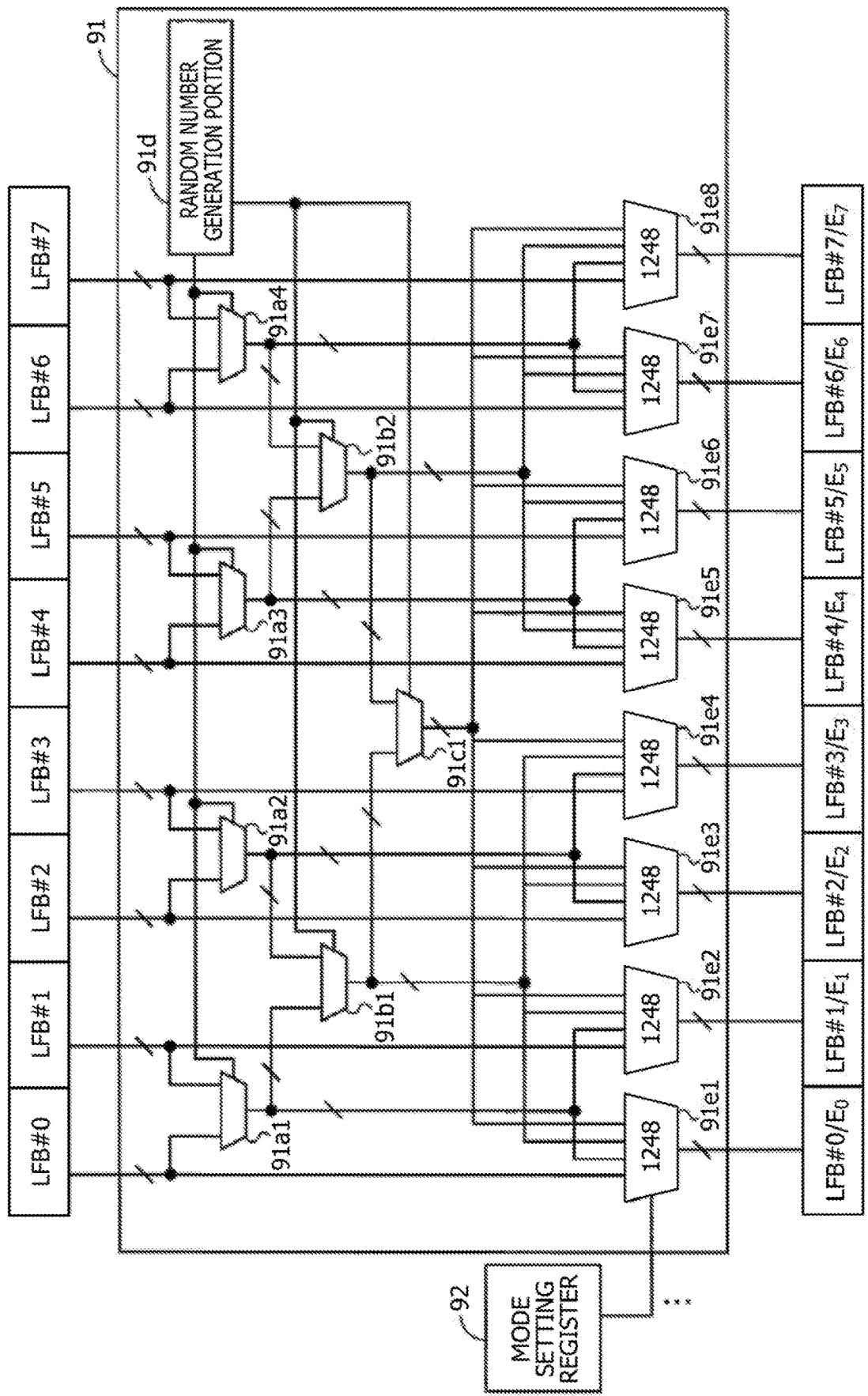
FIG. 26 is an explanatory diagram illustrating a circuit configuration example of a scale combination circuit.

FIG. 26 is an explanatory diagram illustrating a circuit configuration example of the scale combination circuit. The scale combination circuit 91 includes selection circuits 91a1, 91a2, 91a3, 91a4, 91b1, 91b2, and 91c1 coupled in a plurality of stages in a tree shape, a random number generation portion 91d, and mode selection circuits 91e1, 91e2, 91e3, 91e4, 91e5, 91e6, 91e7, and 91e8.

Sets of the variables $q_i$, $F_i$, $\Delta E_i$, and index=i (state signals) output from each of the LFBs 70a, . . . , and 70h, are input into each of the selection circuits 91a1, . . . , and 91a4 in the first stage, two at a time. For example, a set of ($q_{x0}$, $F_{x0}$, $\Delta E_{x0}$, index=x0) output by the LFB 70a (#0) and a set of ($q_{x1}$, $F_{x1}$, $\Delta E_{x1}$, index=x1) output by the LFB 70b (#1), are input into the selection circuit 91a1. In addition, a set of ($q_{x2}$, $F_{x2}$, $\Delta E_{x2}$, index=x2) output by the LFB 70c (#2) and a set of ($q_{x3}$, $F_{x3}$, $\Delta E_{x3}$, index=x3) output by the LFB 70d (#3), are input into the selection circuit 91a2. A set of ($q_{x4}$, $F_{x4}$, $\Delta E_{x4}$, index=x4) output by the LFB 70e (#4) and a set of ($q_{x5}$, $F_{x5}$, $\Delta E_{x5}$, index=x5) output by the LFB 70f (#5), are input into the selection circuit 91a3. A set of ($q_{x6}$, $F_{x6}$, $\Delta E_{x6}$, index=x6) output by the LFB 70g (#6) and a set of ($q_{x7}$, $F_{x7}$, $\Delta E_{x7}$, index=x7) output by the LFB 70h (#7), are input into the selection circuit 91a4.

In addition, each of the selection circuits 91a1, . . . , and 91a4 selects one set ($x_i$, $F_i$, $\Delta E_i$, index=i) of two sets based on the 1-bit random number output from the random number generation portion 91d. At this time, each of the selection circuits 91a1, . . . , and 91a4 preferentially selects a certain set in which $F_i$ is 1, and selects one of the sets based on a 1-bit random number in a case where $F_i$ in both sets are 1 (the same is also applied to the selection circuits 91b1, 91b2, and 91c1). Here, the random number generation portion 91d individually generates a 1-bit random number for each selection circuit, and supplies the generated 1-bit random number to each selection circuit. Further, each of the selection circuits 91a1, . . . , and 91a4 generates an identification value indicating which set is selected based on the indexes included in both sets, and outputs a state signal including the selected variables $q_i$, $F_i$, $\Delta E_i$, and the identification value. In addition, the identification values output by each of the selection circuits 91a1, . . . , and 91a4 increases by one bit more than the input index.

The state signals output by the selection circuits 91a1, . . . , and 91a4 are input into each of the selection circuits 91b1 and 91b2 in the second stage, two at a time. For example, the state signals output from the selection circuits 91a1 and 91a2 are input into the selection circuit 91b1, and the state signals output from the selection circuits 91a3 and 91a4 are input into the selection circuit 91b2.

In addition, each of the selection circuits 91b1 and 91b2 selects any one of the two state signals based on the two state signals and the 1-bit random number output from the random number generation portion 91d. Further, each of the selection circuits 91b1 and 91b2 adds and updates one bit to indicate which state signal is selected for the identification value included in the selected state signal, and outputs the selected state signal.

The state signals output by the selection circuits 91b1 and 91b2 are input into the selection circuit 91c1 in the final stage, two at a time. The selection circuit 91c1 selects any one of the two state signals based on the two state signals and the 1-bit random number output by the random number generation portion 91d. Further, the selection circuit 91c1 adds and updates one bit to indicate which state signal is selected for the identification value included in the selected state signal, and outputs the selected state signal.

As described above, the identification value corresponds to the index. Similar to the variables $q_i$, $F_i$, and $\Delta E_i$, the scale combination circuit 91 may output the index that corresponds to the inverted bit by selecting the index input from each random selector portion by each selection circuit. In this case, each random selector portion accepts an index supplied from each LFE together with the variable q or the flag F. The control portion 504 sets, for example, the index that corresponds to a combination of the LFBs in a predetermined index storage register of each LFE.

Each of the mode selection circuits 91e1, ..., and 91e8 has an input terminal that corresponds to the scale (for example, 1 Kbit, 2 Kbits, 4 Kbits, and 8 Kbits). In the drawing, "1" denoted in each of the mode selection circuits 91e1, ..., and 91e8 indicates an input terminal that corresponds to a scale of 1 Kbit. The same "2" indicates an input terminal that corresponds to a scale of 2 Kbits. The same "4" Indicates an input terminal that corresponds to a scale of 4 Kbits (however, accuracy is 32 bits). The same "8" indicates an input terminal that corresponds to a scale of 8 Kbits (or scale of 4 Kbits and accuracy of 64 bits).

A state signal output from the LFB 70a (#0) is input into the input terminal with the scale of 1 Kbit of the mode selection circuit 91e1. A state signal output from the LFB 70b (#1) is input into the input terminal with the scale of 1 Kbit of the mode selection circuit 91e2. A state signal output from the LFB 70c (#2) is input into the input terminal with the scale of 1 Kbit of the mode selection circuit 91e3. A state signal output from the LFB 70d (#3) is input into the input terminal with the scale of 1 Kbit of the mode selection circuit 91e4. A state signal output from the LFB 70e (#4) is input into the input terminal with the scale of 1 Kbit of the mode selection circuit 91e5. A state signal output from the LFB 70f (#5) is input into the input terminal with the scale of 1 Kbit of the mode selection circuit 91e6. A state signal output from the LFB 70g (#6) is input into the input terminal with the scale of 1 Kbit of the mode selection circuit 91e7. A state signal output from the LFB 70h (#7) is input into the input terminal with the scale of 1 Kbit of the mode selection circuit 91e8.

A state signal output from the selection circuit 91a1 is input into the input terminals with the scale of 2 Kbits of each of the mode selection circuits 91e1 and 91e2. A state signal output from the selection circuit 91a2 is input into the input terminals with the scale of 2 Kbits of each of the mode selection circuits 91e3 and 91e4. A state signal output from the selection circuit 91a3 is input into the input terminals with the scale of 2 Kbits of each of the mode selection circuits 91e5 and 91e6. A state signal output from the selection circuit 91a4 is input into the input terminals with the scale of 2 Kbits of each of the mode selection circuits 91e7 and 91e8.

A state signal output from the selection circuit 91b1 is input into the input terminals with the scale of 4 Kbits of each of the mode selection circuits 91e1, 91e2, 91e3, and 91e4. A state signal output from the selection circuit 91b2 is input into the input terminals with the scale of 4 Kbits of each of the mode selection circuits 91e5, 91e6, 91e7, and 91e8.

A state signal output from the selection circuit 91c1 is input into the input terminals with the scale of 8 Kbits of each of the mode selection circuits 91e1, ..., and 91e8.

Each of the mode selection circuits 91e1, ..., and 91e8 accepts setting of the scale (number of spin bits) by the mode setting register 92. However, in FIG. 26, the signal lines from the mode setting register 92 to each of the mode selection circuits 91e2, ..., and 91e8 are abbreviated as " . . . ". Each of the mode selection circuits 91e1, ..., and 91e8 selects the state signal input into the input terminal that corresponds to the set scale, outputs $(x_j, F_j, \text{index}=j)$ to the LFBs 70a, ..., and 70h, and outputs $\Delta E_j$ to the adders 93a, ..., and 93h.

For example, the mode selection circuit 91e1 outputs $(x_{y0}, F_{y0}, \text{index}=y0)$ to the LFB 70a, and outputs $\Delta E_{y0}$ to the adder 93a. The adder 93a updates $E_0$ based on $\Delta E_{y0}$. The mode selection circuit 91e2 outputs $(x_{y1}, F_{y1}, \text{index}=y1)$ to the LFB 70b, and outputs $\Delta E_{y1}$ to the adder 93b. The adder 93b updates $E_1$ based on $\Delta E_{y1}$. The mode selection circuit 91e3 outputs $(x_{y2}, F_{y2}, \text{index}=y2)$ to the LFB 70c, and outputs $\Delta E_{y2}$ to the adder 93c. The adder 93c updates $E_2$ based on $\Delta E_{y2}$. The mode selection circuit 91e4 outputs $(x_{y3}, F_{y3}, \text{index}=y3)$ to the LFB 70d, and outputs $\Delta E_{y3}$ to the adder 93d. The adder 93d updates $E_3$ based on $\Delta E_{y3}$. The mode selection circuit 91e5 outputs $(x_{y4}, F_{y4}, \text{index}=y4)$ to the LFB 70e, and outputs $\Delta E_{y4}$ to the adder 93e. The adder 93e updates $E_4$ based on $\Delta E_{y4}$. The mode selection circuit 91e6 outputs $(x_{y5}, F_{y5}, \text{index}=y5)$ to the LFB 70f, and outputs $\Delta E_{y5}$ to the adder 93f. The adder 93f updates $E_5$ based on $\Delta E_{y5}$. The mode selection circuit 91e7 outputs $(x_{y6}, F_{y6}, \text{index}=y6)$ to the LFB 70g, and outputs $\Delta E_{y6}$ to the adder 93g. The adder 93g updates $E_6$ based on $\Delta E_{y6}$. The mode selection circuit 91e8 outputs $(x_{y7}, F_{y7}, \text{index}=y7)$ to the LFB 70h, and outputs $\Delta E_{y7}$ to the adder 93h. The adder 93h updates $E_7$ based on $\Delta E_{y7}$.

For example, the optimization device 408 ($j) selects any one of the bits based on the signal indicating the inversion availability output from each LFE that belongs to a certain LFB (group), and includes the random selector portion that outputs the signals indicating the selected bits to the scale combination circuit 91, for each LFB. The scale combination circuit 91 combines one or more LFBs in accordance with the setting of the number of spin bits, and selects a bit to be inverted based on a signal indicating a bit selected by the random selector portion that corresponds to each of the one or more LFBs. The scale combination circuit 91 outputs a signal indicating a bit to be inverted, to each LFE that belongs to the one or more LFBs.

Here, the mode setting register 92 sets the scale individually for the mode selection circuits 91e1, ..., and 91e8. However, in a certain scale mode, a common scale is set to the mode selection circuit that corresponds to the LFB used in combination.

For example, the mode setting register 92 sets the number of spin bits in the first spin bit string that corresponds to the first combination of the LFBs and the number of spin bits in the second spin bit string that corresponds to the second combination of the LFBs, to be the same as or different from each other. In addition, the mode setting register of each LFB including the mode setting register 75 may set the number of bits of the weighting factors for the LFE that belongs to the first combination of the LFB and the number of bits of the weighting factors for the LFE that belongs to the second combination of the LFB, to be the same as or different from each other.

For example, in a case of using a mode with scale of 2 Kbits in using the LFBs 70*a* and 70*b* in combination, a selection signal for selecting a mode with scale of 2 Kbits is supplied from the mode setting register 92 to the mode selection circuits 91*e*1 and 91*e*2. At this time, for example, the optimization device 408 ($j) is capable of executing the arithmetic operation with respect to the same problem or different problems by the LFBs 70*a* and 70*b* in parallel by using the remaining six LFBs according to the setting of the mode setting register 92.

For example, the scale combination circuit 91 may realize three modes with scale 2 Kbits by combining LFBs among the six LFBs two at a time, with respect to the remaining six LFBs. Accordingly, it is possible to realize four partitions in the partition mode "4P".

The combinations of modes realized in parallel are not limited to the above-described combinations, and, for example, eight combinations of modes with scale of 1 Kbit and two combinations of modes with scale of 4 Kbits are considered.

In this manner, the scale combination circuit 91 accepts the setting of the number of spin bits for each of the plurality of spin bit strings by the mode setting register 92, selects the number of combined LFBs (number of groups) for the number of spin bits of each of the plurality of spin bit strings, and combines the LFBs. Accordingly, it is possible to realize the plurality of Ising models over one optimization device 408 ($j).

In addition, common energy is stored in the set of E storage registers that corresponds to the set of LFBs used in combination. For example, in a case of using the LFBs in combination of the LFBs 70*a* and 70*b*, $E_0$ and $E_1$ stored in the E storage registers 94*a* and 94*b* have the same value. In this case, when reading the energy value for the set of LFBs 70*a* and 70*b*, the control portion 504 may read the energy value stored in one of the E storage registers 94*a* and 94*b* (for example, the E storage register 94*a* that corresponds to the LFB 70*a*). The control portion 504 similarly reads the energy value for other combinations of the LFBs.

For example, the control portion 504 accepts an input of an initial value or an operation condition for each problem to which the arithmetic operation is performed in parallel, from the execution control portion 1804 of the optimization problem arithmetic device 101. In addition, the control portion 504 sets the scale and accuracy that correspond to each problem input from the execution control portion 1804 of the optimization problem arithmetic device 101, for each group (for example, partition) of the LFBs to be used for one problem, in the mode setting register of the LFB and the mode setting register 92.

For example, with respect to the first problem, the control portion 504 sets the scale of 2 Kbits and accuracy of 64 bits for the mode setting registers of the LFBs 70*a* and 70*b*, and performs the setting for the mode setting register 92 to perform the output to the scale of 2 Kbits in the mode selection circuits 91*e*1 and 91*e*2. In addition, with respect to the second problem, the control portion 504 sets the scale of 2 Kbits and accuracy of 64 bits for the mode setting registers of the LFBs 70*c* and 70*d*, and performs the setting for the mode setting register 92 to perform the output to the scale of 2 Kbits in the mode selection circuits 91*e*3 and 91*e*4.

In this case, the optimization device 408 ($j) is capable of performing the arithmetic operation with respect to two problems (or both problems may be the same problem) in parallel. For example, the control portion 504 controls each LFB to perform the procedure of the flowchart illustrated in FIG. 15 with respect to the combination of LFBs that correspond to each problem.

After completion of the arithmetic operation, the control portion 504 reads the spin bit string for the first problem from each LFE of the LFBs 70*a* and 70*b*, and solves the first problem. In addition, after completion of the arithmetic operation, the control portion 504 reads the spin bit string for the second problem from each LFE of the LFBs 70*c* and 70*d*, and solves the second problem. Similarly, it is possible to perform the arithmetic operation with respect to three or more problems in parallel. Accordingly, it is possible to efficiently execute the arithmetic operations with respect to a plurality of problems.

Further, in a case of solving the same problem in parallel by the plurality of sets of LFBs, it is considered that the control portion 504 accelerates the arithmetic operation by, for example, a method referred to as a replica exchange method. In the replica exchange method, the spin bit string is updated with different temperature parameters in each set of the LFBs (replicas), and after updating a predetermined number of times, by exchanging the temperature parameters between the sets of the LFBs (for example, between replicas) with a predetermined probability, the speed of the searching for a solution increase.

Otherwise, as a method of searching for a solution, a method of repeating the procedure from the start (START) to the end (END) of FIG. 15 and obtaining a spin bit string of minimum energy as a solution among a plurality of arithmetic operation results, is also considered. In this case, the control portion 504 is capable of reducing the number of times of repetition and increasing the speed of the arithmetic operation, by solving the same problem in parallel using the plurality of sets of the LFBs.

As described above, according to the optimization problem arithmetic device 101 according to the embodiment, the combinatorial optimization problem is accepted, and based on the scale or requested accuracy of the accepted combinatorial optimization problem and information on the partition mode that defines the logically divided states of each of the plurality of optimization devices 408, it is possible to determine the optimization device 408 to which the combinatorial optimization problem is assigned, and to execute the arithmetic operation of the combinatorial optimization problem in the determined optimization device 408.

Accordingly, it is possible to perform the arithmetic operation of the combinatorial optimization problem by the optimization device 408 set to the partition mode that corresponds the scale or requested accuracy of the problem, among the plurality of optimization devices 408 with different partition modes. Therefore, in accordance with the scale or requested accuracy of the problem, it is possible to appropriately select the range of hardware resources used in the arithmetic operation, and it is possible to enhance the arithmetic operation performance and to achieve high speed of the arithmetic processing.

Further, according to the optimization problem arithmetic device 101, in a case where it is determined whether the scale of the combinatorial optimization problem is larger than the maximum scale of the problems solvable by the plurality of optimization devices 408, and the scale of the combinatorial optimization problem is larger than the maximum scale, it is possible to divide the combinatorial optimization problem. In addition, according to the optimization problem arithmetic device 101, based on the scale or requested accuracy of the divided problem after the division and the information on the partition mode that defines the logically divided state of each of the plurality of optimization devices 408, it is possible to determine the optimization device 408 to which the problem after the division is assigned, and to execute the arithmetic operation with respect to the problems after the division by the determined optimization device 408.

Accordingly, even in a case where the scale of the combinatorial optimization problem is larger than the maximum scale of the problems solvable by the plurality of optimization devices 408, it is possible to solve the combinatorial optimization problem by the division solution method.

Further, according to the optimization problem arithmetic device 101, among the optimization devices 408 to which the partition mode that is capable of solving the problem with the scale equal to or larger than the scale of the combinatorial optimization problem is set, it is possible to determine the optimization device 408 with the smallest maximum scale of the solvable problem, as the optimization device 408 to which the combinatorial optimization problem is assigned.

Accordingly, it is possible to suppress the range of hardware resources used in the arithmetic operation of the combinatorial optimization problem to the minimum, and to improve arithmetic operation performance by suppressing unnecessary DMA transfer and the like.

Further, according to the optimization problem arithmetic device 101, it is possible to determine the optimization devices 408 to which the partition mode that is capable of solving the problem with the accuracy equal to or higher than the requested accuracy of the combinatorial optimization problem is set, as the optimization device 408 to which the combinatorial optimization problem is assigned.

Accordingly, it is possible to appropriately select the range of the hardware resources used in the arithmetic operation in accordance with the requested accuracy of the combinatorial optimization problem, and to efficiently solve the combinatorial optimization problem.

Further, according to the optimization problem arithmetic device 101, it is possible to determine the optimization devices 408 to which the partition mode in which the scale of the combinatorial optimization problem is equal to or smaller than the maximum scale of the solvable problem and the requested accuracy of the combinatorial optimization problem is within the range of the maximum accuracy of the solvable problem is set, as the optimization device 408 to which the combinatorial optimization problem is assigned.

Accordingly, it is possible to appropriately select the range of the hardware resources used in the arithmetic operation in accordance with the scale and the requested accuracy of the combinatorial optimization problem, and to efficiently solve the combinatorial optimization problem.

In addition, according to the optimization problem arithmetic device 101, it is possible to determine the optimization device 408 to which the combinatorial optimization problem is assigned, further based on the information on the execution status of each of the plurality of optimization devices 408.

Accordingly, it is possible to preferentially assign the combinatorial optimization problem to the empty unit that has not executed the problem and the unit of the optimization device 408 ($j) in which the number of problems remaining in the queue is small. Therefore, it is possible to suppress the occurrence of a waiting time and a delay in the start of the arithmetic processing when executing the arithmetic operation of the combinatorial optimization problem.

In addition, it is possible to realize the optimization problem arithmetic method described in the embodiment by causing a computer, such as a personal computer or a workstation, to execute a program prepared in advance. The optimization problem arithmetic program is recorded in a readable recording medium by a computer, such as a hard disc, a flexible disc, a compact disc (CD)-ROM, a magneto-optical disk (MO), a digital versatile disk (DVD), and a Universal Serial Bus (USB) memory, and is executed by being read from the recording medium by the computer. In addition, the optimization problem arithmetic program may be assigned via a network, such as the Internet.

In addition, it is also possible to realize each functional portion of the optimization problem arithmetic device 101 described in the embodiment, for example, by an application specific IC, such as a standard cell or a structure application specific integrated circuit (ASIC), and a programmable logic device (PLD), such as an FPGA.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer-implemented optimization problem arithmetic method comprising:
    receiving a first combinatorial optimization problem to be solved by using at least any of a plurality of arithmetic circuits, each of the plurality of arithmetic circuits being configured to search for a ground state of spin bits corresponding to a plurality of spin included in an Ising model obtained by converting a combinatorial optimization problem;
    selecting a first arithmetic circuit from among the plurality of arithmetic circuits based on a scale or a requested accuracy of the first combinatorial optimization problem and a partition mode that defines logically divided states of each of the plurality of arithmetic circuits, the scale of the first combinatorial optimization problem being represented by a number of digits of the spin bits of the Ising model obtained by converting the first combinatorial optimization problem, the requested accuracy of the first combinatorial optimization problem being represented by a number of digits of bits of weighting factors indicating a magnitude of interaction between the spin bits; and
    causing the first arithmetic circuit to execute an arithmetic operation of the first combinatorial optimization problem.

2. The optimization problem arithmetic method according to claim 1, further comprising:
    receiving another combinatorial optimization problem;
    determining whether a scale of the other combinatorial optimization problem is larger than a maximum scale of a problem that is solvable by each of the plurality of arithmetic circuits;
    dividing the other combinatorial optimization problem in a case where the scale of the other combinatorial optimization problem is larger than the maximum scale;

selecting a second arithmetic circuit from among the plurality of arithmetic circuits based on a scale or a requested accuracy of a problem generated by the dividing and the partition mode of each of the plurality of arithmetic circuits; and causing the second arithmetic circuit to execute an arithmetic operation of the problem generated by the dividing.

3. The optimization problem arithmetic method according to claim 1, wherein the selecting includes identifying one or more arithmetic circuits to which the partition mode capable of solving a problem having a scale not less than the scale of the combinatorial optimization problem is set, from among the plurality of arithmetic circuits, and selecting the first arithmetic circuit having a smallest maximum scale of a problem which the first arithmetic circuit is capable of solving, among each maximum scale which each of the one or more arithmetic circuits has.

4. The optimization problem arithmetic method according to claim 1, wherein the selecting includes selecting the first arithmetic circuit to which a partition mode capable of solving the problem having accuracy not less than the requested accuracy of the combinatorial optimization problem is set, from among the plurality of arithmetic circuits.

5. The optimization problem arithmetic method according to claim 1, wherein the selecting includes selecting the first arithmetic circuit based on an actual status of arithmetic operations in each of the plurality of arithmetic circuits.

6. The optimization problem arithmetic method according to claim 1, wherein the scale of the combinatorial optimization problem is represented by a number of spin bits of an Ising model of the combinatorial optimization problem, and the requested accuracy of the combinatorial optimization problem is represented by a number of bits of weighting factors that indicates a magnitude of interaction between bits.

7. An optimization problem arithmetic device comprising:

a memory; and a processor coupled to the memory and the processor configured to:

receive a first combinatorial optimization problem to be solved by using at least any of a plurality of arithmetic circuits, each of the plurality of arithmetic circuits being configured to search for a ground state of spin bits corresponding to a plurality of spin included in an Ising model obtained by converting a combinatorial optimization problem, perform selection of a first arithmetic circuit from among the plurality of arithmetic circuits based on a scale or a requested accuracy of the first combinatorial optimization problem and a partition mode that defines logically divided states of each of the plurality of arithmetic circuits, the scale of the first combinatorial optimization problem being represented by a number of digits of the spin bits of the Ising model obtained by converting the first combinatorial optimization problem, the requested accuracy of the first combinatorial optimization problem being represented by a number of digits of bits of weighting factors indicating a magnitude of interaction between the spin bits, and cause the first arithmetic circuit to execute an arithmetic operation of the first combinatorial optimization problem.

8. The optimization problem arithmetic device according to claim 7, wherein the processor is further configured to:

receive another combinatorial optimization problem, determine whether a scale of the other combinatorial optimization problem is larger than a maximum scale of a problem that is solvable by each of the plurality of arithmetic circuits, perform division of the other combinatorial optimization problem in a case where the scale of the other combinatorial optimization problem is larger than the maximum scale, select a second arithmetic circuit from among the plurality of arithmetic circuits based on a scale or a requested accuracy of a problem generated by the division and the partition mode of each of the plurality of arithmetic circuits, and cause the second arithmetic circuit to execute an arithmetic operation of the problem generated by the dividing.

9. The optimization problem arithmetic device according to claim 7, wherein the selection includes identifying one or more arithmetic circuits to which the partition mode capable of solving a problem having a scale not less than the scale of the combinatorial optimization problem is set, from among the plurality of arithmetic circuits, and selecting the first arithmetic circuit having a smallest maximum scale of a problem which the first arithmetic circuit is capable of solving, among each maximum scale which each of the one or more arithmetic circuits has.

10. The optimization problem arithmetic device according to claim 7, wherein the selection includes selecting the first arithmetic circuit to which a partition mode capable of solving the problem having accuracy not less than the requested accuracy of the combinatorial optimization problem is set, from among the plurality of arithmetic circuits.

11. The optimization problem arithmetic device according to claim 7, wherein the selection includes selecting the first arithmetic circuit based on an actual status of arithmetic operations in each of the plurality of arithmetic circuits.

12. The optimization problem arithmetic device according to claim 7, wherein the scale of the combinatorial optimization problem is represented by a number of spin bits of an Ising model of the combinatorial optimization problem, and the requested accuracy of the combinatorial optimization problem is represented by a number of bits of weighting factors that indicates a magnitude of interaction between bits.

13. A non-transitory computer-readable medium storing instructions executable by one or more computers, the instructions comprising:

one or more instructions for receiving a first combinatorial optimization problem to be solved by using at least any of a plurality of arithmetic circuits, each of the plurality of arithmetic circuits being configured to search for a ground state of spin bits corresponding to a plurality of spin included in an Ising model obtained by converting a combinatorial optimization problem;

one or more instructions for selecting a first arithmetic circuit from among the plurality of arithmetic circuits based on a scale or a requested accuracy of the first combinatorial optimization problem and a partition mode that defines logically divided states of each of the plurality of arithmetic circuits, the scale of the first combinatorial optimization problem being represented by a number of digits of the spin bits of the Ising model obtained by converting the first combinatorial optimization problem, the requested accuracy of the first combinatorial optimization problem being represented by a number of digits of bits of weighting factors indicating a magnitude of interaction between the spin bits; and one or more instructions for causing the first arithmetic circuit to execute an arithmetic operation of the first combinatorial optimization problem.

* * * * *